US012010317B2

(12) United States Patent
Xu et al.

(10) Patent No.: US 12,010,317 B2
(45) Date of Patent: Jun. 11, 2024

(54) MINIMUM ALLOWED QUANTIZATION FOR TRANSFORM SKIP BLOCKS IN VIDEO CODING

(71) Applicants:Beijing Bytedance Network Technology Co., Ltd., Beijing (CN); Bytedance Inc., Los Angeles, CA (US)

(72) Inventors: Jizheng Xu, San Diego, CA (US); Zhipin Deng, Beijing (CN); Li Zhang, San Diego, CA (US); Hongbin Liu, Beijing (CN); Kai Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/962,861

(22) Filed: Oct. 10, 2022

(65) Prior Publication Data

US 2023/0099893 A1 Mar. 30, 2023

Related U.S. Application Data

(63) Continuation of application No. PCT/CN2021/086522, filed on Apr. 12, 2021.

(30) Foreign Application Priority Data

Apr. 10, 2020 (WO) ................ PCT/CN2020/084291

(51) Int. Cl.
*H04N 19/132* (2014.01)
*H04N 9/70* (2006.01)
(Continued)

(52) U.S. Cl.
CPC ......... *H04N 19/132* (2014.11); *H04N 19/176* (2014.11); *H04N 19/186* (2014.11); *H04N 19/70* (2014.11)

(58) Field of Classification Search
CPC .... H04N 19/13; H04N 19/186; H04N 19/593; H04N 19/70; H04N 19/91; H04N 19/176
See application file for complete search history.

(56) References Cited

U.S. PATENT DOCUMENTS 9,491,460 B2 11/2016 Seregin
9,749,643 B2 8/2017 Kim
(Continued)

FOREIGN PATENT DOCUMENTS

CN 103299634 A 9/2013
CN 103327328 A 9/2013
(Continued)

OTHER PUBLICATIONS

"Palette Mode Coding in HEVC Screen Content Coding Extension"—Wei Pu et al.; IEEE Journal on Emerging and Selected Topics in Circuits and Systems, vol. 6, No. 4, Dec. 2016 (Year: 2016).*
(Continued)

*Primary Examiner* — Mainul Hasan
(74) *Attorney, Agent, or Firm* — Conley Rose, P.C.

(57) ABSTRACT

A method of video processing includes performing a conversion between a video including a video region and a bitstream of the video according to a rule. The rule specifies a relationship between enablement of a palette mode and a coding type of the video region. The video region may represent a coding block of the video.

20 Claims, 27 Drawing Sheets

(51) Int. Cl.
*H04N 19/176* (2014.01)
*H04N 19/186* (2014.01)
*H04N 19/70* (2014.01)

(56) References Cited

U.S. PATENT DOCUMENTS

| | | | |
|---|---|---|---|
| 9,860,559 B2 | 1/2018 | Zhang et al. | |
| 10,055,189 B2 | 8/2018 | Tsai et al. | |
| 10,136,140 B2 | 11/2018 | Li et al. | |
| 10,306,240 B2 | 5/2019 | Xiu et al. | |
| 10,382,795 B2 | 8/2019 | Huang et al. | |
| 10,820,015 B2 | 10/2020 | Zhang et al. | |
| 11,330,298 B2 | 5/2022 | Ray et al. | |
| 2012/0128067 A1 | 5/2012 | Liu et al. | |
| 2012/0163455 A1 | 6/2012 | Zheng et al. | |
| 2013/0279583 A1 | 10/2013 | Gao et al. | |
| 2013/0294524 A1 | 11/2013 | Van Der Auwera et al. | |
| 2014/0226721 A1 | 8/2014 | Joshi et al. | |
| 2014/0328404 A1 | 11/2014 | Na et al. | |
| 2015/0063460 A1 | 3/2015 | Gamei et al. | |
| 2015/0124865 A1 | 5/2015 | Kim | |
| 2015/0195559 A1 | 7/2015 | Chen et al. | |
| 2015/0249843 A1 | 9/2015 | Xu | |
| 2015/0373357 A1 | 12/2015 | Pang et al. | |
| 2016/0100179 A1 | 4/2016 | He et al. | |
| 2016/0234494 A1 | 8/2016 | Seregin et al. | |
| 2016/0360210 A1 | 12/2016 | Xiu | |
| 2017/0085886 A1 | 3/2017 | Jacobson | |
| 2017/0251213 A1 | 8/2017 | Ye et al. | |
| 2017/0272782 A1 | 9/2017 | Ll et al. | |
| 2017/0318302 A1 | 11/2017 | Ye | |
| 2017/0366818 A1 | 12/2017 | Zhang et al. | |
| 2018/0070110 A1 | 3/2018 | Chuang et al. | |
| 2018/0091825 A1 | 3/2018 | Zhao | |
| 2018/0115787 A1 | 4/2018 | Koo | |
| 2018/0199072 A1 | 7/2018 | Li et al. | |
| 2018/0205946 A1 | 7/2018 | Zhang et al. | |
| 2018/0307457 A1 | 10/2018 | Tsai et al. | |
| 2019/0158854 A1 | 5/2019 | He et al. | |
| 2019/0230337 A1 | 7/2019 | Kim | |
| 2019/0238864 A1 | 8/2019 | Xiu et al. | |
| 2019/0320171 A1 | 10/2019 | Zhang et al. | |
| 2020/0077095 A1 | 3/2020 | Chuang et al. | |
| 2020/0137394 A1 | 4/2020 | Shih et al. | |
| 2020/0260070 A1 | 8/2020 | Yoo et al. | |
| 2020/0296398 A1 | 9/2020 | Zhao et al. | |
| 2021/0029356 A1 | 1/2021 | Zhang et al. | |
| 2021/0037242 A1 | 2/2021 | Zhao et al. | |
| 2021/0044828 A1 | 2/2021 | Van et al. | |
| 2021/0084309 A1 | 3/2021 | Zhao | |
| 2021/0152830 A1 | 5/2021 | Bossen et al. | |
| 2021/0218990 A1* | 7/2021 | Xu | H04N 19/593 |
| 2021/0227234 A1 | 7/2021 | Zhang et al. | |
| 2021/0227241 A1* | 7/2021 | Xu | H04N 19/593 |
| 2021/0250592 A1 | 8/2021 | Xiu et al. | |
| 2021/0250606 A1 | 8/2021 | Choi | |
| 2021/0274175 A1 | 9/2021 | Lim et al. | |
| 2021/0329233 A1 | 10/2021 | Tsai et al. | |
| 2022/0038717 A1 | 2/2022 | Zhu et al. | |
| 2022/0046288 A1 | 2/2022 | Rosewarne | |
| 2022/0141495 A1 | 5/2022 | Kim et al. | |
| 2022/0159254 A1 | 5/2022 | Xu et al. | |
| 2022/0159255 A1 | 5/2022 | Xu et al. | |
| 2022/0167011 A1 | 5/2022 | Xu et al. | |
| 2022/0210410 A1 | 6/2022 | Xu et al. | |
| 2022/0210437 A1 | 6/2022 | Xu et al. | |
| 2022/0279172 A1* | 9/2022 | Jang | H04N 19/109 |
| 2022/0286700 A1* | 9/2022 | Zhao | H04N 19/18 |
| 2022/0286701 A1* | 9/2022 | Zhao | H04N 19/129 |
| 2022/0312015 A1* | 9/2022 | Choi | H04N 19/105 |
| 2022/0345737 A1* | 10/2022 | Choi | H04N 19/176 |

FOREIGN PATENT DOCUMENTS

| | | |
|---|---|---|
| CN | 103931185 A | 7/2014 |
| CN | 104685874 A | 6/2015 |
| CN | 104685875 A | 6/2015 |
| CN | 104782125 A | 7/2015 |
| CN | 105379284 A | 3/2016 |
| CN | 105491379 A | 4/2016 |
| CN | 106062779 A | 10/2016 |
| CN | 106797465 A | 5/2017 |
| CN | 107071494 A | 8/2017 |
| CN | 107534711 A | 1/2018 |
| CN | 107646195 A | 1/2018 |
| CN | 107852490 A | 3/2018 |
| CN | 108353184 A | 7/2018 |
| CN | 109076210 A | 12/2018 |
| CN | 109479137 A | 3/2019 |
| CN | 109547790 A | 3/2019 |
| CN | 109716775 A | 5/2019 |
| CN | 109743576 A | 5/2019 |
| CN | 109804629 A | 5/2019 |
| CN | 110087089 A | 8/2019 |
| CN | 110381311 A | 10/2019 |
| EP | 3306938 A1 | 4/2018 |
| EP | 3449630 A1 | 3/2019 |
| EP | 3994886 A1 | 5/2022 |
| EP | 4011066 A1 | 6/2022 |
| IN | 201847012679 A | 4/2018 |
| JP | 2022120213 A | 1/2020 |
| JP | 2020017970 A | 8/2022 |
| KR | 20190020161 A | 2/2019 |
| RU | 2400941 C1 | 9/2010 |
| RU | 2430486 C1 | 9/2011 |
| RU | 2641223 C2 | 1/2018 |
| RU | 2653236 C2 | 5/2018 |
| RU | 2653299 C2 | 5/2018 |
| RU | 2674332 C2 | 12/2018 |
| RU | 2682838 C1 | 3/2019 |
| TW | I663873 B | 6/2019 |
| WO | 2015005132 A1 | 1/2015 |
| WO | 2015078304 A1 | 6/2015 |
| WO | 2015106121 A1 | 7/2015 |
| WO | 2015180014 A1 | 12/2015 |
| WO | 2016066028 A1 | 5/2016 |
| WO | 2016100424 A1 | 6/2016 |
| WO | 2016130622 A2 | 8/2016 |
| WO | 2017206803 A1 | 12/2017 |
| WO | 2017206805 A1 | 12/2017 |
| WO | 2017206826 A1 | 12/2017 |
| WO | 2018064948 A1 | 4/2018 |
| WO | 2018116802 A1 | 6/2018 |
| WO | 2018177953 A1 | 10/2018 |
| WO | 2019059676 A1 | 3/2019 |
| WO | 2019069950 A1 | 4/2019 |
| WO | 2020219737 A1 | 10/2020 |
| WO | 2021023258 A1 | 2/2021 |
| WO | 2021026564 A1 | 2/2021 |
| WO | 2021030747 A1 | 2/2021 |
| WO | 2021060847 A1 | 4/2021 |

OTHER PUBLICATIONS

Document: JVET-M1001-v7, Bross, B., et al., "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, 300 pages.

Bossen, F., Retrieved from the internet: https://vcgit.hhi.fraunhofer.de/jvet/VVCSoftware_VTM/tags/VTM-5.0, VTM version 5.0, Dec. 29, 2022, 2 pages.

Document: JVET-M0413, Said, A., et al., "CE5: Per-context CABAC initialization with single window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.

Document: JVET-O0050-v2, Lin, Z., et al., "CE3-2.1.1 and CE3-2.1.2: Removing 2×2, 2×4, and 4×2 chroma CBs," Joint Video Experts Team (JVET) of ITU-T SG 16 WP 3 and ISO/IEC JTC 1/SC 29/WG 11 15th Meeting: Gothenburg, SE, Jul. 3-12, 2019, 5 pages.

(56) References Cited

OTHER PUBLICATIONS

Document: JVET-O2001-vB, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 426 pages.
"Series H: Audiovisual and Multimedia Systems Infrastructure of audiovisual services—Coding of moving video High efficiency video coding," Recommendation ITU-T H.265, ISO/IEC 23008-2, Feb. 2018, 692 pages.
Retrieved from the internet: https://jvet.hhi.fraunhofer.de/svn/svn_HMJEMSoftware/, Powered by Apache Subversion version 1.9.7 (r1800392), Dec. 28, 2022, 1 page.
Document: JVET-R0045, Li, J., et al., "AHG15: cleanup for signaling of minimum QP of transform skip," Joint Video Experts Team (JVET) of ITU-T SG 16 WP 3 and ISO/IEC JTC 1/SC 29/WG 11 18th Meeting: by teleconference, Apr. 15-24, 2020, 4 pages.
Document: JVET-O0389-v3, Cai, W., et al., "On Supporting 64×64 Chroma Transform Unit," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
Document: JVET-O0398, Choi, J., et al., "Chroma block size restriction in dual tree intra coding," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
Document: JVET-O0258-v1, Zhu, W., et al., "Non-CE8: Adaptive single/dual tree with IBC simplification," Joint Video Experts Team (JVET) of ITU-T SG 16 WP 3 and ISO/IEC JTC 1/SC 29/WG 11 15th Meeting: Gothenburg, SE, Jul. 3-12, 2019, 10 pages.
Document: JVET-O0524, Poirier, T., et al., "Non-CE2: alternative solutions for reducing the luma-chroma latency," Joint Video Experts Team (JVET) of ITU-T SG 16 WP 3 and ISO/IEC JTC 1/SC 29/WG 11 15th Meeting: Gothenburg, SE, Jul. 3-12, 2019, 7 pages.
Document: JVET-O0130-v2, Kuo, C., et al., "Non-CE2: CRS with Chroma Separate Tree," Joint Video Experts Team (JVET) of ITU-T SG 16 WP 3 and ISO/IEC JTC 1/SC 29/WG 11 15th Meeting: Gothenburg, SE, Jul. 3-12, 2019, 10 pages.
Document: JVET-M0065, Zhou, T., et al., "Non-CE3: Intra chroma partitioning and prediction restriction," Joint Video Exploration Team (JVET) of ITU-T SG 16 WP 3 and ISO/IEC JTC 1/SC 29/WG 11 13th Meeting: Marrakesh, MA, Jan. 9-18, 2019, 4 pages.
Document: JVET-M0245-v3, Rosewarne, C., et al., "AHG16-related: Chroma block coding and size restriction," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-O0433, Pu, F., et al., "AHG15: chroma quantization parameters QpC table," Joint Video Experts Team (JVET) of ITU-T SG 16 WP 3 and ISO/IEC JTC 1/SC 29/WG 11 15th Meeting: Gothenburg, SE, Jul. 3-12, 2019, 6 pages.
Document: JVET-N1002-v2, Chen, J., et al., "Algorithm description for Versatile Video Coding and Test Model 5 (VTM5)," Joint Video Experts Team (JVET) of ITU-T SG 16 WP 3 and ISO/IEC JTC 1/SC 29/WG 11 14th Meeting: Geneva, CH, Mar. 19-27, 2019, 79 pages.
Document: JVET-P0476, Chao, Y., et al., "Non-CE8: Palette mode and prediction mode signaling," Joint Video Experts Team (JVET) of ITU-T SG 16 WP 3 and ISO/IEC JTC 1/SC 29/WG 11 16th Meeting: Geneva, CH, Oct. 1-11, 2019, 13 pages.
Huang, Y., et al. "Block Partitioning Structure in the VVC Standard," IEEE Transactions on Circuits and Systems for Video Technology, vol. 31, No. 10, Oct. 2021, 16 pages.
Wang, Z., et al., "Effective Quadtree Plus Binary Tree Block Partition Decision for Future Video Coding," 2017 Data Compression Conference, 2017, 10 pages.
Yang, H., et al. "Low-Complexity CTU Partition Structure Decision and Fast Intra Mode Decision for Versatile Video Coding," IEEE Transactions on Circuits and Systems for Video Technology, vol. 30, No. 6, Jun. 2020, 15 pages.
Yuan, Y., et al. "Quadtree Based Nonsquare Block Structure for Inter Frame Coding in High Efficiency Video Coding," IEEE Transactions on Circuits and Systems for Video Technology, vol. 22, No. 12, Dec. 2012, 13 pages.

Non-Final Office Action dated Jul. 14, 2022, 23 pages, U.S. Appl. No. 17/700,155, filed Mar. 21, 2022.
Foreign Communication From A Related Counterpart Application, European Application No. 20850328.4, Extended European Search Report dated Nov. 28, 2022, 8 pages.
Foreign Communication From A Related Counterpart Application, European Application No. 20859902.7, Extended European Search Report dated Oct. 11, 2022, 13 pages.
Foreign Communication From A Related Counterpart Application, European Application No. 20859901.9, Extended European Search Report dated Aug. 18, 2022, 13 pages.
Non-Final Office Action dated Sep. 19, 2022, 21 pages, U.S. Appl. No. 17/589,483, filed Jan. 31, 2022.
Non-Final Office Action dated May 31, 2022, 18 pages, U.S. Appl. No. 17/589,168, filed Jan. 31, 2022.
Non-Final Office Action dated May 23, 2022, 23 pages, U.S. Appl. No. 17/589,483, filed Jan. 31, 2022.
Non-Final Office Action dated May 10, 2022, 18 pages, U.S. Appl. No. 17/589,537, filed Jan. 31, 2022.
Non-Final Office Action dated Jul. 5, 2022, 19 pages, U.S. Appl. No. 17/684,694, filed Mar. 2, 2022.
Notice of Allowance dated Aug. 26, 2022, 17 pages, U.S. Appl. No. 17/589,168, filed Aug. 26, 2022.
Notice of Allowance dated May 3, 2022, 10 pages, U.S. Appl. No. 17/684,630, filed Mar. 2, 2022.
Non Final Office Action from U.S. Appl. No. 17/589,168 dated May 18, 2022.
Foreign Communication From A Related Counterpart Application, International Application No. PCT/CN2020/107381, International Search Report dated Nov. 11, 2020, 9 pages.
Foreign Communication From A Related Counterpart Application, International Application No. PCT/CN2020/107400, International Search Report dated Oct. 26, 2020, 10 pages.
Foreign Communication From A Related Counterpart Application, International Application No. PCT/CN2020/107408, International Search Report dated Sep. 28, 2020, 10 pages.
Foreign Communication From A Related Counterpart Application, International Application No. PCT/CN2020/112974, International Search Report dated Nov. 30, 2020, 14 pages.
Foreign Communication From A Related Counterpart Application, International Application No. PCT/CN2020/112975, International Search Report dated Nov. 30, 2020, 10 pages.
Foreign Communication From A Related Counterpart Application, International Application No. PCT/CN2020/116472, International Search Report dated Dec. 25, 2020, 13 pages.
Foreign Communication From A Related Counterpart Application, International Application No. PCT/CN2021/086522, International Search Report dated Jul. 9, 2021, 13 pages.
Document: JVET-N0082-v3, Lin, Z., et al., "CE3-related: Constrained partitioning of chroma intra CBs," Joint Video Experts Team (JVET) of ITU-T SG 16 WP 3 and ISO/IEC JTC 1/SC 29/WG 11 14th Meeting: Geneva, CH, Mar. 19-27, 2019, 5 pages.
Document: JVET-O2001-VE, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.
Document: JVET-N0102-v1, Rosewarne, C., et al., "CE3-2.3: Chroma block coding and size restriction," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.
Document: JVET-N0465, Jang, H., et al., "CE3-related: Restrict 2×N, N×2 chroma processing for dual tree structure," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.
Document: JVET-L0372-v2, Zhao, Y., et al., "CE1-related: Constrained chroma block partitioning," Joint Video Experts Team (JVET) of ITU-T SG 16 WP 3 and ISO/IEC JTC 1/SC 29/WG 11 12th Meeting: Macao, CN, Oct. 3-12, 2018, 3 pages.
Document: JVET-N0476, Chen, Y., et al., "Non-CE4: Shared Merge List on the Constraints of Picture Sizes," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.

(56) References Cited

OTHER PUBLICATIONS

Foreign Communication From A Related Counterpart Application, European Application No. 20865514.2, Extended European Search Report dated Mar. 31, 2023, 11 pages.
Document: JVET-O0050-v2, Lin, Z., et al., "CE3-2.1.1 and CE3-2.1.2: Removing 2x2, 2x4, and 4x2 chroma CBs," Joint Video Experts Team (JVET) of ITU-T SG 16 WP 3 and ISO/IEC JTC 1/SC 29/WG 11 15th Meeting: Gothenburg, SE, Jul. 3-12, 2019, 5 pages.
Document: JVET-P0375, Yang, H., et al., "Non-CE8: Palette mode CU size restriction," Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Document: JVET-Q0354-r, Jang, H., et al., "Non-CE: Clean-up regarding syntaxes for prediction mode decision," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.
Document: JVET-N0225-v2, Li, L., et al., "Various chroma format support in VVC," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Document: JVET-O2001-v6, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 426 pages.
Document: JVET-Q2001-vE, Bross, B., "Versatile Video Coding (Draft 8)," Joint Video Experts Team (JVET) of ITU-T SG 16 WP3 and ISO/IEC JTC 1/SC 29/WG 11 17th Meeting: Brussels, BE, Jan. 7-17, 2020, 28 pages.
Document: JVET-N1001-v10, Bross, B., et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 407 pages.
Partial Supplementary European Search Report from European Application No. 21783962.0 dated Jul. 20, 2023.
Final Office Action from U.S. Appl. No. 17/589,483 dated Aug. 22, 2023.
Document: JVET-O0050-v2, Lin, Z., et al., "CE3-2.1.1 and CE3-2.1.2: Removing 2x2, 2x4, and 4x2 chroma CBs," Joint Video Experts Team (JVET) of ITU-T SG 16 WP3 and ISO/IEC JTC1/SC 29/WG 11, 15th Meeting: Gothenburg, SE, Jul. 3-12, 2019, Document: JVET-O0050-v4, 5 pages.
Office Action from U.S. Appl. No. 18/151,842 dated Nov. 20, 2023, 33 pages.

* cited by examiner

Performing a conversion between a video including a first video region and a second video region and a bitstream of the video according to a rule; and wherein the rule specifies that a boundary strength (bs) of a deblocking filter for chroma components of the video is set to 0 in case that a first block is in an intra block copy mode and a second block is in a palette mode.

2432 — Performing a conversion between a video and a bitstream of the video according to a format rule, and wherein the format rule specifies that a variable indicating minimum allowed quantization parameter is constrained according to a profile of the bitstream.

MINIMUM ALLOWED QUANTIZATION FOR TRANSFORM SKIP BLOCKS IN VIDEO CODING

CROSS REFERENCE TO RELATED APPLICATIONS

This application is a continuation of International Patent Application No. PCT/CN2021/086522 filed on Apr. 12, 2021, which claims the priority to and benefits of International Patent Application No. PCT/CN2020/084291, filed on Apr. 10, 2020. All the aforementioned patent applications are hereby incorporated by reference in their entireties.

TECHNICAL FIELD

The present disclosure is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which reference pictures are used in video coding or decoding.

In one example aspect a method of video processing is disclosed. The method includes parsing, for a conversion between a video region of a video and a coded representation of the video region, the coded representation according to a syntax rule that defines a relationship between a chroma block size and a color format of the video region and performing the conversion by performing the parsing according to the syntax rule.

In another example aspect, another method of video processing is disclosed. The method includes determining, based on a property of a video and a chroma format of the video, a coding mode of a coding tree node of the video and performing a conversion between a coded representation of the video and a video block of the coding tree node using the determined coding mode.

In yet another example aspect, another method of video processing is disclosed. The method includes determining, based on a rule, whether a certain size of chroma blocks is allowed in a video region of a video and performing a conversion between the video region and a coded representation of the video region based on the determining.

In yet another example aspect, another method of video processing is disclosed. The method includes determining, based on a rule that allows use of a coding mode for a video condition, that a coding mode is permitted for a video region and performing a conversion between a coded representation of pixels in the video region and pixels of the video region based on the determining.

In yet another example aspect, another method of video processing is disclosed. The method includes performing a conversion between a video block of a video and a coded representation of the video block using a video coding mode, wherein a syntax element signaling the coding mode is selectively included in the coded representation based on a rule.

In yet another example aspect, another method of video processing is disclosed. The method includes determining, due to a chroma block having a size less than a threshold size, that a transform type used during a conversion between the chroma block and a coded representation of the chroma block is different from a transform type used for a corresponding luma block conversion and performing the conversion based on the determining.

In yet another example aspect, another method of video processing is disclosed. The method includes determining, whether a smallest chroma block rule is enforced during a conversion between a coded representation of a video region and pixel values of the video region, based on a coding condition of the video region; and performing the conversion based on the determining.

In yet another example aspect, another method of video processing is disclosed. The method includes determining, for a conversion between a coded representation of a video region in a 4:2:2 format and pixel values of the video region, a mode type to be used for the conversion based on whether a smallest chroma block rule is enabled for the video region; and performing the conversion based on the determining.

In yet another example aspect, another method of video processing is disclosed. The method includes determining, for a conversion between a coded representation of a video block and a video block of a video, whether block partitioning is allowed during the conversion, based on a mode type used during the conversion or a dimension of the video block; and performing the conversion using the determining.

In yet another example aspect, another method of video processing is disclosed. The method includes determining, for a conversion between a coded representation of a video segment of a video and the video segment, to apply a special processing mode for a chroma block of size M×N, where M by N are integers; and performing the conversion based on the determining.

In another example aspect, another method of video processing is disclosed. The method includes performing a conversion between a video including a video region and a bitstream of the video according to a rule; and wherein the rule specifies a relationship between enablement of a palette mode and a coding type of the video region.

In another example aspect, another method of video processing is disclosed. The method includes performing a conversion between a video including a first video region and a second video region and a bitstream of the video according to a rule; and wherein the rule specifies that a boundary strength (bs) of a deblocking filter for chroma components of the video is set to 0 in case that a first block is in an intra block copy mode and a second block is in a palette mode.

In another example aspect, another method of video processing is disclosed. The method includes performing a conversion between a video and a bitstream of the video according to a format rule, and wherein the format rule specifies that a variable related to an input bit depth of the video is constrained according to a profile of the bitstream.

In another example aspect, another method of video processing is disclosed. The method includes performing a conversion between a video and a bitstream of the video according to a format rule, and wherein the format rule specifies that a variable indicating minimum allowed quantization parameter is constrained according to a profile of the bitstream.

In yet another example aspect, the above-described method may be implemented by a video encoder apparatus that comprises a processor.

In yet another example aspect, the above-described method may be implemented by a video decoder apparatus that comprises a processor.

In yet another example aspect, these methods may be embodied in the form of processor-executable instructions and stored on a computer-readable program medium.

These, and other, aspects are further described in the present disclosure.

BRIEF DESCRIPTION OF THE DRAWINGS

FIG. 3 shows an example of use of palette predictor to signal palette entries.

FIG. 9 shows an example of subsampled Laplacian calculation.

FIGS. 24A to 24D are flowcharts for example methods of video processing in accordance with some embodiments of the disclosed technology.

DETAILED DESCRIPTION

Figure 1:
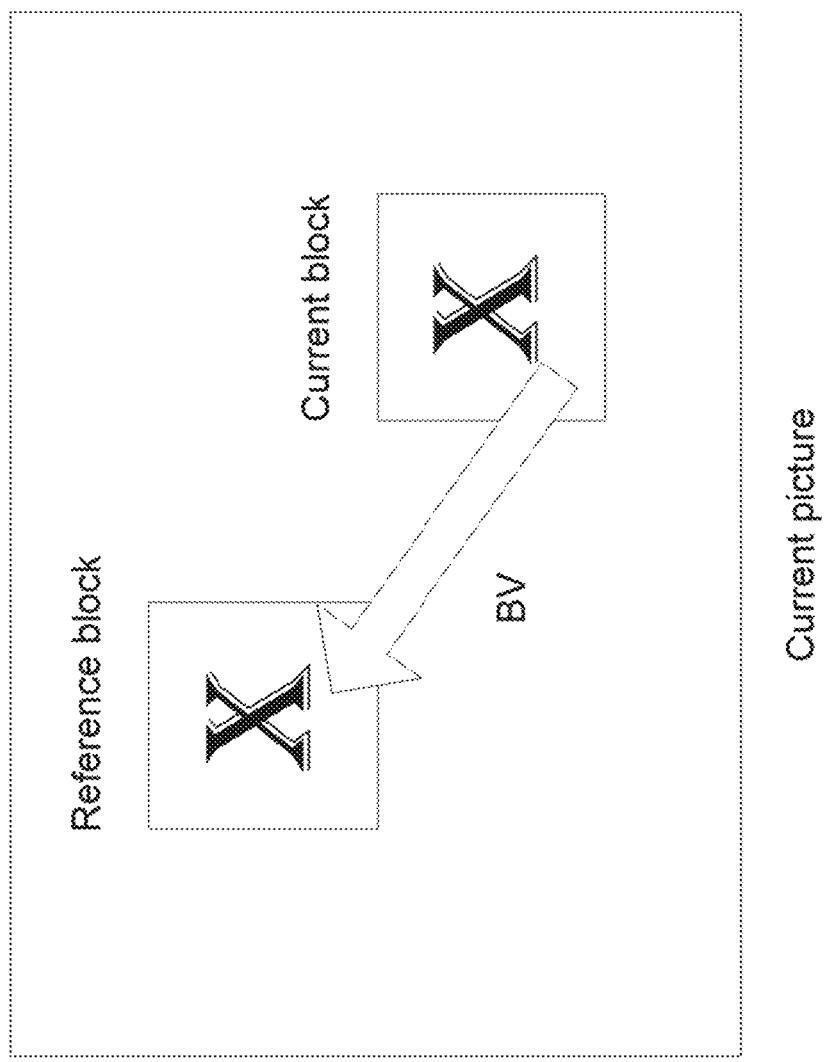
FIG. 1 shows an example of intra block copy coding tool.

The present disclosure provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present disclosure for ease of understanding and do not limit the embodiments and techniques to the corresponding sections. As such, embodiments from one section can be combined with embodiments from other sections.

1. Brief Summary

This disclosure is related to video coding technologies. Specifically, it is related to palette coding with employing base colors based representation in video coding. It may be applied to the existing video coding standard like High Efficiency Video Coding (HEVC), or the standard Versatile Video Coding (VVC) to be finalized. It may be also applicable to future video coding standards or video codec.

2. Initial Discussion

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 4) could be found at:

http://phenix.it-sudparis.eu/jvet/doc_end_user/current_document.php?id=5755

The latest reference software of VVC, named VTM, could be found at: https://vcgit.hhi.fraunhofer.de/jvet/VVCSoftware_VTM/tags/VTM-5.0

2.1 Intra Block Copy

Intra block copy (IBC), a.k.a., current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 1, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The motion vector (MV) is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/three dimensional (3D) video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

FIG. 1 is an illustration of intra block copy.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.2 IBC in HEVC Screen Content Coding Extensions

Figure 20:
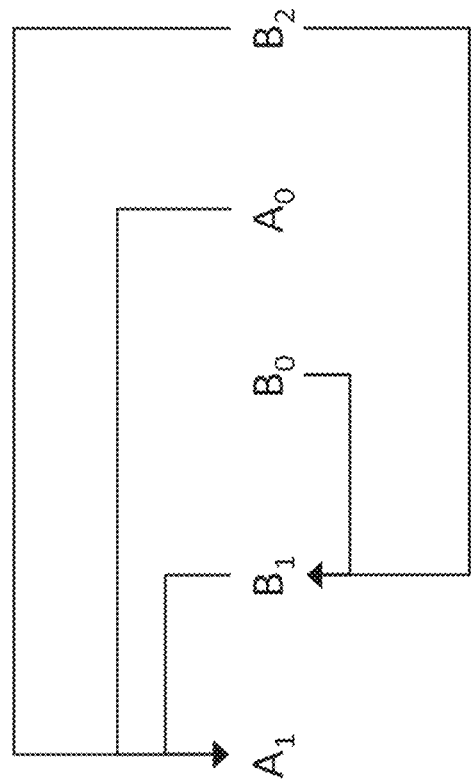
FIG. 20 shows examples of candidate pairs considered for redundancy check of spatial merge candidates.
Figure 19:
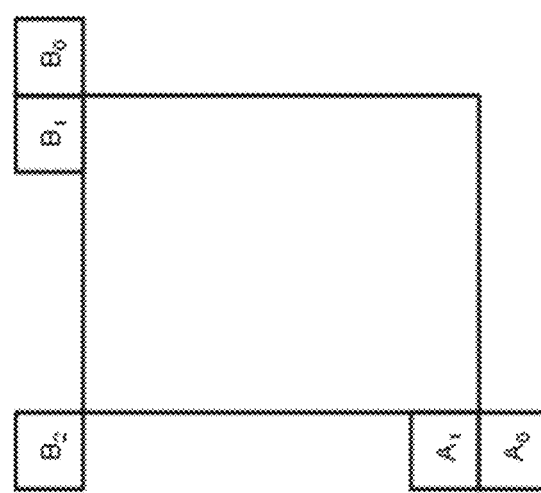
FIG. 19 shows examples of positions of spatial merge candidates.

In the screen content coding extensions of HEVC, when a block uses current picture as reference, it should guarantee that the whole reference block is within the available reconstructed area, as indicated in the following spec text:

construction of the IBC merge list can be summarized according to the following sequence of steps:
   Step 1: Derivation of spatial candidates
   Step 2: Insertion of History-based Motion Vector Prediction (HMVP) candidates
   Step 3: Insertion of pairwise average candidates In the derivation of spatial merge candidates, a maximum of four merge candidates are selected among candidates located in the positions depicted in FIG. 19. The order of derivation is $A_1$, $B_1$, $B_0$, $A_0$ and $B_2$. Position $B_2$ is considered only when any prediction unit (PU) of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 20 are considered and a candidate is only added to the list if the corresponding candidate used for redundancy check has not the same motion information.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

---

The variables offsetX and offsetY are derived as follows:

$$\text{offsetX} = (\text{ChromaArrayType} == 0) ? 0 : (\text{mvCLX}[0] \& 0x7 ? 2 : 0) \quad (8\text{-}104)$$

$$\text{offsetY} = (\text{ChromaArrayType} == 0) ? 0 : (\text{mvCLX}[1] \& 0x7 ? 2 : 0) \quad (8\text{-}105)$$

It is a requirement of bitstream conformance that when the reference picture is the current picture, the luma motion vector mvLX shall obey the following constraints:
- When the derivation process for z-scan order block availability as specified in clause 6.4.1 is invoked with ( xCurr, yCurr ) set equal to ( xCb, yCb ) and the neighbouring luma location ( xNbY, yNbY ) set equal to ( xPb + ( mvLX[ 0 ] >> 2 ) − offsetX, yPb + ( mvLX[ 1 ] >> 2 ) − offsetY ) as inputs, the output shall be equal to TRUE.
- When the derivation process for z-scan order block availability as specified in clause 6.4.1 is invoked with ( xCurr, yCurr ) set equal to ( xCb, yCb ) and the neighbouring luma location ( xNbY, yNbY ) set equal to ( xPb + ( mvLX[ 0 ] >> 2 ) + nPbW − 1 + offsetX, yPb + ( mvLX[ 1 ] >> 2 ) + nPbH − 1 + offsetY ) as inputs, the output shall be equal to TRUE.
- One or both of the following conditions shall be true:
   - The value of ( mvLX[ 0 ] >> 2 ) + nPbW + xB1 + offsetX is less than or equal to 0.
   - The value of ( mvLX[ 1 ] >> 2 ) + nPbH + yB1 + offsetY is less than or equal to 0.
- The following condition shall be true:

$$( xPb + ( \text{mvLX}[0] >> 2 ) + nPbSw - 1 + \text{offsetX} ) / \text{CtbSizeY} - xCb / \text{CtbSizeY} <= yCb/\text{CtbSizeY} - ( yPb + ( \text{mvLX}[1] >> 2 ) + nPbSh - 1 + \text{offsetY} ) / \text{CtbSizeY} \quad (8\text{-}106)$$

---

Thus, the case that the reference block overlaps with the current block or the reference block is outside of the picture will not happen. There is no need to pad the reference or prediction block.

2.3 IBC in VVC Test Model

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current coding unit (CU). Thus, there are totally three prediction modes, MODE_INTRA, MODE_INTER and MODE_IBC for each CU.

2.3.1 IBC Merge Mode

In IBC merge mode, an index pointing to an entry in the IBC merge candidates list is parsed from the bitstream. The When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.2 IBC AMVP Mode

In IBC advanced motion vector prediction (AMVP) mode, an AMVP index point to an entry in the IBC AMVP list is parsed from the bitstream. The construction of the IBC AMVP list can be summarized according to the following sequence of steps:
   Step 1: Derivation of spatial candidates
      Check $A_0$, $A_1$ until an available candidate is found.
      Check $B_0$, $B_1$, $B_2$ until an available candidate is found.

Step 2: Insertion of HMVP candidates

Step 3: Insertion of zero candidates

After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.4 Palette Mode

The basic idea behind a palette mode is that the samples in the CU are represented by a small set of representative colour values. This set is referred to as the palette. And it is also possible to indicate a sample that is outside the palette by signalling an escape symbol followed by (possibly quantized) component values. This kind of sample is called escape sample. The palette mode is illustrated in FIG. 2.

Figure 2:
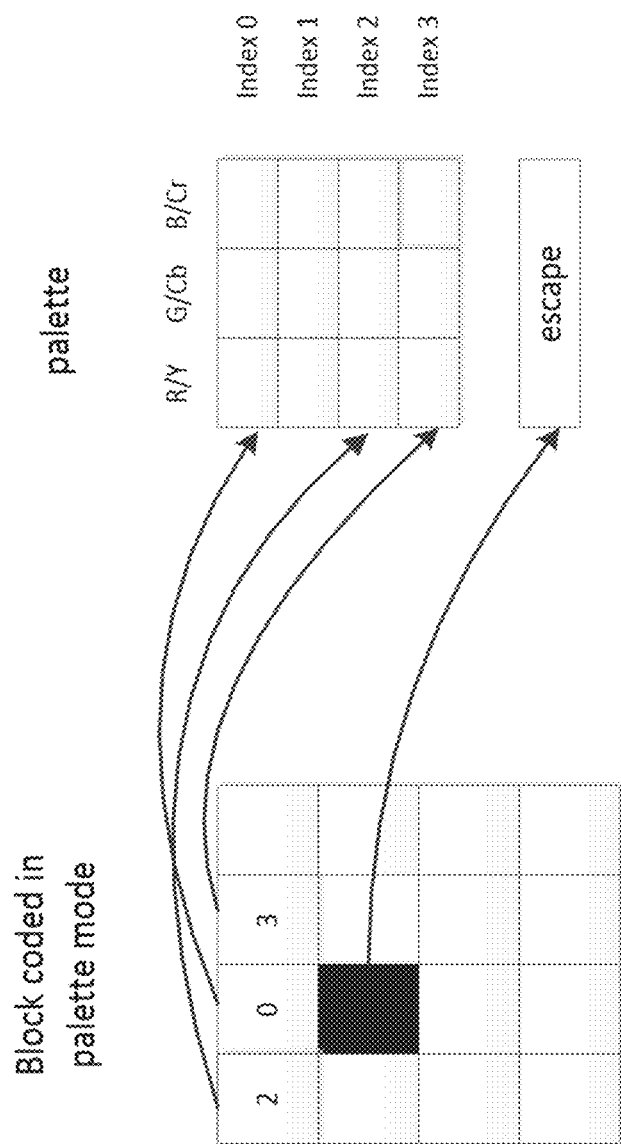
FIG. 2 shows an example of a block coded in palette mode.

FIG. 2 shows an example of a block coded in palette mode.

2.5 Palette Mode in HEVC Screen Content Coding Extensions (HEVC-SCC)

In the palette mode in HEVC-SCC, a predictive way is used to code the palette and index map.

2.5.1 Coding of the Palette Entries

For coding of the palette entries, a palette predictor is maintained. The maximum size of the palette as well as the palette predictor is signalled in the sequence parameter set (SPS). In HEVC-SCC, a palette_predictor_initializer_present_flag is introduced in the picture parameter set (PPS). When this flag is 1, entries for initializing the palette predictor are signalled in the bitstream. The palette predictor is initialized at the beginning of each coding tree unit (CTU) row, each slice and each tile. Depending on the value of the palette_predictor_initializer_present_flag, the palette predictor is reset to 0 or initialized using the palette predictor intializer entries signalled in the PPS. In HEVC-SCC, a palette predictor initializer of size 0 was enabled to allow explicit disabling of the palette predictor initialization at the PPS level.

Figure 3:
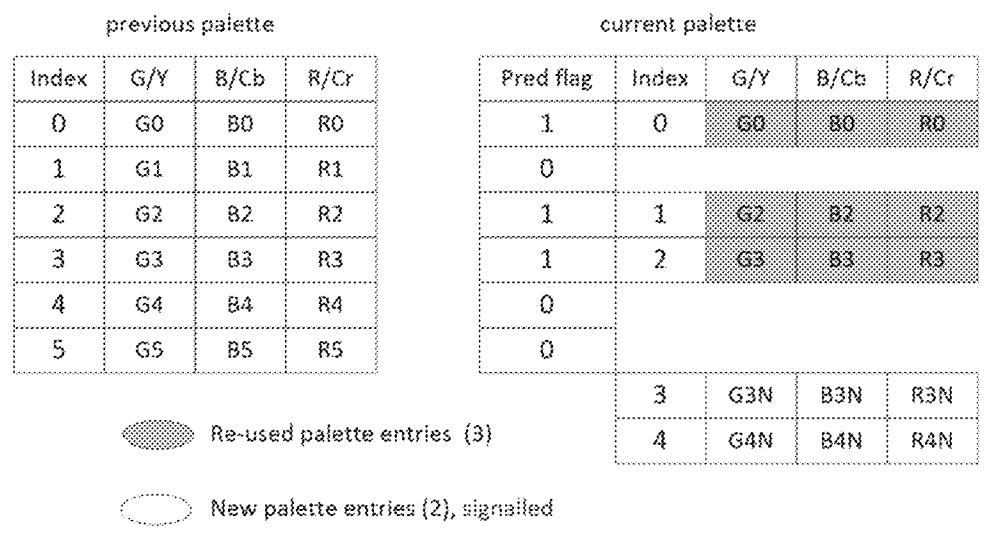

For each entry in the palette predictor, a reuse flag is signalled to indicate whether it is part of the current palette. This is illustrated in FIG. 3. The reuse flags are sent using run-length coding of zeros. After this, the number of new palette entries are signalled using exponential Golomb code of order 0. Finally, the component values for the new palette entries are signalled.

FIG. 3 shows an example of use of palette predictor to signal palette entries.

2.5.2 Coding of Palette Indices

Figure 4:
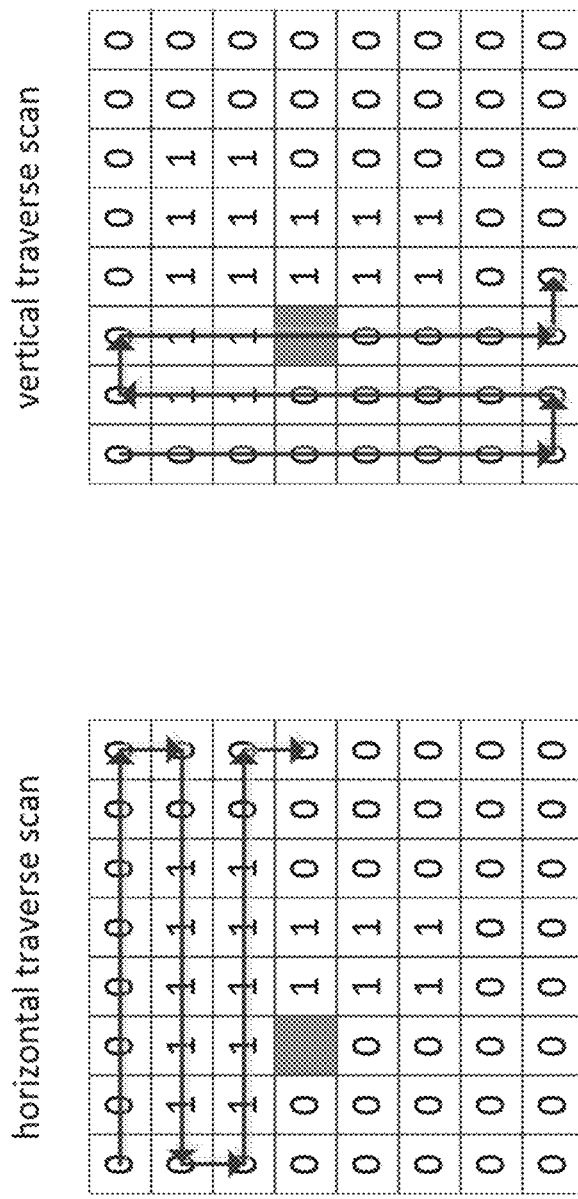
FIG. 4 shows an example of examples of Horizontal and vertical traverse scans.

The palette indices are coded using horizontal and vertical traverse scans as shown in FIG. 4. The scan order is explicitly signalled in the bitstream using the palette_transpose_flag. For the rest of the subsection it is assumed that the scan is horizontal.

FIG. 4 shows examples of horizontal and vertical traverse scans.

Figure 5:
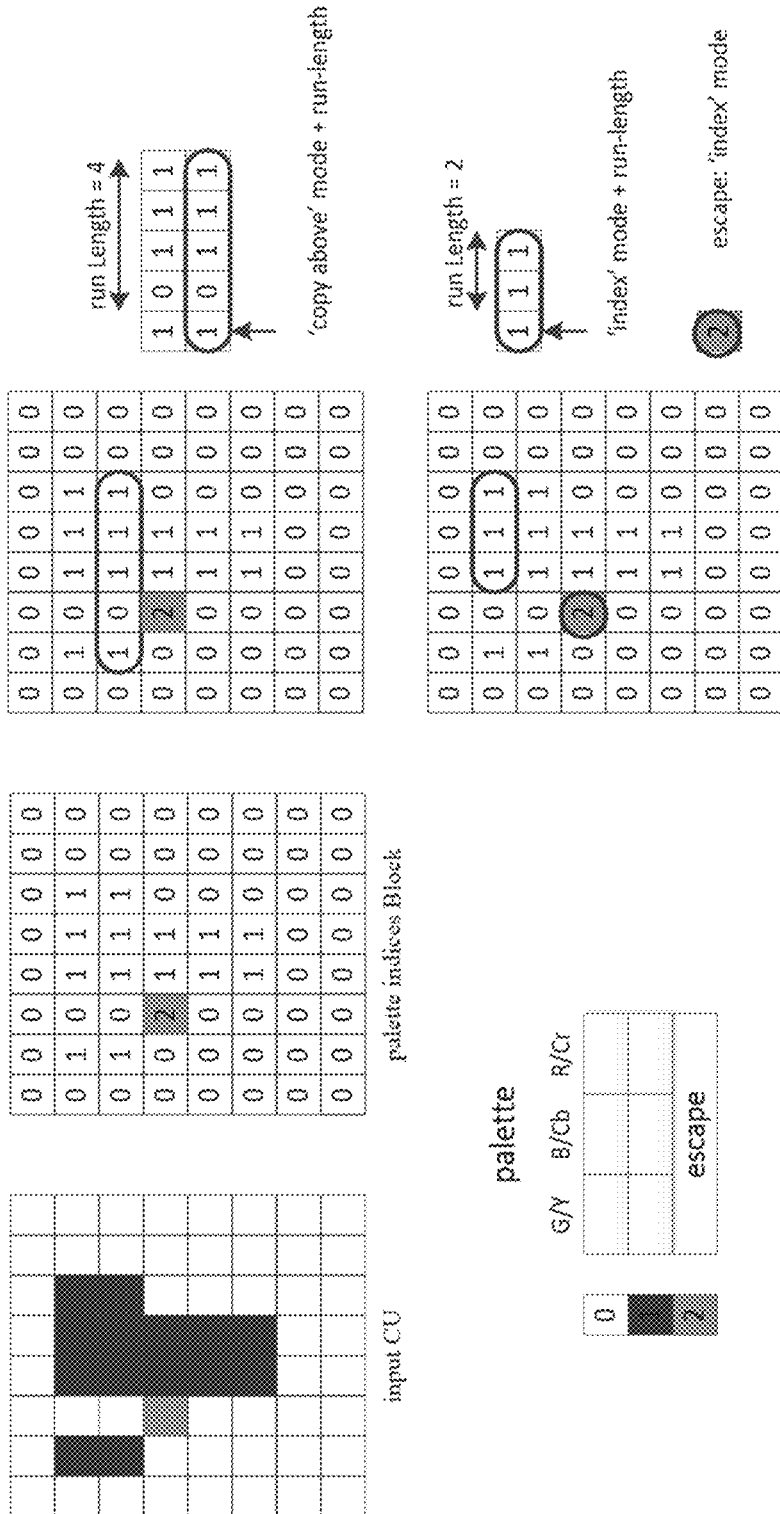
FIG. 5 shows examples of coding of palette indices.

The palette indices are coded using two main palette sample modes: 'INDEX' and 'COPY_ABOVE'. As explained previously, the escape symbol is also signalled as an 'INDEX' mode and assigned an index equal to the maximum palette size. The mode is signalled using a flag except for the top row or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number of subsequent samples that are also coded using the same mode. When escape symbol is part of the run in 'INDEX' or 'COPY_ABOVE' mode, the escape component values are signalled for each escape symbol. The coding of palette indices is illustrated in FIG. 5.

This syntax order is accomplished as follows. First the number of index values for the CU is signaled. This is followed by signaling of the actual index values for the entire CU using truncated binary coding. Both the number of indices as well as the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

In VVC, the dual tree coding structure is used on coding the intra slices, so the luma component and two chroma components may have different palette and palette indices. In addition, the two chroma component shares same palette and palette indices.

FIG. 5 shows examples of coding of palette indices.

2.6 Intra Mode Coding in VVC

To capture the arbitrary edge directions presented in natural video, the number of directional intra modes in VTM5 is extended from 33, as used in HEVC, to 65. The new directional modes not in HEVC are depicted as dotted arrows in FIG. 6 and the planar and direct current (DC) modes remain the same. These denser directional intra prediction modes apply for all block sizes and for both luma and chroma intra predictions.

In VTM5, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VTM5, blocks can have a rectangular shape that necessitates the use of a division operation per block in the general case. To avoid division operations for DC prediction, only the longer side is used to compute the average for non-square blocks.

Figure 6:
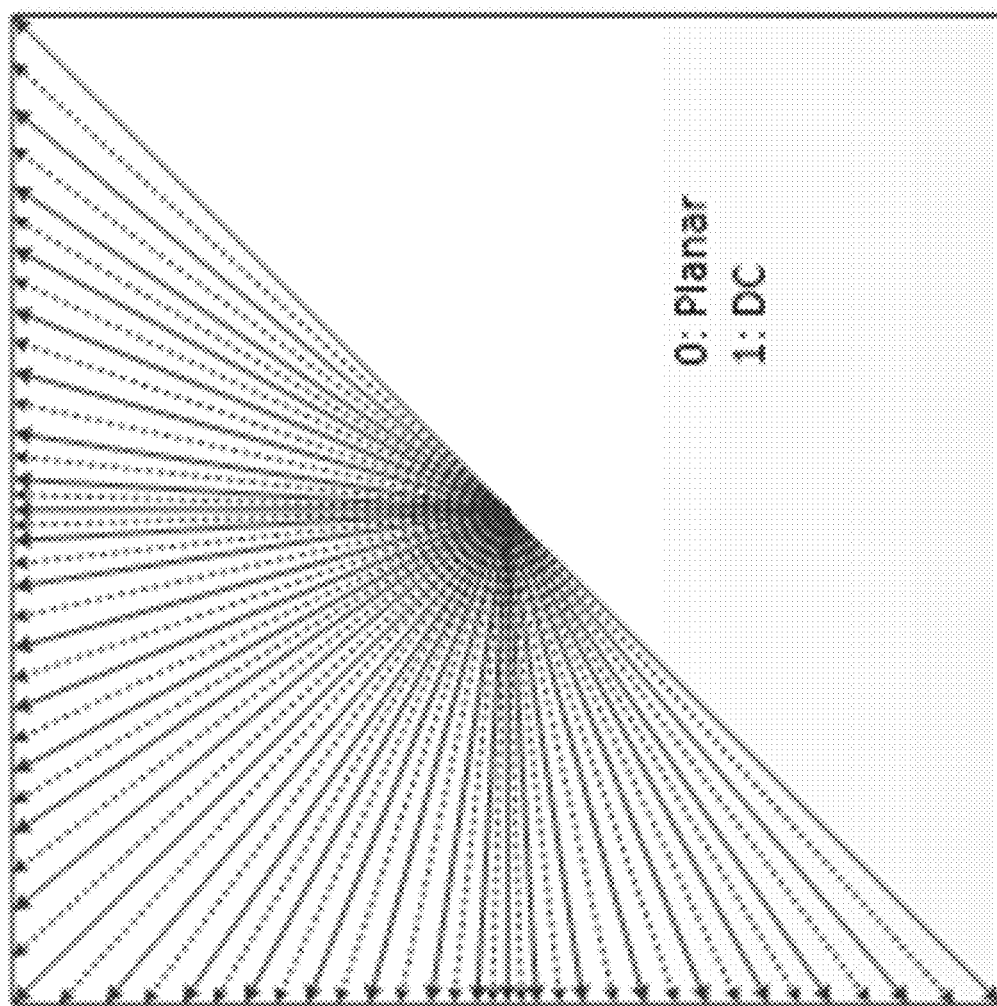
FIG. 6 shows an example of 67 intra prediction modes.

FIG. 6 shows an example of 67 intra prediction modes.

To keep the complexity of the most probable mode (MPM) list generation low, an intra mode coding method with 6 MPMs is used by considering two available neighboring intra modes. The following three aspects are considered to construct the MPM list:

Default intra modes
Neighbouring intra modes
Derived intra modes

Figure 7:
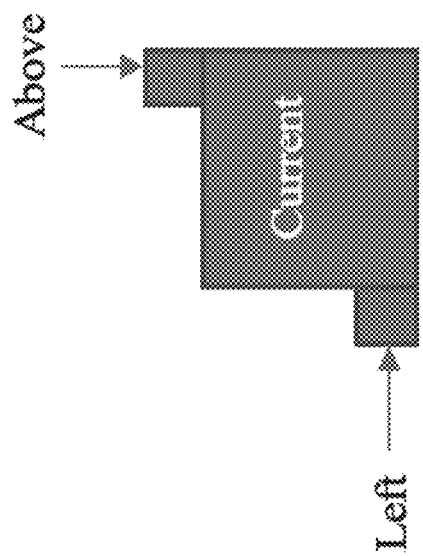
FIG. 7 shows examples of the left and above neighbors of the current block.

A unified 6-MPM list is used for intra blocks irrespective of whether multiple reference line (MRL) and intra sub-partitions (ISP) coding tools are applied or not. The MPM list is constructed based on intra modes of the left and above neighboring block. Suppose the mode of the left block is denoted as Left and the mode of the above block is denoted as Above, the unified MPM list is constructed as follows (The left and above blocks are shown in FIG. 7):

FIG. 7 is an example of the left and above neighbors of the current block.

When a neighboring block is not available, its intra mode is set to Planar by default.
If both modes Left and Above are non-angular modes:
  MPM list→{Planar, DC, V, H, V−4, V+4}
If one of modes Left and Above is angular mode, and the other is non-angular:
  Set a mode Max as the larger mode in Left and Above
  MPM list→{Planar, Max, DC, Max−1, Max+1, Max−2}
If Left and Above are both angular and they are different:
  Set a mode Max as the larger mode in Left and Above
  if the difference of mode Left and Above is in the range of 2 to 62, inclusive
    MPM list→{Planar, Left, Above, DC, Max−1, Max+1}
  Otherwise
    MPM list→{Planar, Left, Above, DC, Max−2, Max+2}
If Left and Above are both angular and they are the same:
  MPM list→{Planar, Left, Left−1, Left+1, DC, Left−2}

Besides, the first bin of the MPM index codeword is context-adaptive binary arithmetic coding (CABAC) context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 2-. Chroma mode coding directly depends on the intra prediction mode of the corresponding luma block. Since separate block partitioning structure for luma and chroma components is enabled in I slices, one chroma block may correspond to multiple luma blocks. Therefore, for Chroma direct mode (DM), the intra prediction mode of the corresponding luma block covering the center position of the current chroma block is directly inherited.

TABLE 2-4

Derivation of chroma prediction mode from luma mode when cclm_is enabled

| Chroma prediction mode | Corresponding luma intra prediction mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

2.7 Quantized Residual Block Differential Pulse-Code Modulation (QR-BDPCM)

In JVET-M0413, a quantized residual block differential pulse-code modulation (QR-BDPCM) is proposed to code screen contents efficiently.

The prediction directions used in Quantized Residual Block Differential Pulse Code Modulation (QR-BDPCM) can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let Q $(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical Block Differential Pulse Code Modulation (BDPCM) is signalled:

$$\tilde{r}_{i,j} = \begin{cases} Q(r_{i,j}), & i = 0, 0 \leq j \leq (N-1) \\ Q(r_{i,j}) - Q(r_{(i-1),j}), & 1 \leq i \leq (M-1), 0 \leq j \leq (N-1) \end{cases} \quad (2\text{-}7\text{-}1)$$

For horizontal prediction, similar rules apply, and the residual quantized samples are obtained by $$\tilde{r}_{i,j} = \begin{cases} Q(r_{i,j}), & 0 \leq i \leq (M-1), j = 0 \\ Q(r_{i,j}) - Q(r_{i,(j-1)}), & 0 \leq i \leq (M-1), 1 \leq j \leq (N-1) \end{cases} \quad (2\text{-}7\text{-}2)$$

The residual quantized samples $\tilde{r}_{i,j}$ are sent to the decoder. On the decoder side, the above calculations are reversed to produce $Q(r_{i,j})$, $0 \leq i \leq M-1$, $0 \leq j \leq N-1$. For vertical prediction case, $$Q(r_{i,j}) = \Sigma_{k=0}^{i} \tilde{r}_{k,j}, 0 \leq i \leq (M-1), 0 \leq j \leq (N-1) \quad (2\text{-}7\text{-}3)$$

For horizontal case, $$Q(r_{i,j}) = \Sigma_{k=0}^{j} \tilde{r}_{i,k}, 0 \leq i \leq (M-1), 0 \leq j \leq (N-1) \quad (2\text{-}7\text{-}4)$$

The inverse quantized residuals, $Q^{-1}$ $(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

2.8 Adaptive Loop Filter

In the VTM5, an Adaptive Loop Filter (ALF) with block-based filter adaption is applied. For the luma component, one among 25 filters is selected for each 4×4 block, based on the direction and activity of local gradients.

2.8.1.1 Filter Shape

Figure 8:
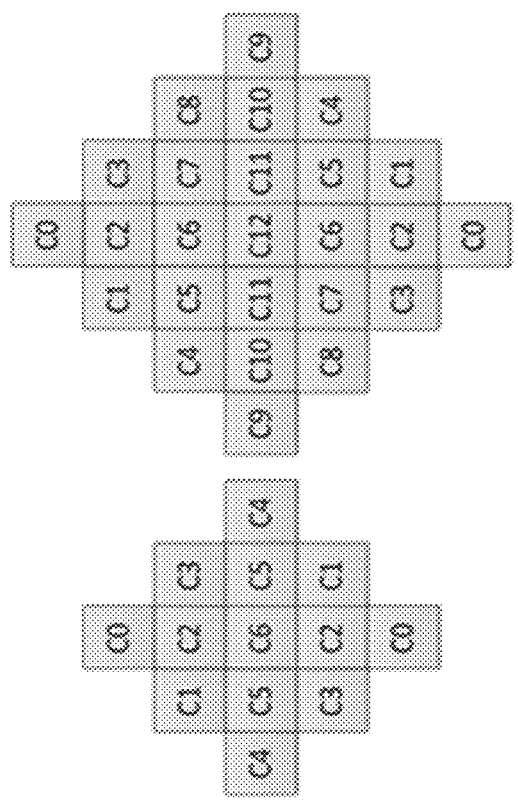
FIG. 8 shows examples of adaptive loop filter (ALF) filter shapes (chroma: 5×5 diamond, luma: 7×7 diamond).

In the VTM5, two diamond filter shapes (as shown in FIG. 8) are used. The 7×7 diamond shape is applied for luma component and the 5×5 diamond shape is applied for chroma components.

FIG. 8 shows examples of ALF filter shapes (chroma: 5×5 diamond, luma: 7×7 diamond)

2.8.1.2 Block Classification

For luma component, each 4×4 block is categorized into one out of 25 classes. The classification index C is derived based on its directionality D and a quantized value of activity $\hat{A}$, as follows:

$$C = 5D + \hat{A} \tag{2-9-1}$$

To calculate D and $\hat{A}$, gradients of the horizontal, vertical and two diagonal direction are first calculated using 1-D Laplacian:

$$g_v = \Sigma_{k=i-2}^{i+3} \Sigma_{l=j-2}^{j+3} V_{k,l}, V_{k,l} = |2R(k,l) - R(k,l-1) - R(k,l+1)| \tag{2-9-2}$$

$$g_h = \Sigma_{k=i-2}^{i+3} \Sigma_{l=j-2}^{j+3} H_{k,l}, H_{k,l} = |2R(k,l) - R(k-1,l) - R(k+1,l)| \tag{2-1}$$

$$g_{d1} = \Sigma_{k=i-2}^{i+3} \Sigma_{l=j-2}^{j+3} D1_{k,l}, D1_{k,l} = |2R(k,l) - R(k-1,l-1) - R(k+1,l+1)| \tag{2-9-4}$$

$$g_{d2} = \Sigma_{k=i-2}^{i+3} \Sigma_{l=j-2}^{j+3} D2_{k,l}, D2_{k,l} = |2R(k,l) - R(k-1,l+1) - R(k+1,l-1)| \tag{2-9-5}$$

Where indices i and j refer to the coordinates of the upper left sample within the 4×4 block and R(i,j) indicates a reconstructed sample at coordinate (i,j).

Figure 9:
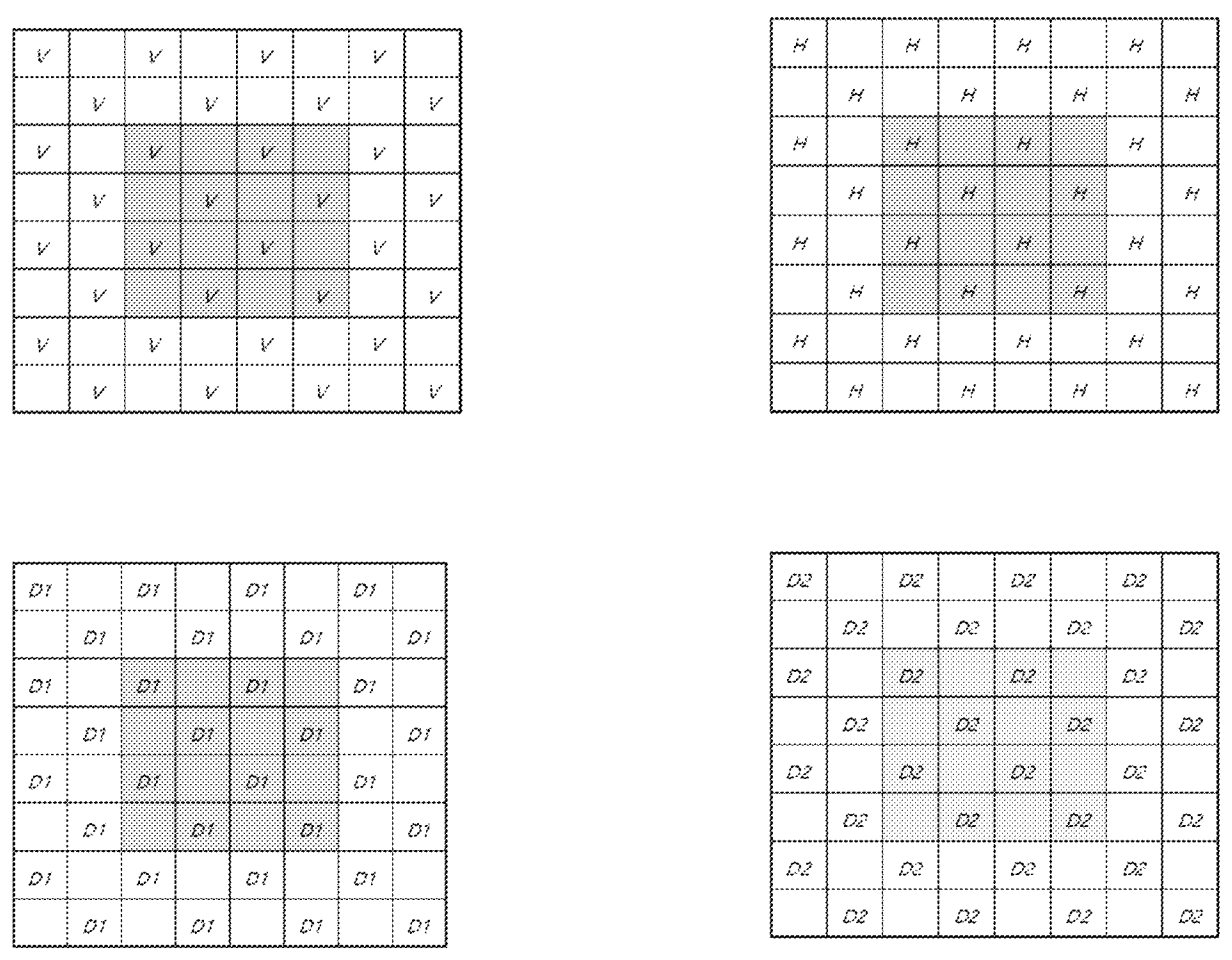

To reduce the complexity of block classification, the subsampled 1-D Laplacian calculation is applied. As shown in FIG. 9 the same subsampled positions are used for gradient calculation of all directions.

FIG. 9 shows an example of subsampled Laplacian calculation. (a) Subsampled positions for vertical gradient (b) Subsampled positions for horizontal gradient (c) Subsampled positions for diagonal gradient (d) Subsampled positions for diagonal gradient.

Then D maximum and minimum values of the gradients of horizontal and vertical directions are set as:

$$g_{h,v}^{max} = \max(g_h, g_v), g_{h,v}^{min} = \min(g_h, g_v) \tag{2-9-6}$$

The maximum and minimum values of the gradient of two diagonal directions are set as:

$$g_{d0,d1}^{max} = \max(g_{d0}, g_{d1}), g_{d0,d1}^{min} = \min(g_{d0}, g_{d1}) \tag{2-9-7}$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{h,v}^{max}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \Sigma_{k=i-2}^{i+3} \Sigma_{l=j-2}^{j+3} (V_{k,l} + H_{k,l}) \tag{2-9-8}$$

A is further quantized to the range of 0 to 4, inclusively, and the quantized value is denoted as $\hat{A}$.

For chroma components in a picture, no classification method is applied, i.e. a single set of ALF coefficients is applied for each chroma component.

2.8.1.3 Geometric Transformations of Filter Coefficients and Clipping Values

Before filtering each 4×4 luma block, geometric transformations such as rotation or diagonal and vertical flipping are applied to the filter coefficients f(k, l) and to the corresponding filter clipping values c(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

$$\text{Diagonal: } f_D(k,l) = f(l,k), c_D(k,l) = c(l,k), \tag{2-9-9}$$

$$\text{Vertical flip: } f_V(k,l) = f(k,K-l-1), c_V(k,l) = c(k,K-l-1) \tag{2-9-10}$$

$$\text{Rotation: } f_R(k,l) = f(K-l-1,k), c_R(k,l) = c(K-l-1,k) \tag{2-9-11}$$

where K is the size of the filter and $0 \leq k, l \leq K-1$ are coefficients coordinates, such that location (0,0) is at the upper left corner and location (K−1, K−1) is at the lower right corner. The transformations are applied to the filter coefficients f(k, l) and to the clipping values c(k, l) depending on gradient values calculated for that block. The relationship between the transformation and the four gradients of the four directions are summarized in the following table.

TABLE 2-5

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.8.1.4 Filter Parameters Signalling

In the VTM5, ALF filter parameters are signalled in Adaptation Parameter Set (APS). In one APS, up to 25 sets of luma filter coefficients and clipping value indexes, and up to one set of chroma filter coefficients and clipping value indexes could be signalled. To reduce bits overhead, filter coefficients of different classification can be merged. In slice header, the indices of the APSs used for the current slice are signalled.

Clipping value indexes, which are decoded from the APS, allow determining clipping values using a Luma table of clipping values and a Chroma table of clipping values. These clipping values are dependent of the internal bitdepth. More precisely, the Luma table of clipping values and Chroma table of clipping values are obtained by the following formulas:

$$AlfClip_L = \left\{ \text{round}\left(2^{B\frac{N-n+1}{N}}\right) \text{for } n \in [1 \ldots N] \right\}, \tag{2-9-12}$$

$$AlfClip_C = \left\{ \text{round}\left(2^{(B-8)+8\frac{(N-n)}{N-1}}\right) \text{for } n \in [1 \ldots N] \right\} \tag{2-9-13}$$

with B equal to the internal bitdepth and N equal to 4 which is the number of allowed clipping values in VTM5.0.

The filtering process can be controlled at coding tree block (CTB) level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

The filter coefficients are quantized with norm equal to 128. In order to restrict the multiplication complexity, a bitstream conformance is applied so that the coefficient value of the non-central position shall be in the range of $-2^7$ to $2^7-1$, inclusive. The central position coefficient is not signalled in the bitstream and is considered as equal to 128.

2.8.1.5 Filtering Process

At decoder side, when ALF is enabled for a CTB, each sample R(i,j) within the CU is filtered, resulting in sample value R'(i,j) as shown below, $$R'(i,j)=R(i,j)+((\Sigma_{k\neq 0}\Sigma_{l\neq 0}f(k,l)\times K(R(i+k,j+l)-R(i,j),c(k,l))+64)>>7) \qquad (2\text{-}9\text{-}14)$$

where f(k, l) denotes the decoded filter coefficients, K(x,y) is the clipping function and c(k, l) denotes the decoded clipping parameters. The variable k and l varies between $$-\frac{L}{2} \text{ and } \frac{L}{2}$$

where L denotes the filter length. The clipping function K(x, y)=min(y, max(−y, x)) which corresponds to the function Clip3 (−y, y, x).

2.8.1.6 Virtual Boundary Filtering Process for Line Buffer Reduction

In VTM5, to reduce the line buffer requirement of ALF, modified block classification and filtering are employed for the samples near horizontal CTU boundaries. For this purpose, a virtual boundary is defined as a line by shifting the horizontal CTU boundary with "N" samples as shown in FIG. 10 with N equal to 4 for the Luma component and 2 for the Chroma component.

Figure 10:
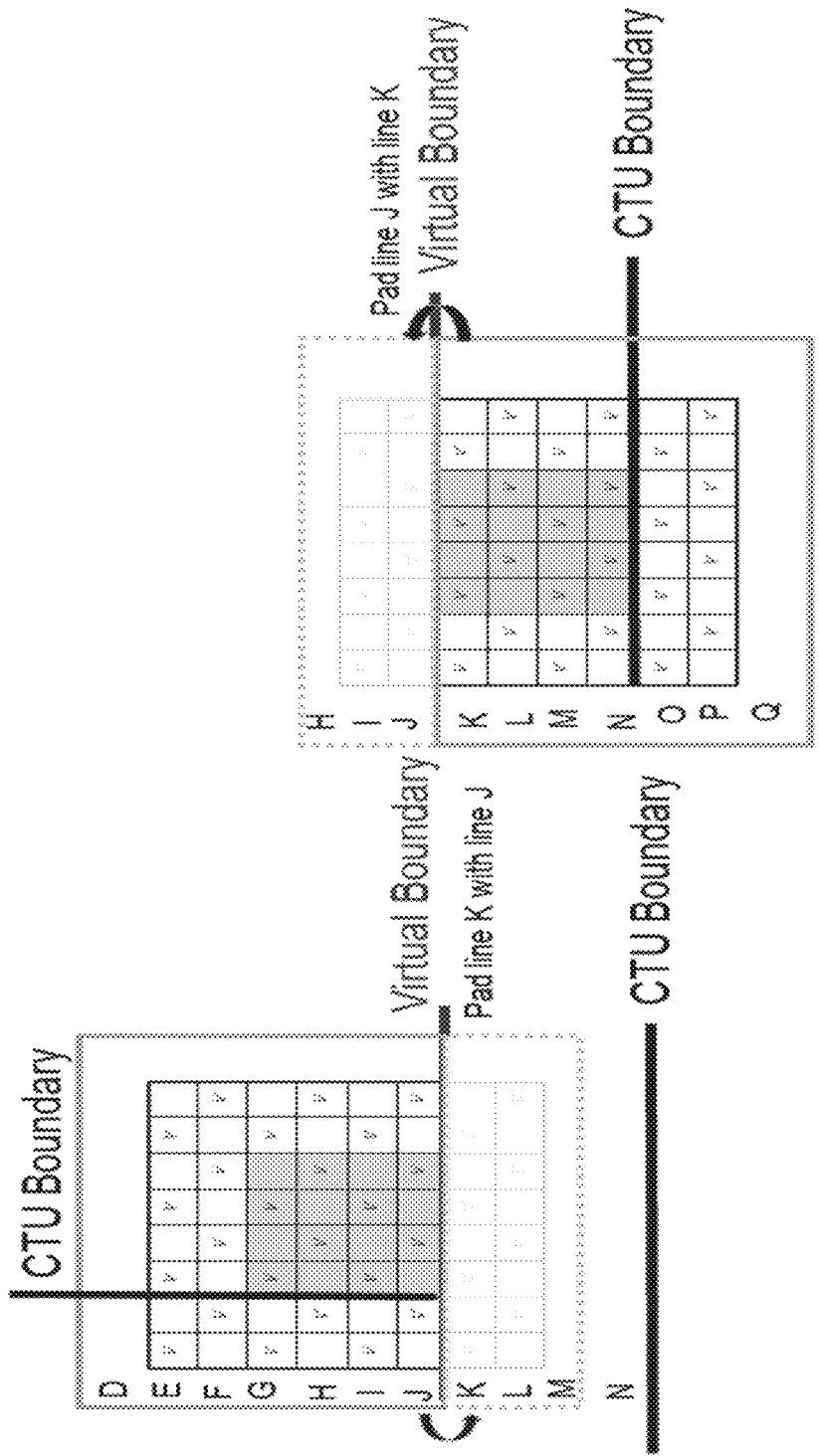
FIG. 10 shows an example of a modified block classification at virtual boundaries.

FIG. 10 shows an example of a modified block classification at virtual boundaries.

Figure 11:
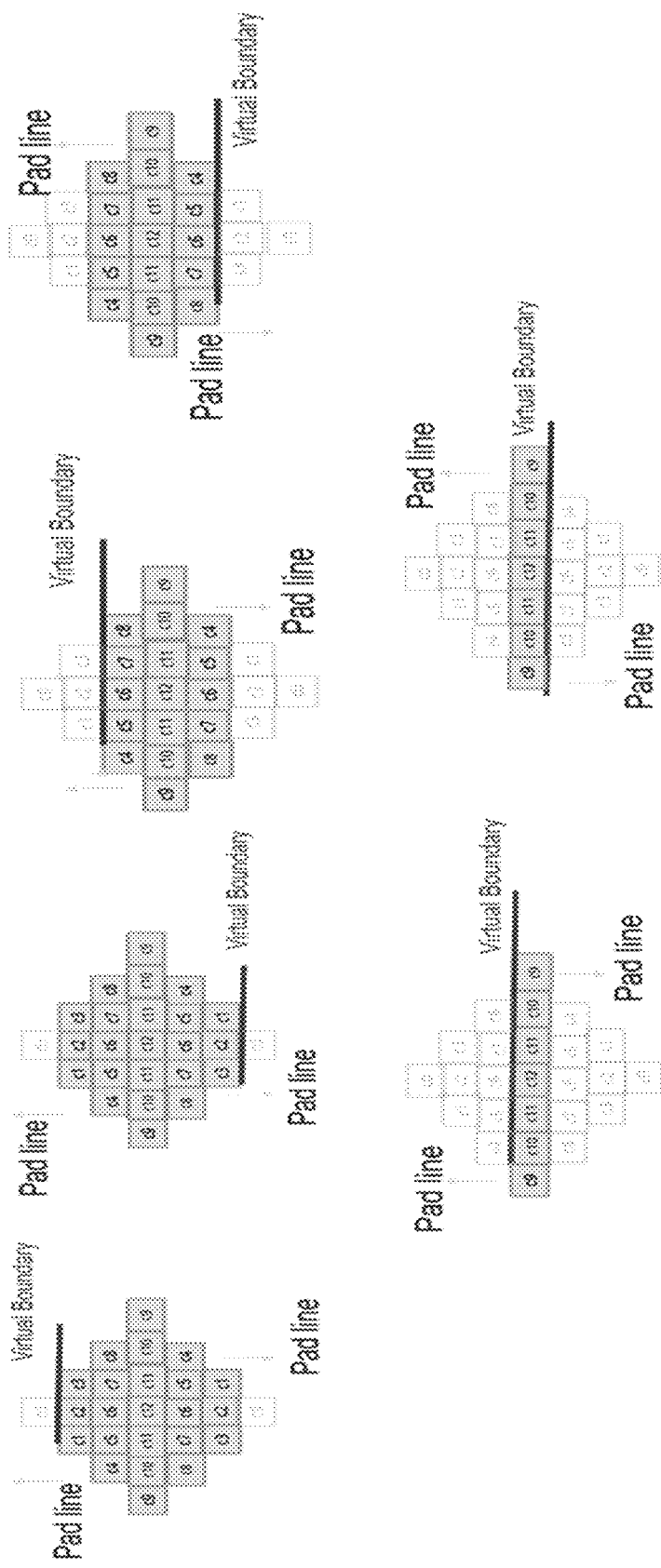
FIG. 11 is an example illustration of modified ALF filtering for luma component at virtual boundaries.

Modified block classification is applied for the Luma component as depicted in FIG. 11 activity value A is accordingly scaled by taking into account the reduced number of samples used in 1-D Laplacian gradient calculation.

For filtering processing, symmetric padding operation at the virtual boundaries are used for both Luma and Chroma components. As shown in FIG. 11, when the sample being filtered is located below the virtual boundary, the neighboring samples that are located above the virtual boundary are padded. Meanwhile, the corresponding samples at the other sides are also padded, symmetrically.

FIG. 11 shows examples of modified ALF filtering for Luma component at virtual boundaries.

2.9 Sample Adaptive Offset (SAO)

Sample adaptive offset (SAO) is applied to the reconstructed signal after the deblocking filter by using offsets specified for each CTB by the encoder. The HEVC test model (HM) encoder first makes the decision on whether or not the SAO process is to be applied for current slice. If SAO is applied for the slice, each CTB is classified as one of five SAO types as shown in Table 2-. The concept of SAO is to classify pixels into categories and reduces the distortion by adding an offset to pixels of each category. SAO operation includes Edge Offset (EO) which uses edge properties for pixel classification in SAO type 1-4 and Band Offset (BO) which uses pixel intensity for pixel classification in SAO type 5. Each applicable CTB has SAO parameters including sao_merge_left_flag, sao_merge_up_flag, SAO type and four offsets. If sao_merge_left_flag is equal to 1, the current CTB will reuse the SAO type and offsets of the CTB to the left. If sao_merge_up_flag is equal to 1, the current CTB will reuse SAO type and offsets of the CTB above.

TABLE 2-6

Specification of SAO type

| SAO type | sample adaptive offset type to be used | Number of categories |
|---|---|---|
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | band offset | 4 |

2.9.1 Operation of Each SAO Type

Figure 12:
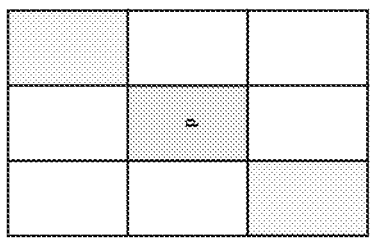
FIG. 12 shows examples of four one dimensional (1-D) 3-pixel patterns for the pixel classification in edge offset (EO).
Figure 12:
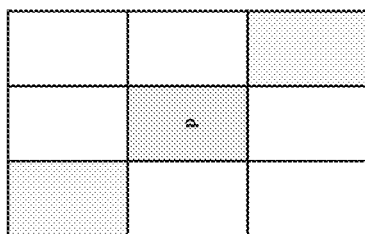
Figure 12:
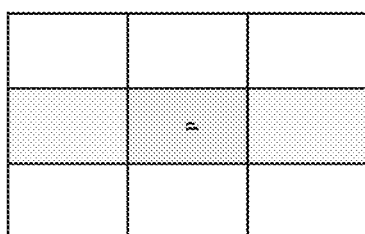
Figure 12:
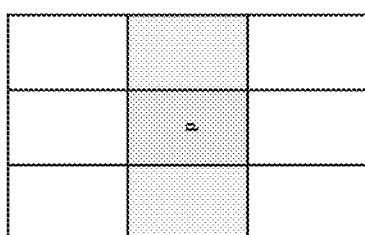

Edge offset uses four 1-D 3-pixel patterns for classification ofthe current pixel p by consideration of edge directional information, as shown in FIG. 12. From left to right these are: 0-degree, 90-degree, 135-degree and 45-degree.

FIG. 12 shows examples of our 1-D 3-pixel patterns for the pixel classification in E.

Each CTB is classified into one of five categories according to Table 2-7.

TABLE 2-7

Pixel classification rule for EO

| Category | Condition | Meaning |
|---|---|---|
| 0 | None of the below | Largely monotonic |
| 1 | p < 2 neighbours | Local minimum |
| 2 | p < 1 neighbour && p == 1 neighbour | Edge |
| 3 | p > 1 neighbour && p == 1 neighbour | Edge |
| 4 | p > 2 neighbours | Local maximum |

Figure 13:
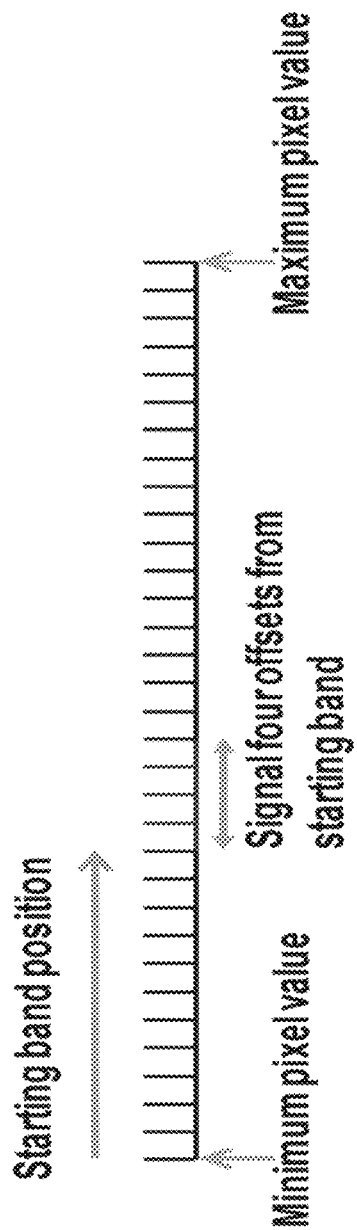
FIG. 13 four bands are grouped together and represented by its starting band position.

Band offset (BO) classifies all pixels in one CTB region into 32 uniform bands by using the five most significant bits of the pixel value as the band index. In other words, the pixel intensity range is divided into 32 equal segments from zero to the maximum intensity value (e.g., 255 for 8-bit pixels). Four adjacent bands are grouped together and each group is indicated by its most left-hand position as shown in FIG. 13. The encoder searches all position to get the group with the maximum distortion reduction by compensating offset of each band.

FIG. 13 shows an example of four bands are grouped together and represented by its starting band position 2.10 Combined Inter and Intra Prediction (CIIP)

In VTM5, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in FIG. 14) as follows:

If the top neighbor is available and intra coded, then set isIntraTop to 1, otherwise set isIntraTop to 0;
If the left neighbor is available and intra coded, then set isIntraLeft to 1, otherwise set isIntraLeft to 0;
If (isIntraLeft+isIntraLeft) is equal to 2, then wt is set to 3;
Otherwise, if (isIntraLeft+isIntraLeft) is equal to 1, then wt is set to 2;
Otherwise, set wt to 1.

The CIIP prediction is formed as follows:

$$P_{CIIP}=((4-wt)*P_{inter}+wt*P_{intra}+2)>>2 \quad (3\text{-}2)$$

Figure 14:
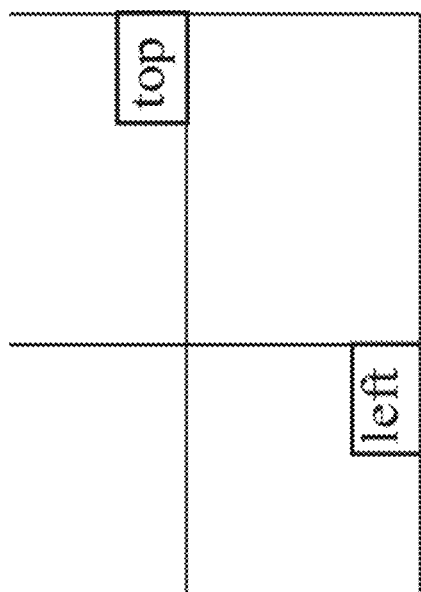
FIG. 14 top and left neighboring blocks used in Combined Inter-Intra Prediction (CIIP) weight derivation.

FIG. 14 shows examples of Top and left neighboring blocks used in CIIP weight derivation 2.11 Luma Mapping with Chroma Scaling (LMCS)

Figure 15:
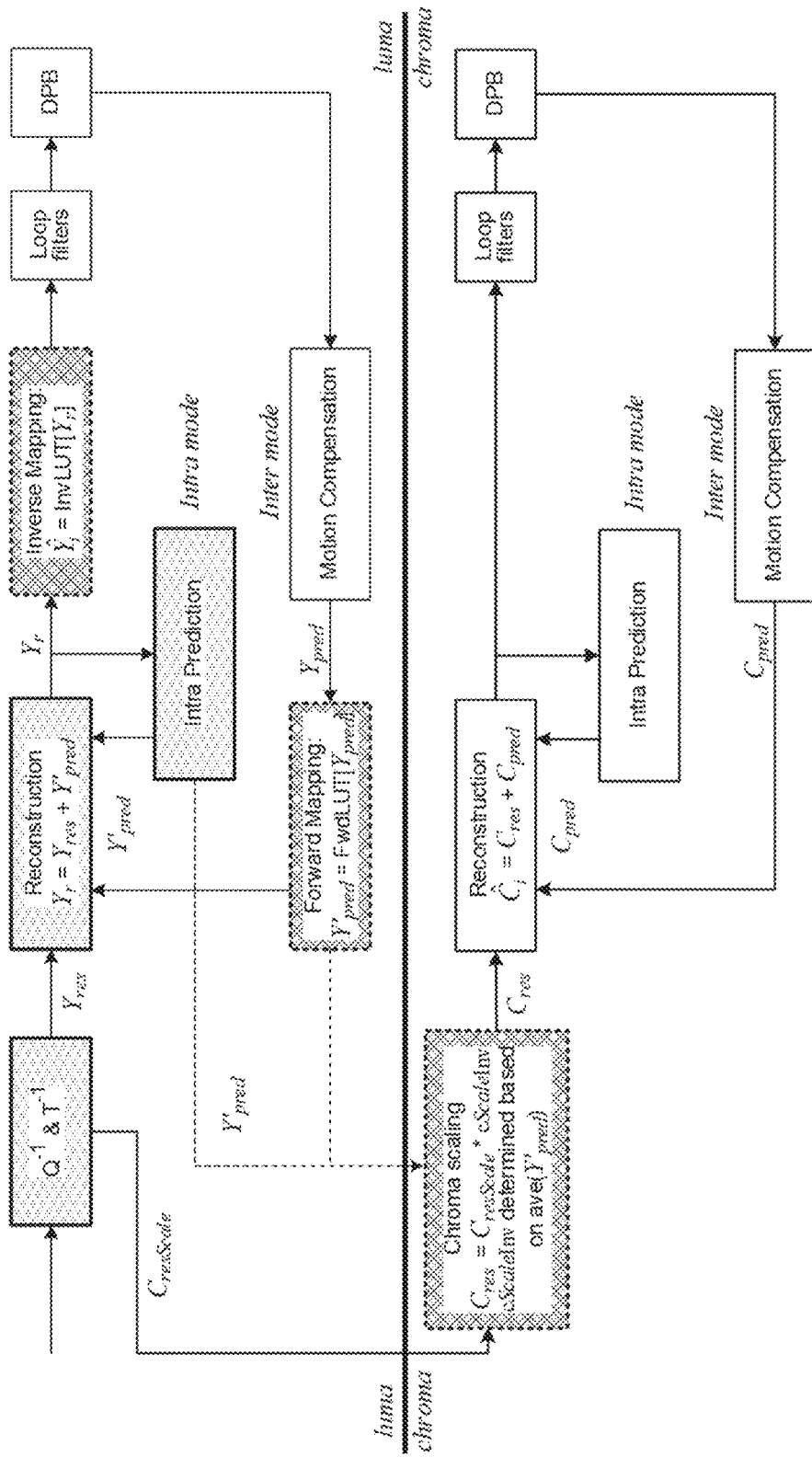
FIG. 15 shows luma mapping with chroma scaling architecture.

In VTM5, a coding tool called the luma mapping with chroma scaling (LMCS) is added as a new processing block before the loop filters. LMCS has two main components: 1) in-loop mapping of the luma component based on adaptive piecewise linear models; 2) for the chroma components, luma-dependent chroma residual scaling is applied. FIG. 15 shows the LMCS architecture from decoder's perspective. The dotted blocks in FIG. 15 indicate where the processing is applied in the mapped domain; and these include the inverse quantization, inverse transform, luma intra prediction and adding of the luma prediction together with the luma residual. The unpatterned blocks in FIG. 15 indicate where the processing is applied in the original (i.e., non-mapped) domain; and these include loop filters such as deblocking, ALF, and SAO, motion compensated prediction, chroma intra prediction, adding of the chroma prediction together with the chroma residual, and storage of decoded pictures as reference pictures. The checkered blocks in FIG. 15 are the new LMCS functional blocks, including forward and inverse mapping of the luma signal and a luma-dependent chroma scaling process. Like most other tools in VVC, LMCS can be enabled/disabled at the sequence level using an SPS flag.

FIG. 15 shows examples of Luma mapping with chroma scaling architecture.

2.12 Dualtree Partitioning

In the current VVC design, for I slices, each CTU can be split into coding units with 64×64 luma samples using an implicit quadtree split and that these coding units are the root of two separate coding_tree syntax structure for luma and chroma.

Since the dual tree in intra picture allows to apply different partitioning in the chroma coding tree compared to the luma coding tree, the dual tree introduces longer coding pipeline and the QTBT MinQTSizeC value range and MinBtSizeY and MinTTSizeY in chroma tree allow small chroma blocks such as 2×2, 4×2, and 2×4. It provides difficulties in practical decoder design. Moreover, several prediction modes such as CCLM, planar and angular mode needs multiplication. In order to alleviate the above-mentioned issues, small chroma block sizes (2×2/2×4/4×2) are restricted in dual tree as a partitioning restriction.

2.13 Smallest Chroma Intra Prediction Unit (SCIPU) in JVET-O0050

Small chroma size is not friendly to hardware implementation. In dualtree cases, chroma blocks with too small sizes are disallowed. However, in singletree cases, VVC draft 5 still allows 2×2, 2×4, 4×2 chroma blocks. To restrict the size of chroma block, in single coding tree, a SCIPU is defined in JVET-O0050 as a coding tree node whose chroma block size is larger than or equal to TH chroma samples and has at least one child luma block smaller than 4TH luma samples, where TH is set to 16 in this contribution. It is required that in each SCIPU, all coding blocks (CBs) are inter, or all CBs are non-inter, i.e., either intra or IBC. In case of a non-inter SCIPU, it is further required that chroma of the non-inter SCIPU shall not be further split and luma of the SCIPU is allowed to be further split. In this way, the smallest chroma intra CB size is 16 chroma samples, and 2×2, 2×4, and 4×2 chroma CBs are removed. In addition, chroma scaling is not applied in case of a non-inter SCIPU.

Figure 16:
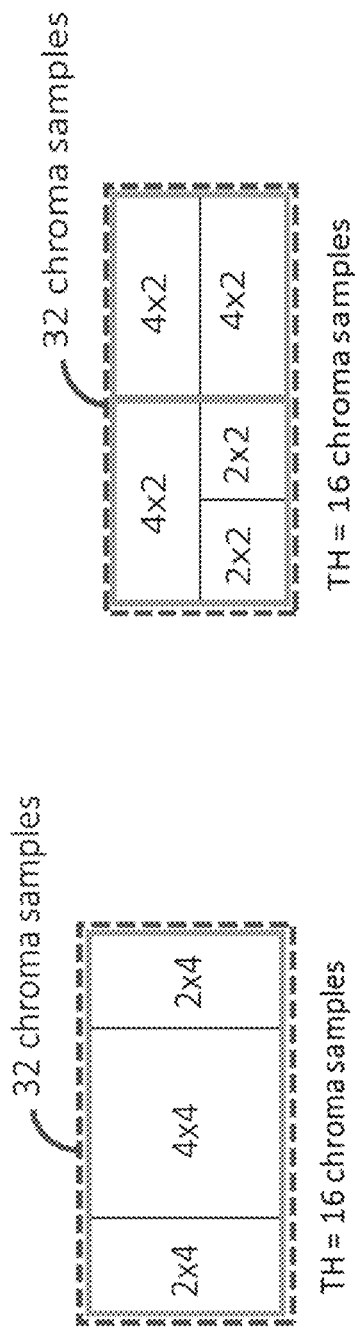
FIG. 16 shows examples of smallest chroma intra prediction unit (SCIPU).

Two SCIPU examples are shown in FIG. 16. In FIG. 16(a), one chroma CB of 8×4 chroma samples and three luma CBs (4×8, 8×8, 4×8 luma CBs) form one SCIPU because the ternary tree (TT) split from the 8×4 chroma samples would result in chroma CBs smaller than 16 chroma samples. In FIG. 16(b), one chroma CB of 4×4 chroma samples (the left side of the 8×4 chroma samples) and three luma CBs (8×4, 4×4, 4×4 luma CBs) form one SCIPU, and the other one chroma CB of 4×4 samples (the right side of the 8×4 chroma samples) and two luma CBs (8×4, 8×4 luma CBs) form one SCIPU because the binary tree (BT) split from the 4×4 chroma samples would result in chroma CBs smaller than 16 chroma samples.

FIG. 16 shows SCIPU examples.

The type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one signalled flag before parsing the CUs in the SCIPU.

2.14 Small Chroma Block Constrains in VVC Draft 6

In VVC draft 6 (JVET-O2001-vE.docx), the constrains on small chroma blocks are implemented as follows (related part is marked in *boldface italics*).

| coding_tree( x0, y0, cbWidth, cbHeight, qgOnY, qgOnC, cbSubdiv, cqtDepth, mttDepth, depthOffset, partIdx, *treeTypeCurr modeTypeCurr* ) { | Descriptor |
|---|---|
| ... | |
|   if( split_cu_flag ) { | |
|     if( ( allowSplitBtVer \|\| allowSplitBtHor \|\| allowSplitTtVer \|\| allowSplitTtHor ) && allowSplitQT ) | |
|       split_qt_flag | ae(v) |
|     if( !split_qt_flag ) { | |
|       if( ( allowSplitBtHor \|\| allowSplitTtHor ) && ( allowSplitBtVer \|\| allowSplitTtVer ) ) | |
|         mtt_split_cu_vertical_flag | ae(v) |
|       if( ( allowSplitBtVer && allowSplitTtVer && | |

-continued

```
coding_tree( x0, y0, cbWidth, cbHeight, qgOnY, qgOnC, cbSubdiv, cqtDepth,                 Descriptor
    mttDepth, depthOffset, partIdx, treeTypeCurr modeTypeCurr ) {
                mtt_split_cu_vertical_flag                                )                 ||
            (       allowSplitBtHor         &&         allowSplitTtHor
    && !mtt_split_cu_vertical_flag ) )
                        mtt_split_cu_binary_flag                                          ae(v)
        }
        if( modeTypeCondition == 1 )
            modeType = MODE_TYPE_INTRA
        else if(modeTypeCondition == 2 ) {
            mode_constraint_flag                                                           ae(v)
        modeType = mode_constraint_flag ?MODE_TYPE_INTRA: MODE_TYPE_INTE
    R
        } else {
            modeType = modeTypeCurr
        }
        treeType = ( modeType ==
    MODE_TYPE_INTRA ) ?DUAL_TREE_LUMA: treeTypeCurr
        if( !split_qt_flag ) {
            if( MttSplitMode[ x0 ] [ y0 ] [ mttDepth ] == SPLIT_BT_VER ) {
    depthOffset += ( x0 + cbWidth > pic_width_in_luma_samples ) ? 1 : 0
                    x1 = x0 + ( cbWidth / 2 )
                    coding_tree( x0, y0, cbWidth / 2, cbHeight, qgOnY, qgOnC,
    cbSubdiv + 1,
        cqtDepth, mttDepth + 1, depthOffset, 0, treeType, modeType )
                    if( x1 < pic_width_in_luma_samples )
    coding_tree( x1, y0, cbWidth / 2, cbHeightY, qgOnY, qgOnC,            cbSubdiv + 1,
        cqtDepth, mttDepth + 1, depthOffset, 1, treeType, modeType )
            } else if( MttSplitMode[ x0 ] [ y0 ] [ mttDepth ] == SPLIT_BT_HOR ) {
    depthOffset += ( y0 + cbHeight > pic_height_in_luma_samples ) ? 1 : 0
                    y1 = y0 + ( cbHeight / 2 )
                    coding_tree( x0, y0, cbWidth, cbHeight / 2, qgOnY, qgOnC,
    cbSubdiv + 1,
        cqtDepth, mttDepth + 1, depthOffset, 0, treeType, modeType )
                    if( y1 < pic_height_in_luma_samples )
    coding_tree( x0, y1, cbWidth, cbHeight / 2, qgOnY, qgOnC,            cbSubdiv + 1,
        cqtDepth, mttDepth + 1, depthOffset, 1, treeType, modeType )
            } else if( MttSplitMode[ x0 ] [ y0 ] [ mttDepth ] == SPLIT_TT_VER ) {
                    x1 = x0 + (cbWidth / 4 )
                    x2 = x0 + ( 3 * cbWidth / 4 )
                    qgOnY = qgOnY && ( cbSubdiv + 2 <= cu_qp_delta_subdiv )
                    qgOnC = qgOnC &&     (    cbSubdiv + 2        <=
    cu_chroma_qp_offset_subdiv )
                    coding_tree( x0, y0, cbWidth / 4, cbHeight, qgOnY, qgOnC,
    cbSubdiv + 2,
        cqtDepth, mttDepth + 1, depthOffset, 0, treeType, modeType )
                    coding_tree( x1, y0, cbWidth / 2, cbHeight, qgOnY, qgOnC,
    cbSubdiv + 1,
        cqtDepth, mttDepth + 1, depthOffset, 1, treeType, modeType )
                    coding_tree( x2, y0, cbWidth / 4, cbHeight, qgOnY, qgOnC,
    cbSubdiv + 2,
        cqtDepth, mttDepth + 1, depthOffset, 2, treeType, modeType )
            } else { /* SPLIT_TT_HOR */
                    y1 = y0 + ( cbHeight / 4 )
                    y2 = y0 + ( 3 * cbHeight / 4 )
                    qgOnY = qgOnY && ( cbSubdiv + 2 <= cu_qp_delta_subdiv )
                    qgOnC   =   qgOnC   &&    (    cbSubdiv + 2      <=
    cu_chroma_qp_offset_subdiv )
                    coding_tree( x0, y0, cbWidth, cbHeight / 4, qgOnY, qgOnC,
    cbSubdiv + 2,
        cqtDepth, mttDepth + 1, depthOffset, 0, treeType, modeType )
                    coding_tree( x0, y1, cbWidth, cbHeight / 2, qgOnY, qgOnC,
    cbSubdiv + 1,
        cqtDepth, mttDepth + 1, depthOffset, 1, treeType, modeType )
    coding_tree( x0, y2, cbWidth, cbHeight / 4, qgOnY, qgOnC,
    cbSubdiv + 2,
        cqtDepth, mttDepth + 1, depthOffset, 2, treeType, modeType )
            }
        } else {
            x1 = x0 + ( cbWidth / 2 )
            y1 = y0 + ( cbHeight / 2 )
            coding_tree( x0, y0, cbWidth / 2, cbHeight / 2, qgOnY, qgOnC,
    cbSubdiv + 2,
        cqtDepth + 1, 0, 0, 0, treeType, modeType )
                if( x1 < pic_width_in_luma_samples )
                    coding_tree( x1, y0, cbWidth / 2, cbHeight / 2, qgOnY, qgOnC,
    cbSubdiv + 2,
        cqtDepth + 1, 0, 0, 1, treeType, modeType )
```

```
coding_tree( x0, y0, cbWidth, cbHeight, qgOnY, qgOnC, cbSubdiv, cqtDepth,
mttDepth, depthOffset, partIdx, treeTypeCurr modeTypeCurr ) {                    Descriptor
        if( y1 < pic_height_in_luma_samples )
                coding_tree( x0, y1, cbWidth / 2, cbHeight / 2, qgOnY, qgOnC,
cbSubdiv + 2,
    cqtDepth + 1, 0, 0, 2, treeType, modeType )
        if(  y1   <   pic_height_in_luma_samples   &&   x1   <
pic_width_in_luma_samples )
                coding_tree( x1, y1, cbWidth / 2, cbHeight / 2, qgOnY, qgOnC,
cbSubdiv + 2,
    cqtDepth + 1, 0, 0, 3, treeType, modeType )
    }
        if( modeTypeCur = =MODE_TYPE_ALL && modeType = =
MODE_TYPE_INTRA ) {
                    coding_tree( x0, y0cbWidth, cbHeight,qgOnY, qgOnC, cbSubdiv,
cqtDepth         mttDepth           0                    0
 DUAL_TREE_CHROMA,modeType )
    }
 } else
    coding_unit( x0, y0, cbWidth, cbHeight, cqtDepth, treeTypeCurr, modeTypeCurr )
}
```

2.14.1.1 Coding Unit Syntax

```
coding_unit( x0, y0, cbWidth, cbHeight, cqtDepth, treeType, modeType ) {          Descriptor
    chType = treeType = = DUAL_TREE_CHROMA? 1 : 0
    if( slice_type != I | | sps_ibc_enabled_flag | | sps_palette_enabled_flag) {
        if(     treeType    !=    DUAL_TREE_CHROMA        &&
            !( ( ( cbWidth = = 4 && cbHeight = = 4 ) | | modeType = =
MODE_TYPE_INTRA
            && !sps_ibc_enabled_flag ) )
            cu_skip_flag[ x0 ] [ y0 ]                                             ae(v)
        if(  cu_skip_flag[ x0 ][ y0 ] = = 0    &&    slice_type    !=    I
            && !( cbWidth = = 4 && cbHeight = = 4 ) && modeType = =
MODE_TYPE_ALL )
            pred_mode_flag                                                        ae(v)
        if(   ( ( slice_type = = I   &&    cu_skip_flag[ x0 ] [ y0 ] = =0 )    | |
            ( slice_type != I   &&    ( CuPredMode[ chType ][ x0 ][ y0 ]     !=
MODE_INTRA
            ( cbWidth = = 4 && cbHeight = = 4 && cu_skip_flag[ x0 ] [ y0 ] = =
0 ) ) ) )                                                                 &&
            cbWidth   <=   64    &&    cbHeight <= 64    &&   modeType !=
MODE_TYPE_INTER                                                           &&
            sps_ibc_enabled_flag && treeType != DUAL_TREE_CHROMA )
            pred_mode_ibc_flag                                                    ae(v)
        if(   ( ( ( slice_type   = =   I | | ( cbWidth   = =   4 && cbHeight   = =   4   ) | |
sps_ibc_enabled_flag            )                                         &&
            CuPredMode[ x0 ] [ y0 ]         = =         MODE_INTRA )         | |
            ( slice_type != I   &&   !( cbWidth = = 4   &&   cbHeight = = 4 )   &&
!sps_ibc_enabled_flag
            &&       CuPredMode[ x0 ][ y0 ]    !=    MODE_INTRA ) )        &&
sps_palette_enabled_flag                                                  &&
            cbWidth <= 64 && cbHeight <= 64   &&    &&    cu_skip_flag[ x0 ] [ y0 ]
= =                  0                                                    &&
            modeType != MODE_INTER )
            pred_mode_plt_flag                                                    ae(v)
    }
...
```

The variable modeType
Condition is derived as follows:
- If one of the following conditions is true modeTypeCondition is set equal to 0
    - slice_type = = I and qtbtt_dual_tree_intra_flag is equal to 1
    - modeTypeCurr is not equal to MODE_TYPE_ALL
- Otherwise, if one of the following conditions is true modeTypeCondition is set equal to 1 cbWidth * cbHeight is equal to 64 and split_qt_flag is equal to 1
- cbWidth * cbHeight is equal to 64 and MttSplitMode[ x0 ][ y0 ][ mttDepth ] is equal to SPLIT_TT_HOR or SPLIT_TT_VER
- cbWidth * cbHeight is equal to 32 and MttSplitMode[ x0 ][ y0 ][ mttDepth ] is equal to SPLIT_BT_HOR or SPLIT_BT_VER
- Otherwise, if one of the following conditions is true modeTypeCondition is set equal to
1 + (slice_type != I ? 1 : 0)
- cbWidth * cbHeight is equal to 64
  and MttSplitMode[ x0 ][ y0
  ][ mttDepth ] is equal to SPLIT_BT_HOR or
  SPLIT_BT_VER
- cbWidth * cbHeight is equal to
  128 and MttSplitMode[ x0 ][ y0 ][
  mttDepth ] is equal to SPLIT_TT_HOR
  or SPLIT_TT_VER
– Otherwise, modeTypeCondition is set equal to 0

Allowed quad split process
Inputs to this process are:
a coding block size cbSize in luma samples,
a multi-type tree depth mttDepth,
a variable treeType specifying whether a single tree (SINGLE_TREE) or a dual tree is used to partition the CTUs and, when a dual tree is used, whether the luma (DUAL_TREE_LUMA)
– a variable modeType specifying
  whether intra (MODE_INTRA),,
  IBC (MODE_IBC).         , palette (MODE_PLT),
  and inter coding modes
  can be used (MODE_TYPE_ALL), or whether only
  intra, IBC, and palette coding modes can be used
  (MODE_TYPE_INTRA), or whether only
  inter coding modes can be
  used (MODE_TYPE_INTER) for
  coding units inside the coding tree node .

Output of this process is the variable allowSplitQt.
The variable allowSplitQt is derived as follows:
If one or more of the following conditions are true, allowSplitQt is set equal to FALSE:
  treeType is equal to SINGLE_TREE or DUAL_TREE_LUMA and cbSize is less than or equal to MinQtSizeY
  treeType is equal to DUAL_TREE_CHROMA and cbSize/SubWidthC is less than or equal to MinQtSizeC
  mttDepth is not equal to 0
  treeType is equal to DUAL_TREE_CHROMA and (cbSize/SubWidthC) is less than or equal to 4
  - treeType is equal to DUAL_TREE_CHROMA and modeType is equal to MODE_TYPE_INTRA Otherwise, allowSplitQt is set equal to TRUE.
Allowed binary split process
Inputs to this process are:
a binary split mode btSplit,
a coding block width cbWidth in luma samples,
a coding block height cbHeight in luma samples,
a location (x0, y0) of the top-left luma sample of the considered coding block relative to the top-left luma sample of the picture,
a multi-type tree depth mttDepth,
a maximum multi-type tree depth with offset maxMttDepth,
a maximum binary tree size maxBtSize,
a minimium quadtree size minQtSize,
a partition index partIdx,
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed,

- a variable modeType specifying
  whether intra (MODE_INTRA),
  IBC (MODE_IBC),   palette,    (MODE_PLT),
  and inter coding modes can be
  used (MODE_TYPE_ALL,       or whether only
  intra, IBC ,        and palette coding modes can
  be used (MODE_TYPE_INTRA) ,   or whether only
  inter coding modes can be
  used (MODE_TYPE_INTER)
  for coding units inside the coding tree node. .
Output of this process is the variable allowBtSplit.

TABLE 6-2

Specification of parallelTtSplit and cbSize based on btSplit.

|  | btSplit == SPLIT_BT_VER | btSplit == SPLIT_BT_HOR |
| --- | --- | --- |
| parallelTtSplit | SPLIT_TT_VER | SPLIT_TT_HOR |
| cbSize | cbWidth | cbHeight |

The variables parallelTtSplit and cbSize are derived as specified in Table 6-2.
The variable allowBtSplit is derived as follows:
If one or more of the following conditions are true, allowBtSplit is set equal to FALSE:
  cbSize is less than or equal to MinBtSizeY
  cbWidth is greater than maxBtSize
  cbHeight is greater than maxBtSize
  mttDepth is greater than or equal to maxMttDepth
  treeType is equal to DUAL_TREE_CHROMA and (cbWidth/SubWidthC)*(cbHeight/SubHeightC) is less than or equal to 16
  – treeType is equal to
    DUAL_TREE_CHROMA and
    modeType is equal to MODE_TYPE_INTRA
Otherwise, if all of the following conditions are true, allowBtSplit is set equal to FALSE
  btSplit is equal to SPLIT_BT_VER
  y0+cbHeight is greater than pic_height_in_luma_samples
Otherwise, if all of the following conditions are true, allowBtSplit is set equal to FALSE
  btSplit is equal to SPLIT_BT_VER
  cbHeight is greater than MaxTbSizeY
  x0+cbWidth is greater than pic_width_in_luma_samples
Otherwise, if all of the following conditions are true, allowBtSplit is set equal to FALSE
  btSplit is equal to SPLIT_BT_HOR
  cbWidth is greater than MaxTbSizeY
  y0+cbHeight is greater than pic_height_in_luma_samples
Otherwise, if all of the following conditions are true, allowBtSplit is set equal to FALSE
  x0+cbWidth is greater than pic_width_in_luma_samples
  y0+cbHeight is greater than pic_height_in_luma_samples
  cbWidth is greater than minQtSize
Otherwise, if all of the following conditions are true, allowBtSplit is set equal to FALSE
  btSplit is equal to SPLIT_BT_HOR
  x0+cbWidth is greater than pic_width_in_luma_samples y0+cbHeight is less than or equal to pic_height_in_luma_samples Otherwise, if all of the following conditions are true, allowBtSplit is set equal to FALSE:
mttDepth is greater than 0
partIdx is equal to 1
MttSplitMode[x0][y0][mttDepth−1] is equal to parallelTtSplit Otherwise, if all of the following conditions are true, allowBtSplit is set equal to FALSE
btSplit is equal to SPLIT_BT_VER
cbWidth is less than or equal to MaxTbSizeY
cbHeight is greater than MaxTbSizeY Otherwise, if all of the following conditions are true, allowBtSplit is set equal to FALSE
btSplit is equal to SPLIT_BT_HOR
cbWidth is greater than MaxTbSizeY
cbHeight is less than or equal to MaxTbSizeY Otherwise, allowBtSplit is set equal to TRUE.

Allowed ternary split process

Inputs to this process are:
a ternary split mode ttSplit,
a coding block width cbWidth in luma samples,
a coding block height cbHeight in luma samples,
a location (x0, y0) of the top-left luma sample of the considered coding block relative to the top-left luma sample of the picture,
a multi-type tree depth mttDepth
a maximum multi-type tree depth with offset maxMttDepth,
a maximum ternary tree size maxTtSize,
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed,
– *a variable modeType specifying whether intra (MODE_INTRA), IBC (MODE_IBC), palette (MODE_PLT), and inter coding modes can be used (MODE_TYPE_ALL), or whether only intra, IBC, and palette coding modes can be used (MODE_TYPE_INTRA) or whether only inter coding modes can be used (MODE_TYPE_INTER) for coding units inside the coding tree node*

Output of this process is the variable allowTtSplit.

TABLE 6-3

Specification of cbSize based on ttSplit.

| | ttSplit = = SPLIT_TT_VER | ttSplit = = SPLIT_TT_HOR |
|---|---|---|
| cbSize | cbWidth | cbHeight |

The variable cbSize is derived as specified in Table 6-3.
The variable allowTtSplit is derived as follows:
If one or more of the following conditions are true, allowTtSplit is set equal to FALSE:
cbSize is less than or equal to 2*MinTtSizeY
cbWidth is greater than Min(MaxTbSizeY, maxTtSize)
cbHeight is greater than Min(MaxTbSizeY, maxTtSize)
mttDepth is greater than or equal to maxMttDepth
x0+cbWidth is greater than pic_width_in_luma_samples y0+cbHeight is greater than pic_height_in_luma_samples
treeType is equal to DUAL_TREE_CHROMA and (cbWidth/SubWidthC)*(cbHeight/SubHeightC) is less than or equal to 32
- *treeType is equal to DUAL_TREE_CHROMA and modeType is equal to MODE_TYPE_INTRA*

Otherwise, allowTtSplit is set equal to TRUE.

pred_mode_flag equal to 0 specifies that the current coding unit is coded in inter prediction mode.

pred_mode_flag equal to 1 specifies that the current coding unit is coded in intra prediction mode.

When pred_mode_flag is not present, it is inferred as follows:
If cbWidth is equal to 4 and cbHeight is equal to 4, pred_mode_flag is inferred to be equal to 1.
- *Otherwise, if modeType is equal to MODE_TYPE_INTRA, pred_mode_flag is inferred to be equal to 1.*
- *Otherwise, if modeType is equal to MODE_TYPE_INTER, pred_mode_flag is inferred to be equal to 0*

Otherwise, pred_mode_flag is inferred to be equal to 1 when decoding an I slice, and equal to 0 when decoding a P or B slice, respectively.

The variable CuPredMode[chType][x][y] is derived as follows for x=x0 . . . x0+cbWidth−1 and y=y0 . . . y0+cbHeight−1:
If pred_mode_flag is equal to 0, CuPredMode[chType][x][y] is set equal to MODE_INTER.
Otherwise (pred_mode_flag is equal to 1), CuPredMode[chType][x][y] is set equal to MODE_INTRA.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred as follows:
If cu_skip_flag[x0][y0] is equal to 1, and cbWidth is equal to 4, and cbHeight is equal to 4, pred_mode_ibc_flag is inferred to be equal to 1.
Otherwise, if both cbWidth and cbHeight are equal to 128, pred_mode_ibc_flag is inferred to be equal to 0.
- *Otherwise, if modeType is equal to MODE_TYPE_INTER,, pred_mode_ibc_flag is inferred to be equal to 0..*
– *Otherwise, , if treeType is equal to DUAL_TREE_CHROMA, pred_mod_ibc_flag is inferred to be equal to 0..*

Otherwise, pred_mode_ibc_flag is infered to be equal to the value of sps_ibc_enabled_flag when decoding an I slice, and 0 when decoding a P or B slice, respectively.

When pred_mode_ibc_flag is equal to 1, the variable CuPredMode[chType][x][y] is set to be equal to MODE_IBC for x=x0 . . . x0+cbWidth−1 and y=y0 . . . y0+cbHeight−1.

3. Problems

1. Currently IBC is considered as MODE_TYPE_INTRA and thus small chroma block is disallowed, which leads to unnecessary coding efficiency loss.

2. Currently palette is considered as MODE_TYPE_INTRA and thus small chroma block is disallowed, which leads to unnecessary coding efficiency loss.
3. Currently small chroma block constrains do not consider color subsampling format.
4. Currently same partition and prediction mode constraints on small blocks is applied to all chroma formats. However, it may be desirable to design different constraint mechanisms on small blocks in 4:2:0 and 4:2:2 chroma formats.
5. Currently the Palette mode flag signaling depends on the modeType, which is not desirable as palette may be not apply small block constraints.
6. Currently the IBC mode flag is inferred to be 0 for P/B slice with cu_skip_flag equal to 1 but MODE_TYPE equal to MODE_TYPE_INTRA, this is illegal in the syntax parsing.
7. Currently, non-4×4 luma IBC mode is not allowed for SCIPU luma blocks, which may be not desirable and may cause coding efficiency loss.
8. 2×H chroma block is still allowed, which is not friendly to hardware implementation.
9. CIIP is considered as of MODE_INTER while it uses intra prediction, which breaks the constrains in some cases.
10. When SCIPU is applied, delta quantization parameter (QP) for chroma may be signaled depending on the luma splitting. For example, when the current block dimensions are 16×8 in luma samples and are split with vertical TT, a local dual tree may be applied. It is specified that qgOnC=qgOnC && (cbSubdiv+2<=cu_chroma_qp_offset_subdiv)
So qgOnC is set to zero if cbSubdiv+2<=cu_chroma_qp_offset_subdiv. This conditional setting assumes that the chroma component is also split by TT. With the local dual tree, the chroma component may not be split, thus cbSubdiv may be larger than cu_chroma_qp_offset_subdiv. IsCuChromaQpOffsetCoded should be set to be 0 to allow signaling delta QP for chroma. However, IsCuChromaQpOffsetCoded is not set to be 0 because qgOnC is set to be 0.
11. The maximum transform size for lossless coding may be set differently from the maximum transform size for lossy coding.

4. Examples of Technical Solutions and Embodiments

The listing below should be considered as examples. These techniques should not be interpreted in a narrow way. Furthermore, these techniques can be combined in any manner.

In this disclosure, "M×N coding tree node" indicates a M×N block, with M as the block width and N as the block height in luma samples, which may be further partitioned, such as by quadtree (QT)/binary tree (BT)/ternary tree (TT). For example, a block could be a QT node, or a BT node, or a TT node. A coding tree node could be a coding unit (e.g., with three color components for single tree, with two chroma color components for dual tree chroma coding, and only luma color component for dual tree luma coding), or a luma coding block, or a chroma coding block. A "small coding tree node unit" may indicate a coding tree node with block size M×N equal to 32/64/128 in luma samples.

If not specifically mentioned, the width W and height H for a coding block is measured in luma samples. For example, M×N coding block means a M×N luma block, and/or two (M/SubWidthC)×(N/SubHeightC) chroma blocks, where SubWidthC and SubHeightC are derived by chroma format as below.

| chroma_format_idc | separate_colour_plane_flag | Chroma format | Sub-WidthC | Sub-HeightC |
| --- | --- | --- | --- | --- |
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

1. Whether and/or how to partition into small blocks may depend on color formats.
   a. In one example, for 4:4:4 color format, the constrains on the sizes of chroma blocks may follow those constrains on luma blocks.
   b. In one example, for 4:2:2 color format, the constrains on the sizes of chroma blocks may follow those constrains for 4:2:0 color format.
   c. In one example, for 4:0:0, and/or 4:4:4 chroma format, the constraints on small block partitions and/or prediction modes may be not applied.
   d. In one example, the constraints on small block partitions and/or prediction modes may be applied differently for different chroma formats.
      i. In one example, for M×N (such as 8×8) coding tree node with horizontal BT split, in 4:2:2 chroma format, the horizontal BT split may be allowed for both chroma block and luma block, while in 4:2:0 chroma format, the horizontal BT split may be allowed for luma block but disabled for chroma block.
      ii. In one example, for M×N (such as 16×4) coding tree node with vertical BT split, in 4:2:2 chroma format, the vertical BT split may be allowed for both chroma block and luma block, while in 4:2:0 chroma format, the vertical BT split may be allowed for luma block but disabled for chroma block.
      iii. In one example, for M×N (such as 8×16) coding tree node with horizontal TT split, in 4:2:2 chroma format, the horizontal TT split may be allowed for both chroma block and luma block, while in 4:2:0 chroma format, the horizontal TT split may be allowed for luma block but disabled for chroma block.
      iv. In one example, for M×N (such as 32×4) coding tree node with vertical TT split, in 4:2:2 chroma format, the vertical TT split may be allowed for both chroma block and luma block, while in 4:2:0 chroma format, the vertical TT split may be allowed for luma block but disabled for chroma block.
      v. In one example, for 4:0:0, and/or 4:4:4 color formats, small block constraints may be not applied.
   e. In one example, whether to enable SCIPU is dependent on the color format.
      i. In one example, SCIPU is enabled for 4:2:0 and 4:2:2 color formats.
      ii. In one example, SCIPU is disabled for 4:0:0 and/or 4:4:4 color format.

1. In one example, modeType may be always equal to MODE_TYPE_ALL for 4:0:0 and/or 4:4:4 color format.
2. In one example, modeTypeCondition may be always equal to 0 for 4:0:0 and/or 4:4:4 color format.
2. How to determine the prediction modes (and/or modeType) for (sub-)blocks of a coding tree node may depend on chroma formats.
   a. In one example, if one of the below conditions is true, the modeType of (sub-)blocks partitioned by this coding tree node may be equal to MODE_TYPE_ALL for 4:2:2 chroma format, while for 4:2:0 chroma format, the modeType may be equal to either MODE_TYPE_INTRA or MODE_TYPE_INTER.
      i. M×N (such as 8×8) coding tree node with horizontal BT split
      ii. M×N (such as 16×4) coding tree node with vertical BT split
      iii. M×N (such as 8×16) coding tree node with horizontal TT split
      iv. M×N (such as 32×4) coding tree node with vertical TT split
3. It is proposed to rename MODE_TYPE_INTRA to MODE_TYPE_NO_INTER and restrict the usage of MODE_INTER.
   a. In one example, when modeType of a coding unit is equal to MODE_TYPE_NO_INTER, MODE_INTER may be disallowed.
4. It is proposed to rename MODE_TYPE_INTER to MODE_TYPE_NO_INTRA and restrict the usage of MODE_INTRA.
   a. In one example, when modeType of a coding unit is equal to MODE_TYPE_NO_INTRA, MODE_INTRA may be disallowed.
5. The mode constraint flag may be never signaled in 4:2:2 and/or 4:0:0 and/or 4:4:4 chroma formats.
   a. In one example, when mode constraint flag is not present, it may be inferred to equal to be 1.
      i. Alternatively, when mode constraint flag is not present, it may be inferred to equal to be 0.
6. Whether and/or how to apply SCIPU on an M×N coding block with M as the block width and N as the block height may depend on whether the color format is 4:2:0 or 4:2:2.
   a. In one example, in 4:2:2 color format, for an M×N coding block with M as the block width and N as the block height, SCIPU may be enabled only if M multiplied by N (denoted by M*N) is equal to 64 or 32.
   b. In one example, a coding tree node with M*N=128 may be never treated as SCIPU block in 4:2:2 color format.
   c. In one example, a coding tree node with BT split and M*N=64 may be never treated as SCIPU block in 4:2:2 color format.
   d. In one example, a coding tree node with split_qt_flag equal to 1 and M*N=64, may be an SCIPU block in 4:2:2 color format.
   e. In one example, a coding tree node with TT split and M*N=64, may be treated as SCIPU block in 4:2:2 color format.
   f. In one example, a coding tree node with BT split and M*N=32, may be treated as SCIPU block in 4:2:2 color format.
   g. In above description, for an SCIPU block in 4:2:2 color format, the modeTypeCondition may be always equal to 1.
   h. In above description, for an SCIPU block in 4:2:2 color format, only MODE_TYPE_INTRA may be allowed for both the current block in parent node and all sub-blocks under child leaf nodes.
7. In 4:2:2 color format, modeTypeCondition of an SCIPU block may be always equal to 1.
   a. In one example, modeTypeCondition may be equal to 0 or 1 for 4:2:2 color format.
   b. In one example, for SCIPU blocks in 4:2:2 color format, modeTypeCondition may be never equal to 2.
8. In 4:2:2 color format, modeType of an SCIPU block may be always equal to MODE_TYPE_INTRA.
   a. In one example, modeType may be equal to MODE_TYPE_ALL or MODE_TYPE_INTRA in 4:2:2 color format.
   b. In one example, for SCIPU blocks in 4:2:2 color format, MODE_TYPE_INTER may be disabled.
9. Whether the block partition is allowed or not may be dependent on the modeType, and/or the block size.
   a. In one example, whether BT and/or TT split is allowed for a block may be dependent on the modeType.
      i. In one example, if modeType is equal to MODE_TYPE_INTER, then BT split may be disallowed for the current coding block (e.g., allowBtSplit is set equal to false).
      ii. In one example, if modeType is equal to MODE_TYPE_INTER, then TT split may be disallowed for the current coding block (e.g., allowTtSplit is set equal to false).
   b. In one example, whether BT and/or TT split is allowed for a block may be dependent on the modeType and the block size.
      i. In one example, for an M×N coding block, with M as the block width and N as the block height, when M*N is less than or equal to 32 and modeType is equal to MODE_TYPE_INTER, the BT split may be disallowed (e.g., allowBtSplit is set equal to false).
      ii. In one example, for an M×N coding block, with M as the block width and N as the block height, when M*N is less than or equal to 64 and modeType is equal to MODE_TYPE_INTER, the TT split may be disallowed (e.g., allowTtSplit is set equal to false).
10. When modeTypeCurr of a coding tree is equal to MODE_TYPE_INTER, split of the coding tree may be restricted
    a. In one example, when modeTypeCurr of a coding tree is equal to MODE_TYPE_INTER, BT split may be disallowed.
    b. In one example, when modeTypeCurr of a coding tree is equal to MODE_TYPE_INTER, TT split may be disallowed.
    c. In one example, when modeTypeCurr of a coding tree is equal to MODE_TYPE_INTER, QT split may be disallowed.
    d. In one example, when modeTypeCurr of a coding tree is equal to MODE_TYPE_INTER and luma block size is less than or equal to 32, BT split may be disallowed.

e. In one example, when modeTypeCurr of a coding tree is equal to MODE_TYPE_INTER and luma block size is less than or equal to 64, TT split may be disallowed.
11. A coding unit with treeType being DUAL_TREE_LUMA may be coded in inter mode.
   a. In one example, coding unit coded in inter coding mode, i.e. MODE_INTER may only contain luma component even for color formats with multiple color components.
   b. In one example, pred_mode_flag may need to be parsed for DUAL_TREE_LUMA block.
   c. In one example, for DUAL_TREE_LUMA block coded in inter mode, the same constrains of inter mode for SINGLE_TREE may be also applied.
      i. In one example, 4×4 DUAL_TREE_LUMA inter block may be disallowed.
12. Chroma intra (and/or IBC) blocks with block width equal to M (such as M=2) chroma samples may be not allowed.
   a. In one example, 2×N (such as N<=64) chroma intra blocks may be not allowed in dual tree.
      i. In one example, when treeType is equal to DUAL_TREE_CHROMA and the block width is equal to 4 chroma samples, vertical BT split may be disabled.
      ii. In one example, when treeType is equal to DUAL_TREE_CHROMA and the block width is equal to 8 chroma samples, vertical TT split may be disabled.
   b. In one example, 2×N (such as N<=64) chroma intra (and/or IBC) blocks may be not allowed in single tree.
      i. In one example, for M×N (such as M=8 and N<=64) coding tree node with vertical BT split, one of below process may be applied.
         1. Vertical BT split may be disallowed for the 4×N or 4×(N/2) chroma block but allowed for the 8×N luma block.
         2. The 4×N or 4×(N/2) chroma block may be not vertical BT split, and it may be coded by MODE_INTRA, or MODE_IBC.
         3. Vertical BT split may be allowed for both the 8×N luma block and the 4×N or 4×(N/2) chroma block, but both luma and chroma blocks not coded by MODE_INTRA (e.g., may be coded by MODE_INTER, or MODE_IBC).
      ii. In one example, for M×N (such as M=16 and N<=64) coding tree node with vertical TT split, one of below process may be applied.
         1. Vertical TT split may be disallowed for the 8×N or 8×(N/2) chroma block but allowed for the 16×N luma block.
         2. The 8×N or 8×(N/2) chroma block may be not vertical TT split and coded by MODE_INTRA, or MODE_IBC.
         3. Vertical TT split may be allowed for both the 16×N luma block and the 8×N or 8×(N/2) chroma block, but both luma and chroma blocks may be not coded by MODE_INTRA (e.g., may be coded by MODE_INTER, or MODE_IBC).
13. IBC mode may be allowed for luma and/or chroma blocks regardless of whether it is of small block size.
   a. In one example, IBC mode may be allowed for luma blocks including 8×4/8×8/16×4 and 4×N (such as N<=64) luma blocks, even if modeType is equal to MODE_TYPE_INTRA.
   b. In one example, IBC mode may be allowed for chroma blocks, even if modeType is equal to MODE_TYPE_INTRA.
14. The signaling of IBC prediction mode flag may depend on prediction mode type (e.g., MODE_TYPE_INTRA).
   a. In one example, IBC prediction mode flag for a non-SKIP block (e.g. a coding block which is not coded by skip mode) may be explicitly signaled in the bitstream when the treeType is not equal to DUAL_TREE_CHROMA and the modeType is equal to MODE_TYPE_INTRA.
15. IBC prediction mode flag may be inferred depending on the CU SKIP flag and the mode type (e.g., modeType).
   a. In one example, if the current block is coded with SKIP mode (such as cu_skip_flag is equal to 1), and the modeType is equal to MODE_TYPE_INTRA, the IBC prediction mode flag (such as pred_mode_ibc_flag) may be inferred to be equal to 1.
16. The explicit signaling of Palette mode flag may not depend on the modeType.
   a. In one example, palette mode flag (such as pred_mode_plt_flag) signaling may depend on the slice type, block size, prediction mode, etc., But no matter what the modeType is.
   b. In one example, palette mode flag (such as pred_mode_plt_flag) is inferred to be 0 when modeType is equal to MODE_TYPE_INTER or MODE_TYPE_INTRA.
17. IBC mode may be allowed to use when modeType is equal to MODE_TYPE_INTER
   a. In one example, chroma IBC may be disallowed when modeType is equal to MODE_TYPE_INTRA.
   b. In one example, IBC mode may be allowed to use when modeType is equal to MODE_TYPE_INTRA or MODE_TYPE_INTER.
   c. In one example, IBC mode may be allowed to use regardless what modeType is.
   d. In one example, within one SCIPU, IBC and inter mode may be both allowed.
   e. In one example, the size of IBC chroma block may always corresponds to the size of corresponding luma block.
   f. In one example, when modeType is equal to MODE_TYPE_INTER and coding unit size is 4×4 in luma, signaling of pred_mode_ibc_flag may be skipped and pred_mode_ibc_flag may be inferred to be equal to 1.
18. Palette mode may be allowed to use when modeType is MODE_TYPE_INTER
   a. In one example, chroma palette may be disallowed when modeType is MODE_TYPE_INTRA.
   b. In one example, IBC mode may be allowed to use when modeType is equal to MODE_TYPE_INTRA or MODE_TYPE_INTER.
   c. In one example, IBC mode may be allowed to use regardless what modeType is.
   d. In one example, palette mode may be allowed to use when modeType is equal to MODE_TYPE_INTRA or MODE_TYPE_INTER.
   e. In one example, palette mode may be allowed to use regardless what modeType is.
   f. In one example, within one SCIPU, palette and inter mode may be both allowed.
   g. In one example, within one SCIPU, palette, IBC and inter mode may be all allowed.

h. In one example, the size of palette chroma block may always corresponds to the size of corresponding luma block.
i. In one example, when modeType is equal to MODE_TYPE_INTER and coding unit size is 4×4 in luma, signaling of pred_mode_plt_flag may be skipped and pred_mode_plt_flag may be inferred to be equal to 1.
j. In one example, when modeType is equal to MODE_TYPE_INTER and coding unit size is 4×4 in luma, one message may be sent to indicated if the current prediction mode is of IBC or palette.
k. In one example, whether to enable/disable Palette mode may depend on slice types and modeType.
   i. In one example, for I slices with MODE_TYPE_INTRA, Palette mode may be enabled.
   ii. In one example, for P/B slices with MODE_TYPE_INTER, Palette mode may be enabled.
19. When palette mode is enabled, local dualtree may be disallowed.
   a. In one example, when palette mode is enabled, modeTypeCondition may be always set equal to 0.
20. For small chroma blocks with width equal to M (e.g., M=2) or height equal to N (e.g., N=2), allowed intra prediction modes may be restricted to be different from those allowed for large chroma blocks.
   a. In one example, only a subset of intra prediction mode of available chroma intra prediction modes may be used.
   b. In one example, only INTRA_DC mode may be used.
   c. In one example, only INTRA_PLANAR mode may be used.
   d. In one example, only INTRA_ANGULAR18 mode may be used.
   e. In one example, only INTRA_ANGULAR50 mode may be used.
   f. In one example, CCLM modes may be disallowed.
21. For small chroma blocks with width equal to M (e.g., M=2) or height equal to N (e.g., N=2), transform types may be restricted to be different from those allowed for large chroma blocks.
   a. In one example, only transform skip may be used.
   b. In one example, only one-dimensional transform may be used.
   c. In one example, coding tools that support multiple types of transforms are disallowed.
      i. Alternatively, the signaling of coding tools that support multiple types of transforms is omitted.
22. CIIP may be considered as MODE_TYPE_INTRA.
   a. In one example, CIIP mode may be allowed when dualtree partitioning is used.
      i. In one example, CIIP mode may be allowed when CU type is of DUAL_TREEE_CHROMA.
   b. Alternatively, CIIP may be considered as MODE_TYPE_INTER
      i. In one example, when chroma block width is equal to M (e.g., M=2), CIIP mode may be disallowed.
      ii. In one example, when chroma block width is equal to M (e.g., M=2), intra prediction modes for chroma in CIIP may be restricted to simple intra prediction mode.
         1. In one example, INTRA_DC may be used for chroma intra prediction, when chroma block width is equal to M (e.g., M=2).
         2. In one example, INTRA_ANGULAR18 may be used for chroma intra prediction, when chroma block width is equal to M (e.g., M=2).
         3. In one example, INTRA_ANGULAR50 may be used for chroma intra prediction, when chroma block width is equal to M (e.g., M=2).
      iii. In one example, intra prediction modes for chroma in CIIP may be restricted to simple intra prediction mode.
         1. In one example, INTRA_DC may be used for chroma intra prediction.
         2. In one example, INTRA_ANGULAR18 mode may be used for chroma intra prediction.
         3. In one example, INTRA_ANGULAR50 mode may be used for chroma intra prediction.
23. For above bullets, the variables M and/or N may be pre-defined or signaled.
   a. In one example, M and/or N may be further dependent on color formats (e.g., 4:2:0, 4:2:2, 4:4:4).
24. modeType may be extended to cover more types.
   a. In one example, modeType may be MODE_TYPE_IBC. When modeType is equal to MODE_TYPE_IBC, the prediction mode is inferred to be IBC.
      i. In one example, pred_mode_flag is not signaled in this case.
      ii. In one example, pred_mode_ibc_flag is not signaled in this case.
      iii. In one example, pred_mode_plt_flag is not signaled in this case.
   b. In one example, modeType may be MODE_TYPE_PALETTE. When modeType is equal to MODE_TYPE_PALETTE, the prediction mode is inferred to be Palette mode.
      i. In one example, pred_mode_flag is not signaled in this case.
      ii. In one example, pred_mode_ibc_flag is not signaled in this case.
      iii. In one example, pred_mode_plt_flag is not signaled in this case.
   c. In one example, mode_constraint_flag may be replaced by an index to tell which one of allowed modeTypes are used.
25. In one example, whether QT split is allowed for a block with dimensions W×H may depend on modeType combined with dimensions.
   a. For example, if modeType is equal to MODE_TYPE_INTER and W is equal to 8 and H is equal to 8, QT spit is disallowed.
26. In one example, whether vertical TT split is allowed for a block with dimensions W×H may depend on modeType combined with dimensions.
   a. For example, if modeType is equal to MODE_TYPE_INTER and W is equal to 16 and H is equal to 4, vertical TT spit is disallowed.
27. In one example, whether horizontal TT split is allowed for a block with dimensions W×H may depend on modeType combined with dimensions.
   a. For example, if modeType is equal to MODE_TYPE_INTER and W is equal to 4 and H is equal to 16, horizontal TT spit is disallowed.
28. In one example, whether vertical BT split is allowed for a block with dimensions W×H may depend on modeType combined with dimensions.
   a. For example, if modeType is equal to MODE_TYPE_INTER and W is equal to 8 and H is equal to 4, vertical BT spit is disallowed.

29. In one example, whether horizontal TT split is allowed for a block with dimensions W×H may depend on modeType combined with dimensions.
   a. For example, if modeType is equal to MODE_TYPE_INTER and W is equal to 4 and H is equal to 8, horizontal BT spit is disallowed.
30. In one example, whether the prediction mode of a CU is inferred by modeType may depend on color components and/or block dimensions W×H.
   a. For example, the prediction mode of a chroma CU is inferred by modeType; but the prediction mode of a luma CU is signaled instead of inferred by modeType.
      i. For example, the prediction mode of a luma CU is signaled instead of inferred by modeType if W>4 or H>4.
31. When SCIPU is applied, whether to and/or how to signal the information related to delta QP of a first component may depend on the splitting way of the first component.
   a. In one example, when SCIPU is applied, whether to and/or how to signal the information related to delta QP of a first component may depend on the splitting way of the first component and decoupled from the splitting way of a second component.
   b. In one example, the first component is luma and the second component is chroma.
   c. In one example, the first component is chroma and the second component is luma.
32. Any variable related to delta QP of a first component cannot be modified during the decoding or parsing process of a second component when dual tree and/or local dual tree coding structure is applied.
   a. In one example, the local dual tree coding structure may be used according to SCIPU.
   b. In one example, the first component is luma and the second component is chroma.
      i. The variable may be IsCuQpDeltaCoded.
   c. In one example, the first component is chroma and the second component is luma.
      i. The variable may be IsCuChromaQpOffsetCoded.
33. When SCIPU is applied, the information related to delta QP of a component (such as luma or chroma) may be signaled at most once in a specific region wherein the luma component and the chroma component are required to share the same mode type (such as MODE_TYPE_INTER or MODE_TYPE_INTRA).
   a. In one example, the specific region is a regarded as a quantization group.
34. M×N chroma intra blocks with M as block width and N as block height may be not allowed.
   a. In one example, DC prediction may be used for M×N chroma intra prediction, for example, M=2 chroma samples, N=8 and/or 16 and/or 32 chroma samples.
      i. In one example, the reconstructed neighbor pixels may be not used for DC prediction.
      ii. In one example, the neighbor reference pixels may be set equal to 1<<(bitDepth-1) for DC prediction.
      iii. In one example, PDPC may be not applied for the DC prediction.
      iv. In one example, the DC mode information may be not coded for the M×N chroma intra block but derived.
   b. In one example, CCLM prediction may be used for M×N chroma intra prediction, for example, M=2 chroma samples, N=8 and/or 16 and/or 32 chroma samples.
      i. In one example, the reconstructed neighbor pixels may be not used for CCLM prediction.
      ii. In one example, for CCLM prediction predc=a*$rec_L$+b that the chroma prediction value predc is derived from luma reconstructed value $rec_L$, the parameters a and b may be initialed to default fixed values (such as a=0, b=512) at the beginning of a video unit such as SPS/video parameter set (VPS)/PPS/Picture/subpicture/Slice/Tile/Brick/CTU row/CTU/virtual pipeline data unit (VPDU)/CU/PU/transform unit (TU).
         1. In one example, a first-in-first-out table may be maintained on the fly to update the CCLM parameters a and b.
      iii. In one example, PDPC may be not applied for the CCLM prediction.
      iv. In one example, the CCLM mode information may be not coded for M×N chroma intra block but derived.
      v. Alternatively, the proposed methods may be applied to other kinds of CCLM coded chroma blocks with width unequal to M or height unequal to N.
         1. In one example, the CCLM parameters of previously coded blocks may be utilized for current block instead of being derived based on reconstruction information of current block's neighboring blocks.
         2. In one example, the CCLM parameters may be stored in a table and updated on-the-fly, such as using first in, first out (FIFO).
   c. In one example, M×N chroma intra blocks may be not allowed in dual tree, for example, M=2 chroma samples, N=8 and/or 16 and/or 32 chroma samples.
      i. In one example, when treeType is equal to DUAL_TREE_CHROMA, X split may be disabled for a coding tree node with dimension equal to (M*a)×(N*b), where M*a as the width of the coding tree node in chroma samples, and N*b as the height of the coding tree node in chroma samples.
         1. In one example, X is vertical BT split, a=2, b=1
         2. In one example, X is horizontal BT split, a=1, b=2
         3. In one example, X is vertical TT split, a=4, b=1
         4. In one example, X is horizontal TT split, a=1, b=4
   d. In one example, M×N chroma intra blocks may be not allowed in single tree, for example, M=2 chroma samples, N=8 and/or 16 and/or 32 chroma samples.
      i. In one example, in single tree, X split may be disabled for the chroma components of a coding tree node with dimension equal to (M*a*subWidthC)×(N*b*subHeightC), where M*a as the width of the coding tree node in luma samples, N*b as the height of the coding tree node in luma samples, and subWidthC and subHeightC as the chroma subsampling ratio in width and height dimentions, e.g., subWidthC and subHeightC are equal to 2 for 4:2:0 chroma format.
         1. In one example, X=vertical BT split, a=2, b=1
         2. In one example, X=vertical TT split, a=4, b=1
         3. In one example, X=horizontal BT split, a=1, b=2

4. In one example, X=horizontal TT split, a=1, b=2
5. In one example, X=horizontal TT split, a=1, b=4
6. In one example, the non-split chroma block may be with dimension equal to (M*a)×(N*d).
7. In one example, the non-split chroma block may be determined as MODE_TYPE_INTRA and only intra prediction (and/or IBC and/or PLT modes) may be allowed for this chroma block.
8. In one example, the X split may be allowed for the luma components of this coding tree node, e.g., the luma coding tree node may be further split to multiple luma child nodes, and each luma child nodes may be determined to MODE_TYPE_INTER while only inter prediction (and/or IBC mode) may be allowed.
9. Alternatively, the chroma component may be further split along with the collocated luma component, but the mode type may be equal to MODE_TYPE_INTER and only inter prediction (and/or IBC mode) may be allowed.
ii. In one example, M×N chroma intra blocks may be not allowed in CIIP.
1. In one example, CIIP may be not allowed for a coding block with dimension equal to (M*subWidthC)×(N*subHeightC) in luma samples.
a) When CIIP is not allowed, the associated syntax element such as CIIP flag may be not coded in the bitstream.
2. In one example, the chroma blending process in CIIP may be only filled with the predictions from inter part.
a) In one example, only luma intra prediction may be applied to a CIIP-coded block, while the chroma intra prediction may be not applied to a CIIP-coded block with dimension equal to (M*subWidthC)×(N*subHeightC) in luma samples.
3. In one example, DC prediction may be used for M×N chroma intra prediction for a CIIP block, as described in bullet 34(a).
4. In one example, CCLM prediction may be used for M×N chroma intra prediction for a CIIP block, as described in bullet 34(b).

Relationship Between losslessSizeY and maxCTB/maxTBsize/maxTS Size

35. The maximum transform size may be signalled and/or inferred in different ways for lossless (and/or near lossless coding) and lossy coding.
a. In one example, the maximum transform size for lossless and/or near lossless coding may be referred to as other terms such as "maximum residue size" or "maximum representing size" since no transform is involved. In this disclosure, it may be referred as "maxLosslessTbSizeY".
b. In one example, lossless coding for a block may be referred to a cu_transquant_bypass_flag for that block is equal to 1.
c. In one example, near lossless coding for a block may be referred to coding with a QP smaller than a given threshold.
i. In one example, the threshold may be indicated in dependency parameter set (DPS)/VPS/SPS/PPS/Tile/Slice/Brick header.
d. In one example, near lossless coding for a block may be referred to coding with a QP smaller than a given threshold and transform_skip_flag is equal to 1 for that block.
i. In one example, the threshold may be indicated in DPS/VPS/SPS/PPS/Tile/Slice/Brick header.
e. A first maximum transform size for lossless and/or near lossless coding (e.g., maxLosslessTbSizeY) may be set conditioned on the a second maximum tranform size which may be used for lossy coding, and/or maximum coding tree unit size, and/or maximum transform skip size.
f. The max transform size for lossless and/or near lossless coding may be signalled at video unit level such as a syntax element (SE) at SPS/VPS/PPS/Subpicture/Slice/Tile/Brick/CTU/VPDU.
i. In one example, the SE may be signalled depending on the maximum CTB size (e.g., log 2_ctu_size_minus5, CtbSizeY, and etc.)
1. For example, the flag may be signalled when log 2_ctu_size_minus5 is larger than N (such as N=0).
ii. In one example, the SE may be signalled depending on the maximum transform size (e.g., sps_max_luma_transform_size_64_flag, MaxTbSize, and etc.)
1. For example, the SE may be signalled when sps_max_luma_transform_size_64_flag is equal to M (such as M=1).
iii. In one example, the SE may be signalled depending on the maximum transform skip size (e.g., log 2_transform_skip_max_size_minus2, MaxTsSize, and etc.)
1. For example, the SE may be signalled when log 2_transform_skip_max_size_minus2 is larger than K (such as K=3).
iv. In one example, a delta value between log (maxLosslessTbSizeY) and X may be signalled.
1. For example, X may be equal to log 2_ctu_size_minus5
2. For example, X may be equal to sps_max_luma_transform_size_64_flag
3. For example, X may be equal to log 2_transform_skip_max_size_minus2
4. For example, X may be equal to a fixed integer.
5. In one example, delta−K may be signalled, where K is an integer such as 1.
v. In one example, a delta value between maxLosslessTbSizeY and X may be signalled.
1. For example, X may be equal to CtbSizeY
2. For example, X may be equal to MaxTbSize
3. For example, X may be equal to MaxTsSize
4. For example, X may be equal to a fixed integer.
5. In one example, delta−K may be signalled, where K is an integer such as 1.
vi. In one example, maxLosslessTbSizeY of a video unit (such as a sequence/picture/subpicture/slice/tile/CTU/VPDU/CU/PU/TU) may be derived from the SE.
vii. The SE may be a flag.
viii. When the flag is not present, it may be inferred to be equal to a postive integer N.
g. In one example, if lossless and/or nearlossless coding is applied to a video unit (such as cu_transquant_bypass_flag is equal to 1), the maximum transform size for the video unit may be set equal to maxLosslessTbSizeY, other than maxTbSizeY.

h. Alternatively, the maximum transform size for lossless and/or near lossless coding for a video unit (such as a sequence/picture/subpicture/slice/tile/CTU/VPDU/CU/PU/TU) may be derived instead of being signalled.
  i. For example, it may set equal to a fixed integer value M (such as M=32 in luma samples).
  ii. For example, it may be set equal to a second maximum tranform size which may be used for lossy coding
  iii. For example, it may be set equal to the maximum coding tree unit size,
  iv. For example, it may be set equal to the VPDU size,
  v. For example, it may be set equal to the maximum transform skip block size.
  vi. For example, it may be set equal to the maximum residue coding block size.
36. For a M×N residue block by lossless coding (and/or near lossless coding), it may be divided into more than one smaller residue sub-blocks depending on maxLosslessTbSizeY.
  a. After the division, the width and height of all the sub-blocks are no greater than maxLosslessTbSizeY.
  b. In one example, it may be divided into sub-blocks in a recursive way until the width and height of all the sub-blocks are no greater than maxLosslessTbSizeY.

Deblocking Related
37. Palette mode may be enabled in MODE_TYPE_ALL or MODE_TYPE_INTRA, but always disallowed in MODE_TYPE_INTER.
38. Deblocking boundary strength (bS) for chroma components may be set to 0 when one side is of IBC mode and the other side is of Palette mode.
  a. In one example, bS for chroma components, when ChromaArrayType is not equal to 0, is set to 0 when one side is of IBC mode and the other side is of Palette mode.

Minimal Allowed QP for Transform Skip Blocks Related
39. The syntax element, e.g. internal_minus_input_bit_depth shown in JVET-R0045, from which input bit depth can be inferred may be constrained according to a certain profile.
  a. In one example, (QpPrimeTsMin−4)/6 may be constrained to be within the range of [0, 2] in a 10-bit profile.
  b. In one example, (QpPrimeTsMin−4)/6 may be constrained to be 0 in a 8-bit profile.
  c. In one example, (QpPrimeTsMin−4)/6 may be constrained to be within [0, K] in a (K+8)-bit profile.
  d. In one example, (QpPrimeTsMin−4)/6 may be constrained to be within [0, K] in a (K+8)-bit profile.
40. The minimal allowed QP, e.g., QpPrimeTsMin, may be constrained according to a certain profile.
  a. In one example, (QpPrimeTsMin−4)/6 may be constrained to be within the range of [0, 2] in a 10-bit profile.
  b. In one example, (QpPrimeTsMin−4)/6 may be constrained to be 0 in a 8-bit profile.
  c. In one example, (QpPrimeTsMin−4)/6 may be constrained to be within [0, K] in a (K+8)-bit profile.
  d. In one example, (QpPrimeTsMin−4)/6 may be constrained to be within [0, K] in a (K+8)-bit profile.

5. Embodiments

Newly added parts are marked in bold and Italic, and the deleted parts from VVC working draft are marked with double brackets (e.g., [[a]] denotes the deletion of the character "a"). The modifications are based on the latest VVC working draft (JVET-O2001-v11)

5.1 an Example Embodiment #1

The embodiment below is about the constraints on small block partitions and prediction modes are applied to 4:2:0 and 4:4:4 chromaformats only (not apply to 4:0:0 and 4:4:4 chromaformats).

7.4.9.4 Coding Tree Semantics

The variable modeTypeCondition is derived as follows:
If one of the following conditions is true, modeTypeCondition is set equal to 0
  slice_type==I and qtbtt_dual_tree_intra_flag is equal to 1
  modeTypeCurr is not equal to MODE_TYPE_ALL
  – *chroma_format_idc is equal to 0*
  – *chroma_format_idc is equal to 3*
Otherwise, if one of the following conditions is true, modeTypeCondition is set equal to 1
  cbWidth*cbHeight is equal to 64 and split_qt_flag is equal to 1
  cbWidth*cbHeight is equal to 64 and MttSplitMode[x0][y0][mttDepth] is equal to SPLIT_TT_HOR or SPLIT_TT_VER
  cbWidth*cbHeight is equal to 32 and MttSplitMode[x0][y0][mttDepth] is equal to SPLIT_BT_HOR or SPLIT_BT_VER
Otherwise, if one of the following conditions is true, modeTypeCondition is set equal to 1+(slice_type !=I ? 1:0)
  cbWidth*cbHeight is equal to 64 and MttSplitMode[x0][y0][mttDepth] is equal to SPLIT_BT_HOR or SPLIT_BT_VER
  cbWidth*cbHeight is equal to 128 and MttSplitMode[x0][y0][mttDepth] is equal to SPLIT_TT_HOR or SPLIT_TT_VER
Otherwise, modeTypeCondition is set equal to 0

5.2 an Example Embodiment #2

The embodiment below is about the signaling of Palette mode flag not depend on the modeType.

7.3.8.5 Coding Unit Syntax

| coding_unit( x0, y0, cbWidth, cbHeight, cqtDepth, treeType, modeType ) { | Descriptor |
|---|---|
| chType = treeType = = DUAL_TREE_CHROMA? 1 : 0 | |
| if( slice_type != I \|\| sps_ibc_enabled_flag \|\| sps_palette_enabled_flag) { | |
|   if( treeType != DUAL_TREE_CHROMA && !( ( ( cbWidth = = 4 && cbHeight = = 4 ) \|\| modeType = = MODE_TYPE_INTRA ) && !sps_ibc_enabled_flag ) ) | |
|     cu_skip_flag[ x0 ][ y0 ] | ae(v) |
|   if( cu_skip_flag[ x0 ][ y0 ] = = 0 && slice_type!= I && !( cbWidth = = 4 && cbHeight = = 4 ) && modeType = = MODE_TYPE_ALL ) | |

| coding_unit( x0, y0, cbWidth, cbHeight, cqtDepth, treeType, modeType ) { | Descriptor |
|---|---|
|     pred_mode_flag | ae(v) |
|   if( ( ( slice_type = = I && cu_skip_flag[ x0 ][ y0 ] = =0 ) \|\| <br>     ( slice_type != I && ( CuPredMode[ chType ][ x0 ][ y0 ] != MODE_INTRA \|\| <br>     (cbWidth == 4 && cbHeight == 4 && cu_skip_flag[ x0 ][ y0 ] == 0 )))) && <br>     cbWidth <= 64 && cbHeight <= 64 && modeType != MODE_TYPE_INTER && <br>     sps_ibc_enabled_flag && treeType != DUAL_TREE_CHROMA <br>   ) | |
|     pred_mode_ibc_flag | ae(v) |
|   if( ( ( ( slice_type == I \|\| ( cbWidth == 4 && cbHeight == 4 ) \|\| sps_ibc_enabled_flag ) && <br>     CuPredMode[ x0 ][ y0 ] == MODE_INTRA ) \|\| <br>     ( slice_type != I && !( cbWidth == 4 && cbHeight == 4 ) && !sps_ibc_enabled_flag <br>     && CuPredMode[ x0 ][ y0 ] != MODE_INTRA ) ) && <br>     sps_palette_enabled_flag && <br>     cbWidth <= 64 && cbHeight <= 64 && && cu_skip_flag[ x0 ][ y0 ] == 0 [[&& <br>     modeType != MODE_INTER ]]) | |
|     pred_mode_plt_flag | ae(v) |

5.3 an Example Embodiment #3

The embodiment below is about the IBC prediction mode flag is inferred depending on the CU SKIP flag and the mode Type.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred as follows:

- If cu_skip_flag[x0][y0] is equal to 1, and cbWidth is equal to 4, and cbHeight is equal to 4, pred_mode_ibc_flag is inferred to be equal 1.
- Otherwise, if both cbWidth and cbHeight are equal to 128, pred_mode_ibc_flag is inferred to be equal to 0.
- [[Otherwise, if cu_skip_flag[x0][y0] is equal to 1, and modeType is equal to MODE_TYPE_INTRA, pred_mode_ibc_flag is inferred to be equal to 1.]]
- Otherwise, if modeType is equal to MODE_TYPE_INTER, pred_mode_ibc_flag is inferred to be equal to 0.
- Otherwise, if treeType is equal to DUAL_TREE_CHROMA, pred_mode_ibc_flag is inferred to be equal to 0.
- Otherwise, pred_mode_ibc_flag is infered to be equal to the value of sps_ibc_enabled_flag when decoding an I slice, and 0 when decoding a P or B slice, respectively.

When pred_mode_ibc_flag is equal to 1, the variable CuPredMode[chType][x][y] is set to be equal to MODE_IBC for x=x0 . . . x0+cbWidth−1 and y=y0 . . . y0+cbHeight−1.

5.4 an Example Embodiment #4

The embodiment below is about the signaling of IBC prediction mode flag depend on MODE TYPE INTRA, and/or IBC mode is allowed for luma blocks regardless of whether it is small block size.

7.3.8.5 Coding Unit Syntax

| coding_unit( x0, y0, cbWidth, cbHeight, cqtDepth, treeType, modeType ) { | Descriptor |
|---|---|
|   chType = treeType == DUAL_TREE_CHROMA? 1 : 0 <br>   if( slice_type != I \|\| sps_ibc_enabled_flag \|\| sps_palette_enabled_flag) { <br>     if( treeType != DUAL_TREE_CHROMA && <br>     !( ( ( cbWidth == 4 && cbHeight == 4 ) \|\| modeType == MODE_TYPE_INTRA ) <br>     && !sps_ibc_enabled_flag ) ) | |
|     cu_skip_flag[ x0 ][ y0 ] | ae(v) |
|   if( cu_skip_flag[ x0 ][ y0 ] == 0 && slice_type != I <br>     && !( cbWidth == 4 && cbHeight == 4 ) && modeType == MODE_TYPE_ALL ) | |
|     pred_mode_flag | ae(v) |
|   if( ( ( slice_type == I && cu_skip_flag[ x0 ][ y0 ] = =0 ) \|\| <br>     ( slice_type != I && ( CuPredMode[ chType ][ x0 ][ y0 ] != MODE_INTRA \|\| <br>     *( modeType == MODE_TYPE_INTRA && cu_skip_flag[ x0 ][ y0 ] == 0 )* <br>     ( cbWidth == 4 && cbHeight == 4 && cu_skip_flag[ x0 ][ y0 ] == 0 )))) && <br>     cbWidth <= 64 && cbHeight <= 64 && modeType != MODE_TYPE_INTER && <br>     sps_ibc_enabled_flag && treeType != DUAL_TREE_CHROMA <br>   ) | |
|     pred_mode_ibc_flag | ae(v) |

5.5 an Example Embodiment #5
The embodiment below is about applying different intra blocks constraints for 4:2:0 and 4:2:2 color formats.

7.4.9.4 Coding Tree Semantics
The variable modeTypeCondition is derived as follows:
If one of the following conditions is true, modeTypeCondition is set equal to 0
  slice_type==I and qtbtt_dual_tree_intra_flag is equal to 1
  modeTypeCurr is not equal to MODE_TYPE_ALL
Otherwise, if one of the following conditions is true, modeTypeCondition is set equal to 1
  cbWidth*cbHeight is equal to 64 and split_qt_flag is equal to 1
  cbWidth*cbHeight is equal to 64 and MttSplitMode[x0][y0][mttDepth] is equal to SPLIT_TT_HOR or SPLIT_TT_VER
  cbWidth*cbHeight is equal to 32 and MttSplitMode[x0][y0][mttDepth] is equal to SPLIT_BT_HOR or SPLIT_BT_VER
Otherwise, if one of the following conditions is true, modeTypeCondition is set equal to 1+(slice_type !=I ? 1:0)
  cbWidth*cbHeight is equal to 64 and MttSplitMode[x0][y0][mttDepth] is equal to SPLIT_BT_HOR or SPLIT_BT_VER and chroma_format_idc is equal to 1
  cbWidth*cbHeight is equal to 128 and MttSplitMode[x0][y0][mttDepth] is equal to SPLIT_TT_HOR or SPLIT_TT_VER and chroma_format_idc is equal to 1
  – *cbWidth is equal to 8 and cbHeight is equal to 8 and MttSplitMode[ x0 ][ y0 ][ mttDepth ] is equal to SPLIT_BT_VER and chroma_format_idc is equal to 2*
  – *cbWidth is equal to 4 and cbHeight is equal to 16 and MttSplitMode[ x0 ][ y0 ][ mttDepth ] is equal to SPLIT_BT_HOR and chroma_format_idc is equal to 2*
  – *cbWidth is equal to 16 and cbHeight is equal to 8 and MttSplitMode[ x0 ][ y0 ][ mttDepth ] is equal to SPLIT_TT_VER and chroma_format_idc is equal to 2*
  – *cbWidth is equal to 4 and cbHeight is equal to 32 and MttSplitMode[ x0 ][ y0 ][ mttDepth ] is equal to SPLIT_TT_HOR and chroma_format_idc is equal to 2*
Otherwise, modeTypeCondition is set equal to 0
SPLIT_TT_HOR and
5.6 an Example Embodiment #6
The embodiment below is about disallowing 2×N chroma intra blocks in single tree.

7.4.9.4 Coding Tree Semantics
The variable modeTypeCondition is derived as follows:
If one of the following conditions is true, modeTypeCondition is set equal to 0
  slice_type==I and qtbtt_dual_tree_intra_flag is equal to 1
  modeTypeCurr is not equal to MODE_TYPE_ALL
Otherwise, if one of the following conditions is true, modeTypeCondition is set equal to 1
  cbWidth*cbHeight is equal to 64 and split_qt_flag is equal to 1
  cbWidth*cbHeight is equal to 64 and MttSplitMode[x0][y0][mttDepth] is equal to SPLIT_TT_HOR or SPLIT_TT_VER
  cbWidth*cbHeight is equal to 32 and MttSplitMode[x0][y0][mttDepth] is equal to SPLIT_BT_HOR or SPLIT_BT_VER
Otherwise, if one of the following conditions is true, modeTypeCondition is set equal to 1+(slice_type !=I ? 1:0)
  cbWidth*cbHeight is equal to 64 and MttSplitMode[x0][y0][mttDepth] is equal to SPLIT_BT_HOR or SPLIT_BT_VER
  cbWidth*cbHeight is equal to 128 and MttSplitMode[x0][y0][mttDepth] is equal to SPLIT_TT_HOR or SPLIT_TT_VER
  – *cbWidth is equal to 8 and MttSplitMode[ x0 ][ y0 ][ mttDepth ] is equal to SPLIT_BT_VER*
  – *cbWidth is equal to 16 and MttSplitMode[ x0 ][ y0 ][ mttDepth ] is equal to SPLIT_TT_VER*
Otherwise, modeTypeCondition is set equal to 0
5.7 an Example Embodiment #7
The embodiment below is about disallowing 2×N chroma intra blocks in dual tree.

6.4.2 Allowed Binary Split Process
The variable allowBtSplit is derived as follows:
If one or more of the following conditions are true, allowBtSplit is set equal to FALSE:
  cbSize is less than or equal to MinBtSizeY
  cbWidth is greater than maxBtSize
  cbHeight is greater than maxBtSize
  mttDepth is greater than or equal to maxMttDepth
  treeType is equal to DUAL_TREE_CHROMA and (cbWidth/SubWidthC)*(cbHeight/SubHeightC) is less than or equal to 16
  - *btSplit is equal to SPLIT_BT_VER and treeType is equal to DUAL_TREE_CHROMA and ( cbWidth / SubWidthC ) is less than or equal to 4*
  treeType is equal to DUAL_TREE_CHROMA and modeType is equal to MODE_TYPE_INTRA 6.4.3 Allowed Ternary Split Process
The variable allowTtSplit is derived as follows:
If one or more of the following conditions are true, allowTtSplit is set equal to FALSE:
  cbSize is less than or equal to 2*MinTtSizeY
  cbWidth is greater than Min(MaxTbSizeY, maxTtSize)
  cbHeight is greater than Min(MaxTbSizeY, maxTtSize)
  mttDepth is greater than or equal to maxMttDepth
  x0+cbWidth is greater than pic_width_in_luma_samples
  y0+cbHeight is greater than pic_height_in_luma_samples
  treeType is equal to DUAL_TREE_CHROMA and (cbWidth/SubWidthC)*(cbHeight/SubHeightC) is less than or equal to 32
  - *btSplit is equal to SPLIT_TT_VER and treeType is equal to DUAL_TREE_CHROMA and ( cbWidth / SubWidthC ) is less than or equal to 8*
  treeType is equal to DUAL_TREE_CHROMA and modeType is equal to MODE_TYPE_INTRA Otherwise, allowTtSplit is set equal to TRUE.

5.8 an Example Embodiment #8

The embodiment below is about enabling MODE_IBC for SCIPU chroma blocks.

7.3.8.5 Coding Unit Syntax

| coding_unit( x0, y0, cbWidth, cbHeight, cqtDepth, treeType, modeType ) { | Descriptor |
|---|---|
| chType = treeType = = DUAL_TREE_CHROMA? 1 : 0 | |
| if( slice_type != I \|\| sps_ibc_enabled_flag \|\| sps_palette_enabled_flag) { | |
|   if( treeType != DUAL_TREE_CHROMA && | |
|     !( ( ( cbWidth = = && cbHeight = = 4 ) \|\| modeType = = MODE_TYPE_INTRA ) | |
|     && !sps_ibc_enabled_flag ) ) | |
|     cu_skip_flag[ x0 ][ y0 ] | ae(v) |
|   if( cu_skip_flag[ x0 ][ y0 ] = = 0 && slice_type != I | |
|     && !( cbWidth = = 4 && cbHeight = = 4 ) && modeType = = MODE_TYPE_ALL ) | |
|     pred_mode_flag | ae(v) |
|   if( ( ( slice_type = = I && cu_skip_flag[ x0 ][ y0 ] = =0 ) \|\| | |
|     ( slice_type != I && ( CuPredMode[ chType ][ x0 ][ y0 ] != MODE_INTRA \|\| | |
|     *( modeType = = MODE_TYPE_INTRA && cu_skip_flag[ x0 ][ y0 ] == 0 )* | |
|     ( cbWidth = = 4 && cbHeight = = 4 && cu_skip_flag[ x0 ][ y0 ] = = 0 ) ) ) | |
|     && cbWidth <= 64 && cbHeight <= 64 && modeType != MODE_TYPE_INTER && | |
|     sps_ibc_enabled_flag && *!(modeType ==MODE_TYPE_ALL && treeType == DUAL_TREE_CHROMA)*[[treeType != DUAL_TREE_CHROMA)]] | |
|     pred_mode_ibc_flag | ae(v) |

5.9 an Example Embodiment 99 on Disallowing Block Partition when modeType is MODE_TYPE_INTER (Solution 1)

6.4.2 Allowed Binary Split Process

The variable allowBtSplit is derived as follows:

If one or more of the following conditions are true, allowBtSplit is set equal to FALSE:

cbSize is less than or equal to MinBtSizeY cbWidth is greater than maxBtSize cbHeight is greater than maxBtSize mttDepth is greater than or equal to maxMttDepth treeType is equal to DUAL_TREE_CHROMA and (cbWidth/SubWidthC)*(cbHeight/SubHeightC) is less than or equal to 16

– *modeType is equal to MODE_TYPE_INTER and and cbWidth\* cbHeight is less than or equal to 32* treeType is equal to DUAL_TREE_CHROMA and modeType is equal to MODE_TYPE_INTRA 6.4.3 Allowed Ternary Split Process The variable allowTtSplit is derived as follows:

If one or more of the following conditions are true, allowTtSplit is set equal to FALSE:

cbSize is less than or equal to 2*MinTtSizeY cbWidth is greater than Min(MaxThSizeY, maxTtSize)

cbHeight is greater than Min(MaxTbSizeY, maxTtSize)

mttDepth is greater than or equal to maxMttDepth x0+cbWidth is greater than pic_width_in_luma_samples y0+cbHeight is greater than pic_height_in_luma_samples treeType is equal to DUAL_TREE_CHROMA and (cbWidth/SubWidthC)*(cbHeight/SubHeightC) is less than or equal to 32

– *modeType is equal to MODE_TYPE_INTER and and cbWidth\* cbHeight is less than or equal to 64* treeType is equal to DUAL_TREE_CHROMA and modeType is equal to MODE_TYPE_INTRA

Otherwise, allowTtSplit is set equal to TRUE.

5.10 an Example Embodiment #10 on Disallowing Block Partition when modeType is MODE_TYPE_INTER (Solution 2)

6.4.2 Allowed Binary Split Process

The variable allowBtSplit is derived as follows:

If one or more of the following conditions are true, allowBtSplit is set equal to FALSE:

cbSize is less than or equal to MinBtSizeY cbWidth is greater than maxBtSize cbHeight is greater than maxBtSize mttDepth is greater than or equal to maxMttDepth treeType is equal to DUAL_TREE_CHROMA and (cbWidth/SubWidthC)*(cbHeight/SubHeightC) is less than or equal to 16

– *modeType is equal to MODE_TYPE_INTER* treeType is equal to DUAL_TREE_CHROMA and modeType is equal to MODE_TYPE_INTRA 6.4.3 Allowed Ternary Split Process The variable allowTtSplit is derived as follows:

If one or more of the following conditions are true, allowTtSplit is set equal to FALSE:

cbSize is less than or equal to 2*MinTtSizeY cbWidth is greater than Min(MaxThSizeY, maxTtSize)

cbHeight is greater than Min(MaxTbSizeY, maxTtSize)

mttDepth is greater than or equal to maxMttDepth x0+cbWidth is greater than pic_width_in_luma_samples y0+cbHeight is greater than pic_height_in_luma_samples treeType is equal to DUAL_TREE_CHROMA and (cbWidth/SubWidthC)*(cbHeight/SubHeightC) is less than or equal to 32

– *modeType is equal to MODE_TYPE_INTER* treeType is equal to DUAL_TREE_CHROMA and modeType is equal to MODE_TYPE_INTRA

Otherwise, allowTtSplit is set equal to TRUE.

5.11 an Example Embodiment #11

The embodiment below is about the constraints further splitting of a coding tree when MODE_TYPE_INTER is derived.

7.3.8.4 Coding Tree Syntax

| coding_tree( x0, y0, cbWidth, cbHeight, qgOnY, qgOnC, cbSubdiv, cqtDepth, mttDepth, depthOffset, partIdx, treeTypeCurr, modeTypeCurr ) { | Descriptor |
|---|---|
| . . . | |
| treeType = ( modeType == MODE_TYPE_INTRA ) ? DUAL_TREE_LUMA : treeTypeCurr | |
| *if ( modeType ==MODE_TYPE_INTER )* | |
| *mttDepth = max( mttDepthmaxMttDepth - 1 )* | |
| if( !split_qt_flag ) { | |
| . . . | |

5.12 an Example Embodiment #12

The embodiment below is about the constraints on small block partitions and prediction modes are not applied when palette mode is enabled.

7.4.9.4 Coding Tree Semantics

The variable modeTypeCondition is derived as follows:

If one of the following conditions is true, modeTypeCondition is set equal to 0
- slice_type==I and qtbtt_dual_tree_intra_flag is equal to 1
- modeTypeCurr is not equal to MODE_TYPE_ALL
- *sps_palette_enabled_flag is equal to 1*

Otherwise, if one of the following conditions is true, modeTypeCondition is set equal to 1
- cbWidth*cbHeight is equal to 64 and split_qt_flag is equal to 1
- cbWidth*cbHeight is equal to 64 and MttSplitMode[x0][y0][mttDepth] is equal to SPLIT_TT_HOR or SPLIT_TT_VER
- cbWidth*cbHeight is equal to 32 and MttSplitMode[x0][y0][mttDepth] is equal to SPLIT_BT_HOR or SPLIT_BT_VER Otherwise, if one of the following conditions is true, modeType Condition is set equal to 1+(slice_type !=I ? 1:0)
- cbWidth*cbHeight is equal to 64 and MttSplitMode[x0][y0][mttDepth] is equal to SPLIT_BT_HOR or SPLIT_BT_VER
- cbWidth*cbHeight is equal to 128 and MttSplitMode[x0][y0][mttDepth] is equal to SPLIT_TT_HOR or SPLIT_TT_VER Otherwise, modeTypeCondition is set equal to 0

5.13 an Example Embodiment #13

The embodiment below is about the small chroma intra block constraints for 4:2:2 color formats.

7.4.9.4 Coding Tree Semantics

The variable modeTypeCondition is derived as follows:

If one of the following conditions is true, modeTypeCondition is set equal to 0
- slice_type==I and qtbtt_dual_tree_intra_flag is equal to 1
- modeTypeCurr is not equal to MODE_TYPE_ALL Otherwise, if one of the following conditions is true, modeTypeCondition is set equal to 1
- cbWidth*cbHeight is equal to 64 and split_qt_flag is equal to 1
- cbWidth*cbHeight is equal to 64 and MttSplitMode[x0][y0][mttDepth] is equal to SPLIT_TT_HOR or SPLIT_TT_VER
- cbWidth*cbHeight is equal to 32 and MttSplitMode[x0][y0][mttDepth] is equal to SPLIT_BT_HOR or SPLIT_BT_VER Otherwise, if *chroma_format_idc is equal to 1 and* one of the following conditions is true, modeTypeCondition is set equal to 1+(slice_type !=I ? 1:0) *chroma_format_idc is equal to 1 and*
- cbWidth*cbHeight is equal to 64 and MttSplitMode[x0][y0][mttDepth] is equal to SPLIT_BT_HOR or SPLIT_BT_VER
- cbWidth*cbHeight is equal to 128 and MttSplitMode[x0][y0][mttDepth] is equal to SPLIT_TT_HOR or SPLIT_TT_VER Otherwise, modeTypeCondition is set equal to 0

5.14 Example #1 of Delta QP Signaling in SCIPU

| coding_tree( x0, y0, cbWidth, cbHeight, qgOnY, qgOnC, cbSubdiv, cqtDepth, mttDepth, depthOffset, partIdx, treeTypeCurr, modeTypeCurr ) { | Descriptor |
|---|---|
| if( ( allowSplitBtVer \|\| allowSplitBtHor \|\| allowSplitTtVer \|\| allowSplitTtHor \|\| allowSplitQT ) &&( x0 + cbWidth <= pic_width_in_luma_samples ) && (y0 + cbHeight <= pic_height_in_luma_samples ) ) | |
| split_cu_flag | ae(v) |
| if( cu_qp_delta_enabled_flag && qgOnY && cbSubdiv <= cu_qp_delta_subdiv ) { | |
| IsCuQpDeltaCoded = 0 | |
| CuQpDeltaVal = 0 | |
| CuQgTopLeftX = x0 | |
| CuQgTopLeftY = y0 | |
| } | |
| if( cu_chroma_qp_offset_enabled flag && qgOnC && cbSubdiv <= cu_chroma_qp_offset_subdiv ) | |
| IsCuChromaQpOffsetCoded = 0 | |
| if( split_cu_flag ) { | |
| if( ( allowSplitBtVer \|\| allowSplitBtHor \|\| allowSplitTtVer \|\| allowSplitTtHor ) && | |

| coding_tree( x0, y0, cbWidth, cbHeight, qgOnY, qgOnC, cbSubdiv, cqtDepth,<br>       mttDepth, depthOffset, partIdx, treeTypeCurr, modeTypeCurr ) { | Descriptor |
|---|---|
|           allowSplitQT ) | |
|          split_qt_flag | ae(v) |
|       if( !split_qt_flag ) { | |
|         if( ( allowSplitBtHor    \|\|    allowSplitTtHor ) && | |
|       ( allowSplitBtVer \|\| allowSplitTtVer ) ) | |
|         mtt_split_cu_vertical_flag | ae(v) |
|         if( ( allowSplitBtVer    &&    allowSplitTtVer   && | |
| mtt_split_cu_vertical_flag           )                       \|\| | |
|         ( allowSplitBtHor    &&    allowSplitTtHor | |
| && !mtt_split_cu_vertical_flag ) ) | |
|         mtt_split_cu_binary_flag | ae(v) |
|       } | |
|       if( modeTypeCondition = = 1 ) | |
|         modeType = MODE_TYPE_INTRA | |
|       else if( modeTypeCondition = = 2 ) { | |
|         mode_constraint_flag | ae(v) |
|     modeType = mode_constraint_flag ? MODE_TYPE_INTRA : MODE_TYPE_INTER | |
|       } else { | |
|         modeType = modeTypeCurr | |
|       } | |
|       treeType = ( modeType                                  = = | |
| MODE_TYPE_INTRA ) ? DUAL_TREE_LUMA : treeTypeCurr | |
|       if( !split_qt_flag ) { | |
|         if( MttSplitMode[ x0 ][ y0 ][ mttDepth ] = = SPLIT_BT_VER ) { | |
| depthOffset += ( x0 + cbWidth > pic_width_in_luma_samples ) ? 1 : 0 | |
|           x1 = x0 + ( cbWidth / 2 ) | |
|           coding_tree( x0, y0, cbWidth / 2, cbHeight, qgOnY, qgOnC, | |
| cbSubdiv + 1, | |
|     cqtDepth, mttDepth + 1, depthOffset, 0, treeType, modeType ) | |
|           if( x1 < pic_width_in_luma_samples ) | |
|             coding_tree( x1, y0, cbWidth / 2, cbHeightY, qgOnY, qgOnC,         cbSubdiv + 1, | |
|     cqtDepth, mttDepth + 1, depthOffset, 1, treeType, modeType ) | |
|         } else if( MttSplitMode[ x0 ][ y0 ][ mttDepth ] = = SPLIT _BT HOR ) { | |
| depthOffset += ( y0 + cbHeight > pic_height_in_luma_samples ) ? 1 : 0 | |
|           y1 = y0 + ( cbHeight / 2 ) | |
|           coding_tree( x0, y0, cbWidth, cbHeight / 2, qgOnY, qgOnC, | |
| cbSubdiv + 1, | |
|     cqtDepth, mttDepth + 1, depthOffset, 0, treeType, modeType ) | |
|           if( y1 < pic_height_in_luma_samples ) | |
|             coding_tree( x0, y1, cbWidth, cbHeight / 2, qgOnY, qgOnC,         cbSubdiv + 1, | |
|     cqtDepth, mttDepth + 1, depthOffset, 1, treeType, modeType ) | |
|         } else if( MttSplitMode[ x0 ] [ y0 ] [ mttDepth ] = = SPLIT_TT_VER ) { | |
|           x1 = x0 + ( cbWidth / 4 ) | |
|           x2 = x0 + ( 3 * cbWidth / 4 ) | |
|          qgOnYnext =   qgOnY   &&     ( cbSubdiv + 2           <= | |
| cu_qp_delta_subdiv ) | |
|           qgOnCnext =   qgOnC   &&   ( cbSubdiv + 2         <= | |
| cu_chroma_qp_offset_subdiv ) | |
|         coding_tree( x0, y0, cbWidth / 4, cbHeight, qgOnYnext, qgOnCnext,        cbSubdiv + 2, | |
|     cqtDepth, mttDepth + 1, depthOffset, 0, treeType, modeType ) | |
|         coding_tree( x1, y0, cbWidth / 2, cbHeight, qgOnYnext, qgOnCnext,       cbSubdiv + 1, | |
|     cqtDepth, mttDepth + 1, depthOffset, 1, treeType, modeType ) | |
|         coding_tree( x2, y0, cbWidth / 4, cbHeight, qgOnYnext, qgOnCnext       cbSubdiv + 2, | |
|     cqtDepth, mttDepth + 1, depthOffset, 2, treeType, modeType ) | |
|         } else { /* SPLIT_TT_HOR */ | |
|           y1 = y0 + (cbHeight / 4 ) | |
|           y2 = y0 + ( 3 * cbHeight / 4 ) | |
|         qgOnYnext =     qgOnY   &&     ( cbSubdiv + 2<= | |
| cu_qp_delta_subdiv ) | |
|           qgOnCnext =    qgOnC   &&   (   cbSubdiv + 2         <= | |
| cu_chroma_qp_offset_subdiv ) | |
|         coding_tree( x0, y0, cbWidth, cbHeight / 4, qgOnYnext, qgOnCnext       cbSubdiv + 2, | |
|     cqtDepth, mttDepth + 1, depthOffset, 0, treeType, modeType ) | |
|         coding_tree( x0, y1, cbWidth, cbHeight / 2, qgOnYnext, qgOnCnext        cbSubdiv + 1, | |
|     cqtDepth, mttDepth + 1, depthOffset, 1, treeType, modeType ) | |
|         coding_tree( x0, y2, cbWidth, cbHeight / 4, qgOnYnext, qgOnCnext       cbSubdiv + 2, | |
|     cqtDepth, mttDepth + 1, depthOffset, 2, treeType, modeType ) | |
|         } | |
|       } else { | |
|         x1 = x0 + ( cbWidth / 2 ) | |
|         y1 = y0 + ( cbHeight / 2 ) | |
|         coding_tree( x0, y0, cbWidth / 2, cbHeight / 2, qgOnY, qgOnC, | |
| cbSubdiv + 2, | |
|     cqtDepth + 1, 0, 0, 0, treeType, modeType ) | |
|         if( x1 < pic_width_in_luma_samples ) | |
|           coding_tree( x1, y0, cbWidth / 2, cbHeight / 2, qgOnY, qgOnC, | |

| | Descriptor |
|---|---|
| coding_tree( x0, y0, cbWidth, cbHeight, qgOnY, qgOnC, cbSubdiv, cqtDepth,<br>      mttDepth, depthOffset, partIdx, treeTypeCurr, modeTypeCurr ) { | |

```
        cbSubdiv + 2,
            cqtDepth + 1, 0, 0, 1, treeType, modeType )
            if( y1 < pic_height_in_luma_samples )
                coding_tree( x0, y1, cbWidth / 2, cbHeight / 2, qgOnY, qgOnC,
cbSubdiv + 2,
            cqtDepth + 1, 0, 0, 2, treeType, modeType )
            if( y1  < pic_height_in_luma_samples      &&     x1    <
pic_width_in_luma_samples )
                coding_tree( x1, y1, cbWidth / 2, cbHeight / 2, qgOnY, qgOnC,
cbSubdiv + 2,
            cqtDepth + 1, 0, 0, 3, treeType, modeType )
        }
        if(    modeTypeCur   = =  MODE_TYPE_ALL   &&   modeType   = =
MODE_TYPE_INTRA ) {
            coding_tree( x0, y0, cbWidth, cbHeight,  qgOnY, qgOnC,  cbSubdiv,
cqtDepth,        mttDepth,                 0,              0
DUAL_TREE_CHROMA, modeType )
        }
    } else
        coding_unit( x0, y0, cbWidth, cbHeight, cqtDepth, treeTypeCurr, modeTypeCurr )
}
```

5.15 Example #2 of Delta QP Signaling in SCIPU

| | Descriptor |
|---|---|
| coding_tree( x0, y0, cbWidth, cbHeight, qgOnY, qgOnC, cbSubdiv, cqtDepth, mttDepth, depthOffset,<br>      partIdx, treeTypeCurr, modeTypeCurr ) {<br>  if( ( allowSplitBtVer \|\| allowSplitBtHor \|\| allowSplitTtVer \|\| allowSplitTtHor \|\| allowSplitQT )<br>    &&( x0 + cbWidth <= pic_width_in_luma_samples )<br>    && (y0 + cbHeight <= pic_height_in_luma_samples ) )<br>    split_cu_flag | ae(v) |
|   if( cu_qp_delta_enabled_flag && qgOnY && cbSubdiv <= cu_qp_delta_subdiv ) {<br>    IsCuQpDeltaCoded = 0<br>    CuQpDeltaVal = 0<br>    CuQgTopLeftX = x0<br>    CuQgTopLeftY = y0<br>  }<br>  if( cu_chroma_qp_offset_enabled_flag && qgOnC &&<br>    cbSubdiv <= cu_chroma_qp_offset_subdiv )<br>    IsCuChromaQpOffsetCoded = 0<br>  if( split_cu_flag ) {<br>    if( ( allowSplitBtVer \|\| allowSplitBtHor \|\| allowSplitTtVer \|\| allowSplitTtHor ) &&<br>      allowSplitQT )<br>      split_qt_flag | ae(v) |
|     if( !split_qt_flag ) {<br>      if( ( allowSplitBtHor \|\| allowSplitTtHor ) &&<br>        ( allowSplitBtVer \|\| allowSplitTtVer ) )<br>      mtt_split_cu_vertical_flag | ae(v) |
|       if( ( allowSplitBtVer && allowSplitTtVer &&<br>mtt_split_cu_vertical_flag ) \|\|<br>        ( allowSplitBtHor && allowSplitTtHor<br>&& !mtt_split_cu_vertical_flag ) )<br>      mtt_split_cu_binary_flag | ae(v) |
|     }<br>    if( modeTypeCondition = = 1 )<br>      modeType = MODE_TYPE_INTRA<br>    else if( modeTypeCondition = = 2 ) {<br>      mode_constraint_flag | ae(v) |
|       modeType = mode_constraint_flag ? MODE_TYPE_INTRA : MODE_TYPE_INTER<br>    } else {<br>      modeType = modeTypeCurr<br>    }<br>    treeType = ( modeType = =<br>MODE_TYPE_INTRA ) ? DUAL_TREE_LUMA : treeTypeCurr<br>    if( !split_qt_flag ) {<br>      if( MttSplitMode[ x0 ][ y0 ][ mttDepth ] = = SPLIT_BT_VER ) {<br>    depthOffset += ( x0 + cbWidth > pic_width_in_luma_samples ) ? 1 : 0<br>      x1 = x0 + ( cbWidth / 2 )<br>      coding_tree( x0, y0, cbWidth / 2, cbHeight, qgOnY, qgOnC,<br>cbSubdiv + 1,<br>  cqtDepth, mttDepth + 1, depthOffset, 0, treeType, modeType ) | |

|  |
| ---: |
| Descriptor |

```
            if( x1 < pic_width_in_luma_samples )
      coding_tree( x1, y0, cbWidth / 2, cbHeightY, qgOnY, qgOnC, cbSubdiv + 1,
      cqtDepth, mttDepth + 1, depthOffset, 1, treeType, modeType )
            } else if( MttSplitMode[ x0 ][ y0 ][ mttDepth ] = = SPLIT_BT_HOR ) {
      depthOffset += ( y0 + cbHeight > pic_height_in_luma_samples ) ? 1 : 0
            y1 = y0 + ( cbHeight / 2 )
            coding_tree( x0, y0, cbWidth, cbHeight / 2, qgOnY, qgOnC,
cbSubdiv + 1,
      cqtDepth, mttDepth + 1, depthOffset, 0, treeType, modeType )
            if( y1 < pic_height_in_luma_samples )
      coding_tree( x0, y1, cbWidth, cbHeight / 2, qgOnY, qgOnC, cbSubdiv + 1,
      cqtDepth, mttDepth + 1, depthOffset, 1, treeType, modeType )
            } else if( MttSplitMode[ x0 ][ y0 ][ mttDepth ] = = SPLIT_TT_VER ) {
            x1 = x0 + ( cbWidth / 4 )
            x2 = x0 + ( 3 * cbWidth / 4 )
            *qgOnYnext* = qgOnY && ( cbSubdiv + 2 <=
cu_qp_delta_subdiv )
            *qgOnCnext* = qgOnC && ( cbSubdiv + 2 <=
cu_chroma_qp_offset_subdiv )
      coding_tree( x0, y0, cbWidth / 4, cbHeight,*qgOnYnext*,*qgOnCnext*, cbSubdiv + 2,
      cqtDepth, mttDepth + 1, depthOffset, 0, treeType, modeType )
      coding_tree( x1, y0, cbWidth / 2, cbHeight,*qgOnYnext*,*qgOnCnext* cbSubdiv + 1,
      cqtDepth, mttDepth + 1, depthOffset, 1, treeType, modeType )
      coding_tree( x2, y0, cbWidth / 4, cbHeight,*qgOnYnext*,*qgOnCnext* cbSubdiv + 2,
      cqtDepth, mttDepth + 1, depthOffset, 2, treeType, modeType )
            } else { /* SPLIT_TT_HOR */
            y1 = y0 + ( cbHeight / 4 )
            y2 = y0 + ( 3 * cbHeight / 4 )
            *qgOnYnext* = qgOnY && ( cbSubdiv + 2 <=
cu_qp_delta_subdiv )
            *qgOnCnext* = qgOnC && ( cbSubdiv + 2 <=
cu_chroma_qp_offset_subdiv )
      coding_tree( x0, y0, cbWidth, cbHeight / 4,*qgOnYnext*,*qgOnCnext*, cbSubdiv + 2,
      cqtDepth, mttDepth + 1, depthOffset, 0, treeType, modeType )
      coding_tree( x0, y1, cbWidth, cbHeight / 2,*qgOnYnext*,*qgOnCnext*, cbSubdiv + 1,
      cqtDepth, mttDepth + 1, depthOffset, 1, treeType, modeType )
      coding_tree( x0, y2, cbWidth, cbHeight / 4,*qgOnYnext*,*qgOnCnext*, cbSubdiv + 2,
      cqtDepth, mttDepth + 1, depthOffset, 2, treeType, modeType )
            }
      } else {
            x1 = x0 + ( cbWidth / 2 )
            y1 = y0 + ( cbHeight / 2 )
            coding_tree( x0, y0, cbWidth / 2, cbHeight / 2, qgOnY, qgOnC,
cbSubdiv + 2,
      cqtDepth + 1, 0, 0, 0, treeType, modeType )
            if( x1 < pic_width_in_luma_samples )
            coding_tree( x1, y0, cbWidth / 2, cbHeight / 2, qgOnY, qgOnC,
cbSubdiv + 2,
      cqtDepth + 1, 0, 0, 1, treeType, modeType )
            if( y1 < pic_height_in_luma_samples )
            coding_tree( x0, y1, cbWidth / 2, cbHeight / 2, qgOnY, qgOnC,
cbSubdiv + 2,
       cqtDepth + 1, 0, 0, 2, treeType, modeType )
            if( y1 < pic_height_in_luma_samples && x1 <
pic_width_in_luma_samples )
            coding_tree( x1, y1, cbWidth / 2, cbHeight / 2, qgOnY, qgOnC,
cbSubdiv + 2,
       cqtDepth + 1, 0, 0, 3, treeType, modeType )
            }
      if( modeTypeCur = = MODE_TYPE_ALL && modeType = =
MODE_TYPE_INTRA ) {
            coding_tree( x0, y0, cbWidth, cbHeight, qgOnY, 0, cbSubdiv, cqtDepth,
mttDepth, 0, 0
         DUAL_TREE_CHROMA, modeType )
            }
      } else
         coding_unit( x0, y0, cbWidth, cbHeight, cqtDepth, treeTypeCurr, modeTypeCurr )
}
```

5.16 Example #3 of Delta QP Signaling in SCIPU

|  | Descriptor |
|---|---|
| coding_tree( x0, y0, cbWidth, cbHeight, qgOnY, qgOnC, cbSubdiv, cqtDepth, mttDepth, depthOffset, <br>        partIdx, treeTypeCurr, modeTypeCurr ) { <br>  if( ( allowSplitBtVer \|\| allowSplitBtHor \|\| allowSplitTtVer \|\| allowSplitTtHor \|\| allowSplitQT ) <br>    &&( x0 + cbWidth <= pic_width_in_luma_samples ) <br>    && (y0 + cbHeight <= pic_height_in_luma_samples ) ) <br>    split_cu_flag |  <br>  <br>  <br>  <br>  <br> ae(v) |
|   if( cu_qp_delta_enabled_flag && qgOnY && cbSubdiv <= cu_qp_delta_subdiv && <br> *treeTypeCurr != DUAL_TREE_CHROMA*) { <br>    IsCuQpDeltaCoded = 0 <br>    CuQpDeltaVal = 0 <br>    CuQgTopLeftX = x0 <br>    CuQgTopLeftY = y0 <br>  } <br>  if( cu_chroma_qp_offset_enabled_flag && qgOnC && <br>    cbSubdiv <= cu_chroma_qp_offset_subdiv && && *treeTypeCurr != DUAL_TREE_LUMA*) <br>    IsCuChromaQpOffsetCoded = 0 <br>  if( split_cu_flag ) { <br>    if( ( allowSplitBtVer \|\| allowSplitBtHor \|\| allowSplitTtVer \|\| allowSplitTtHor ) && <br>        allowSplitQT ) <br>      split_qt_flag <br>    if( !split_qt_flag ) { <br>      if( ( allowSplitBtHor \|\| allowSplitTtHor ) && <br>        ( allowSplitBtVer \|\| allowSplitTtVer ) ) <br>        mtt_split_cu_vertical_flag <br>      if( ( allowSplitBtVer && allowSplitTtVer && <br> mtt_split_cu_vertical_flag ) \|\| <br>        ( allowSplitBtHor && allowSplitTtHor <br> && !mtt_split_cu_vertical_flag ) ) <br>        mtt_split_cu_binary_flag <br>    } <br>    if( modeTypeCondition == 1 ) <br>      modeType = MODE_TYPE_INTRA <br>    else if( modeTypeCondition == 2 ) { <br>      mode_constraint_flag <br>  modeType = mode_constraint_flag ? MODE_TYPE_INTRA : MODE_TYPE_INTER <br>    } else { <br>      modeType = modeTypeCurr <br>    } <br>    treeType = ( modeType == <br> MODE_TYPE_INTRA ) ? DUAL_TREE_LUMA : treeTypeCurr <br>    if( !split_qt_flag ) { <br>      if( MttSplitMode[ x0 ][ y0 ][ mttDepth ] == SPLIT_BT_VER ) { <br> depthOffset += ( x0 + cbWidth > pic_width_in_luma_samples ) ? 1 : 0 <br>        x1 = x0 + ( cbWidth / 2 ) <br>        coding_tree( x0, y0, cbWidth / 2, cbHeight, qgOnY, qgOnC, <br> cbSubdiv + 1, <br> cqtDepth, mttDepth + 1, depthOffset, 0, treeType, modeType ) <br>        if( x1 < pic_width_in_luma_samples ) <br> coding_tree( x1, y0, cbWidth / 2, cbHeightY, qgOnY, qgOnC, cbSubdiv + 1, <br> cqtDepth, mttDepth + 1, depthOffset, 1, treeType, modeType ) <br>      } else if( MttSplitMode[ x0 ][ y0 ][ mttDepth ] == SPLIT_BT_HOR ) { <br> depthOffset += ( y0 + cbHeight > pic_height_in_luma_samples ) ? 1 : 0 <br>        y1 = y0 + ( cbHeight / 2 ) <br>        coding_tree( x0, y0, cbWidth, cbHeight / 2, qgOnY, qgOnC, <br> cbSubdiv + 1, <br> cqtDepth, mttDepth + 1, depthOffset, 0, treeType, modeType ) <br>        if( y1 < pic_height_in_luma_samples ) <br> coding_tree( x0, y1, cbWidth, cbHeight / 2, qgOnY, qgOnC, cbSubdiv + 1, <br> cqtDepth, mttDepth + 1, depthOffset, 1, treeType, modeType ) <br>      } else if( MttSplitMode[ x0 ][ y0 ][ mttDepth ] == SPLIT_TT_VER ) { <br>        x1 = x0 + ( cbWidth / 4 ) <br>        x2 = x0 + ( 3 * cbWidth / 4 ) <br>        *qgOnYnext* = qgOnY && ( cbSubdiv + 2 <= <br> cu_qp_delta_subdiv ) <br>        *qgOnCnext = qgOnC && ( cbSubdiv + 2 <= cu_chroma_qp_offset_subdiv*) <br> coding_tree( x0, y0, cbWidth / 4, cbHeight, *qgOnYnext*, *qgOnCnext*, cbSubdiv + 2, <br> cqtDepth, mttDepth + 1, depthOffset, 0, treeType, modeType ) <br> coding_tree( x1, y0, cbWidth / 2, cbHeight, *qgOnYnext*, *qgOnCnext*, cbSubdiv + 1, <br> cqtDepth, mttDepth + 1, depthOffset, 1, treeType, modeType ) <br> coding_tree( x2, y0, cbWidth / 4, cbHeight, *qgOnYnext* , *qgOnCnext* , cbSubdiv + 2, <br> cqtDepth, mttDepth + 1, depthOffset, 2, treeType, modeType ) <br>      } else { /* SPLIT_TT_HOR */ <br>        y1 = y0 + ( cbHeight / 4 ) <br>        y2 = y0 + ( 3 * cbHeight / 4 ) |  <br>  <br>  <br>  <br>  <br>  <br>  <br>  <br>  <br>  <br>  <br>  <br>  <br>  <br> ae(v) <br>  <br>  <br>  <br> ae(v) <br>  <br>  <br>  <br>  <br>  <br> ae(v) <br>  <br>  <br>  <br>  <br> ae(v) |

|  | Descriptor |
|---|---|
| <pre>        qgOnYnext = qgOnY && ( cbSubdiv + 2 <=
cu_qp_delta_subdiv )
        qgOnCnext = qgOnC && ( cbSubdiv + 2 <=
cu_chroma_qp_offset_subdiv )
    coding_tree( x0, y0, cbWidth, cbHeight / 4, qgOnYnext, qgOnCnext, cbSubdiv + 2,
    cqtDepth, mttDepth + 1, depthOffset, 0, treeType, modeType )
    coding_tree( x0, y1, cbWidth, cbHeight / 2, qgOnYnext, qgOnCnext, cbSubdiv + 1,
    cqtDepth, mttDepth + 1, depthOffset, 1, treeType, modeType )
    coding_tree( x0, y2, cbWidth, cbHeight / 4, qgOnYnext, qgOnCnext, cbSubdiv + 2,
    cqtDepth, mttDepth + 1, depthOffset, 2, treeType, modeType )
        }
    } else {
        x1 = x0 + ( cbWidth / 2 )
        y1 = y0 + ( cbHeight / 2 )
        coding_tree( x0, y0, cbWidth / 2, cbHeight / 2, qgOnY, qgOnC,
cbSubdiv + 2,
    cqtDepth + 1, 0, 0, 0, treeType, modeType )
        if( x1 < pic_width_in_luma_samples )
            coding_tree( x1, y0, cbWidth / 2, cbHeight / 2, qgOnY, qgOnC,
cbSubdiv + 2,
    cqtDepth + 1, 0, 0, 1, treeType, modeType )
        if( y1 < pic_height_in_luma_samples )
            coding_tree( x0, y1, cbWidth / 2, cbHeight / 2, qgOnY, qgOnC,
cbSubdiv + 2,
    cqtDepth + 1, 0, 0, 2, treeType, modeType )
        if( y1 < pic_height_in_luma_samples && x1 <
pic_width_in_luma_samples )
            coding_tree( x1, y1, cbWidth / 2, cbHeight / 2, qgOnY, qgOnC,
cbSubdiv + 2,
    cqtDepth + 1, 0, 0, 3, treeType, modeType )
        }
        if( modeTypeCur = = MODE_TYPE_ALL && modeType = =
MODE_TYPE_INTRA ) {
            coding_tree( x0, y0, cbWidth, cbHeight, qgOnY, 0, cbSubdiv, cqtDepth,
mttDepth, 0, 0
            DUAL_TREE_CHROMA, modeType )
        }
    } else
        coding_unit( x0, y0, cbWidth, cbHeight, cqtDepth, treeTypeCurr , modeTypeCurr )
}</pre> |  |

5.17 Example #4 of Delta QP Signaling in SCIPU

|  | Descriptor |
|---|---|
| <pre>coding_tree( x0, y0, cbWidth, cbHeight, qgOnY, qgOnC, cbSubdiv, cqtDepth, mttDepth, depthOffset,
        partIdx, treeTypeCurr, modeTypeCurr ) {
    if( ( allowSplitBtVer || allowSplitBtHor || allowSplitTtVer || allowSplitTtHor ||
allowSplitQT )
        &&( x0 + cbWidth <= pic_width_in_luma_samples )
        && (y0 + cbHeight <= pic_height_in_luma_samples ) )
        split_cu_flag</pre> | ae(v) |
| <pre>    if( cu_qp_delta_enabled_flag && qgOnY && cbSubdiv <= cu_qp_delta_subdiv ) {
        IsCuQpDeltaCoded = 0
        CuQpDeltaVal = 0
        CuQgTopLeftX = x0
        CuQgTopLeftY = y0
    }
    if( cu_chroma_qp_offset_enabled_flag && qgOnC &&
        cbSubdiv <= cu_chroma_qp_offset_subdiv )
        IsCuChromaQpOffsetCoded = 0
    if( split_cu_flag ) {
        if( ( allowSplitBtVer || allowSplitBtHor || allowSplitTtVer || allowSplitTtHor ) &&
            allowSplitQT )
            split_qt_flag</pre> | ae(v) |
| <pre>        if( !split_qt_flag ) {
            if( ( allowSplitBtHor || allowSplitTtHor ) &&
                ( allowSplitBtVer || allowSplitTtVer ) )
                mtt_split_cu_vertical_flag</pre> | ae(v) |
| <pre>            if( ( allowSplitBtVer && allowSplitTtVer &&
mtt_split_cu_vertical_flag ) ||
                ( allowSplitBtHor && allowSplitTtHor
&& !mtt_split_cu_vertical_flag ) )
                mtt_split_cu_binary_flag</pre> | ae(v) |

|  | Descriptor |
|---|---|

```
        }
      if( modeTypeCondition = = 1 )
          modeType = MODE_TYPE_INTRA
        else if( modeTypeCondition = = 2 ) {
          mode_constraint_flag                                            ae(v)
    modeType = mode_constraint_flag ? MODE_TYPE_INTRA : MODE_TYPE_INTER
        } else {
          modeType = modeTypeCurr
        }
```
if(modeTypeCondition > 0 )
  qgOnY = qgOnC = 0
```
      treeType = ( modeType = =
MODE_TYPE_INTRA ) ? DUAL_TREE_LUMA : treeTypeCurr
        if( !split_qt_flag ) {
          if( MttSplitMode[ x0 ][ y0 ][ mttDepth ] = = SPLIT_BT_VER ) {
    depthOffset += ( x0 + cbWidth > pic_width_in_luma_samples ) ? 1 : 0
            x1 = x0 + ( cbWidth / 2 )
            coding_tree( x0, y0, cbWidth / 2, cbHeight, qgOnY, qgOnC,
cbSubdiv + 1,
    cqtDepth, mttDepth + 1, depthOffset, 0, treeType, modeType )
            if( x1 < pic_width_in_luma_samples )
    coding_tree( x1, y0, cbWidth / 2, cbHeightY, qgOnY, qgOnC, cbSubdiv + 1,
    cqtDepth, mttDepth + 1, depthOffset, 1, treeType, modeType )
          } else if( MttSplitMode[ x0 ][ y0 ][ mttDepth ] = = SPLIT_BT_HOR ) {
    depthOffset += ( y0 + cbHeight > pic_height_in_luma_samples ) ? 1 : 0
            y1 = y0 + ( cbHeight / 2 )
            coding_tree( x0, y0, cbWidth, cbHeight / 2, qgOnY, qgOnC,
cbSubdiv + 1,
    cqtDepth, mttDepth + 1, depthOffset, 0, treeType, modeType )
            if( y1 < pic_height_in_luma_samples )
    coding_tree( x0, y1, cbWidth, cbHeight / 2, qgOnY, qgOnC, cbSubdiv + 1,
    cqtDepth, mttDepth + 1, depthOffset, 1, treeType, modeType )
          } else if( MttSplitMode[ x0 ][ y0 ][ mttDepth ] = = SPLIT_TT_VER ) {
            x1 = x0 + ( cbWidth / 4 )
            x2 = x0 + ( 3 * cbWidth / 4 )
            qgOnY = qgOnY && ( cbSubdiv + 2 <= cu_qp_delta_subdiv )
            qgOnC = qgOnC && ( cbSubdiv + 2 <=
cu_chroma_qp_offset_subdiv )
            coding_tree( x0, y0, cbWidth / 4, cbHeight, qgOnY, qgOnC,
cbSubdiv + 2,
    cqtDepth, mttDepth + 1, depthOffset, 0, treeType, modeType )
            coding_tree( x1, y0, cbWidth / 2, cbHeight, qgOnY, qgOnC,
cbSubdiv + 1,
    cqtDepth, mttDepth + 1, depthOffset, 1, treeType, modeType )
            coding_tree( x2, y0, cbWidth / 4, cbHeight, qgOnY, qgOnC,
cbSubdiv + 2,
    cqtDepth, mttDepth + 1, depthOffset, 2, treeType, modeType )
          } else { /* SPLIT_TT_HOR */
            y1 = y0 + ( cbHeight / 4 )
            y2 = y0 + ( 3 * cbHeight / 4 )
            qgOnY = qgOnY && ( cbSubdiv + 2 <= cu_qp_delta_subdiv )
            qgOnC = qgOnC && ( cbSubdiv + 2 <=
cu_chroma_qp_offset_subdiv )
            coding_tree( x0, y0, cbWidth, cbHeight / 4, qgOnY, qgOnC,
cbSubdiv + 2,
    cqtDepth, mttDepth + 1, depthOffset, 0, treeType, modeType )
            coding_tree( x0, y1, cbWidth, cbHeight / 2, qgOnY, qgOnC,
cbSubdiv + 1,
    cqtDepth, mttDepth + 1, depthOffset, 1, treeType, modeType )
            coding_tree( x0, y2, cbWidth, cbHeight / 4, qgOnY, qgOnC,
cbSubdiv + 2,
    cqtDepth, mttDepth + 1, depthOffset, 2, treeType, modeType )
          }
        } else {
          x1 = x0 + ( cbWidth / 2 )
          y1 = y0 + ( cbHeight / 2 )
          coding_tree( x0, y0, cbWidth / 2, cbHeight / 2, qgOnY, qgOnC,
cbSubdiv + 2,
    cqtDepth + 1, 0, 0, 0, treeType, modeType )
          if( x1 < pic_width_in_luma_samples )
          coding_tree( x1, y0, cbWidth / 2, cbHeight / 2, qgOnY, qgOnC,
cbSubdiv + 2,
    cqtDepth + 1, 0, 0, 1, treeType, modeType )
          if( y1 < pic_height_in_luma_samples )
          coding_tree( x0, y1, cbWidth / 2, cbHeight / 2, qgOnY, qgOnC,
cbSubdiv + 2,
    cqtDepth + 1, 0, 0, 2, treeType, modeType )
```

| | Descriptor |
|---|---|
| ```
        if( y1 < pic_height_in_luma_samples && x1 <
pic_width_in_luma_samples )
            coding_tree( x1, y1, cbWidth / 2, cbHeight / 2, qgOnY, qgOnC,
cbSubdiv + 2,
    cqtDepth + 1, 0, 0, 3, treeType, modeType )
        }
        if( modeTypeCur = = MODE_TYPE_ALL && modeType = =
MODE_TYPE_INTRA ) {
            coding_tree( x0, y0, cbWidth, cbHeight, qgOnY, qgOnC, cbSubdiv,
cqtDepth, mttDepth, 0, 0
            DUAL_TREE_CHROMA, modeType )
        }
    } else
        coding_unit( x0, y0, cbWidth, cbHeight, cqtDepth, treeTypeCurr, modeTypeCurr )
}
``` | |

5.18 Example #14 of Disabling Wx Chroma Intra Blocks
6.4.2. Allowed Binary Split Process
The variable allowBtSplit is derived as follows:
If one or more of the following conditions are true, allowBtSplit is set equal to FALSE:
  cbSize is less than or equal to MinBtSizeY
  cbWidth is greater than maxBtSize
  cbHeight is greater than maxBtSize
  mttDepth is greater than or equal to maxMttDepth
  treeType is equal to DUAL_TREE_CHROMA and (cbWidth/SubWidthC)*(cbHeight/SubHeightC) is less than or equal to 16
  – *treeType is equal to DUAL_TREE_CHROMA and btSplit is equal to SPLIT_BT_VER and ( cbWidth / SubWidthC ) is equal to 4 and ( cbHeight / SubHeightC ) is equal to 8*
  – *treeType is equal to DUAL_TREE_CHROMA and btSplit is equal to SPLIT_BT_HOR and ( cbWidth / SubWidthC ) is equal to 2 and ( cbHeight / SubHeightC ) is equal to 16*
  treeType is equal to DUAL_TREE_CHROMA and modeType is equal to MODE_TYPE_INTRA
6.4.3. Allowed Ternary Split Process
The variable allowTtSplit is derived as follows:
If one or more of the following conditions are true, allowTtSplit is set equal to FALSE:
  cbSize is less than or equal to 2*MinTtSizeY
  cbWidth is greater than Min(MaxTbSizeY, maxTtSize)
  cbHeight is greater than Min(MaxTbSizeY, maxTtSize)
  mttDepth is greater than or equal to maxMttDepth
  x0+cbWidth is greater than pic_width_in_luma_samples
  y0+cbHeight is greater than pic_height_in_luma_samples
  treeType is equal to DUAL_TREE_CHROMA and (cbWidth/SubWidthC)*(cbHeight/SubHeightC) is less than or equal to 32
  – *treeType is equal to DUAL_TREE_CHROMA and btSplit is equal to SPLIT_TT_VER and ( cbWidth / SubWidthC ) is equal to 8 and ( cbHeight / SubHeightC ) is equal to 8*
  – *treeType is equal to DUAL_TREE_CHROMA and btSplit is equal to SPLIT_TT_HOR and ( cbWidth / SubWidthC ) is equal to 2 and ( cbHeight / SubHeightC ) is equal to 32*
  treeType is equal to DUAL_TREE_CHROMA and mode Type is equal to MODE_TYPE_INTRA
Otherwise, allowTtSplit is set equal to TRUE.
7.4.9.4. Coding Tree Semantics
The variable modeTypeCondition is derived as follows:
If one of the following conditions is true, modeTypeCondition is set equal to 0
  slice_type==I and qtbtt_dual_tree_intra_flag is equal to 1
  modeTypeCurr is not equal to MODE_TYPE_ALL
Otherwise, if one of the following conditions is true, modeTypeCondition is set equal to 1
  cbWidth*cbHeight is equal to 64 and split_qt_flag is equal to 1
  cbWidth*cbHeight is equal to 64 and MttSplitMode[x0][y0][mttDepth] is equal to SPLIT_TT_HOR or SPLIT_TT_VER
  cbWidth*cbHeight is equal to 32 and MttSplitMode[x0][y0][mttDepth] is equal to SPLIT_BT_HOR or SPLIT_BT_VER
Otherwise, if one of the following conditions is true, modeType Condition is set equal to 1+(slice_type !=I ? 1:0)
  cbWidth*cbHeight is equal to 64 and MttSplitMode[x0][y0][mttDepth] is equal to SPLIT_BT_HOR or SPLIT_BT_VER
  cbWidth*cbHeight is equal to 128 and MttSplitMode[x0][y0][mttDepth] is equal to SPLIT_TT_HOR or SPLIT_TT_VER
  – *cbWidth is equal to 8 and ( cbHeight / SubHeightC )is equal to 8 and MttSplit Mode[ x0 ][ y0 ][ mttDepth ] is equal to SPLIT_BT_VER*
  – *cbWidth is equal to 16 and ( cbHeight / SubHeightC )is equal to 8 and MttSplitMode[ x0 ][ y0 ][ mttDepth ] is equal to SPLIT_TT_VER*
  – *cbWidth is equal to 4 and ( cbHeight / SubHeightC )is equal to 16 and MttSplitMode[ x0 ][ y0 ][ mtt Depth ] is equal to SPLIT_BT_HOR or SPLIT_TT_HOR*
  – *cbWidth is equal to 4 and ( cbHeight / SubHeightC ) is equal to 32 and MttSplitMode[ x0 ][ y0 ][ mttDepth ] is equal to SPLIT_TT_HOR*
Otherwise, modeTypeCondition is set equal to 0
7.4.9.7. Merge Data Semantics
ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip flag[x0][y0] is not present, it is inferred as follows:
If all the following conditions are true, ciip_flag[x0][y0] is inferred to be equal to 1:
sps_ciip_enabled_flag is equal to 1.
general_merge_flag[x0][y0] is equal to 1.
merge_subblock_flag[x0][y0] is equal to 0.
regular_merge_flag[x0][y0] is equal to 0.
cbWidth is less than 128.
cbHeight is less than 128.
- *cbWidth is greater than 4 and cbHeight is not equal to 16.*
cbWidth*cbHeight is greater than or equal to 64.
Otherwise, ciip_flag[x0][y0] is inferred to be equal to 0.

7.3.8.7. Merge Data Syntax

| | Descriptor |
|---|---|
| merge_data( x0, y0, cbWidth, cbHeight, chType ) { | |
|   if ( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( (sps_ciip_enabled_flag && | |
|       cu_skip_flag[ x0 ][ y0 ] = = 0 && cbWidth < 128 && cbHeight < 128) \|\| | |
|       ( sps_triangle_enabled_flag && MaxNumTriangleMergeCand > 1 && | |
|       slice_type = = B ) ) ) | |
|         regular_merge_flag[ x0 ][ y0 ] | ae(v) |
|       if ( regular_merge_flag[ x0 ][ y0 ] = = 1 ){ | |
|         if( sps_mmvd_enabled_flag ) | |
|           mmvd_merge_flag[ x0 ][ y0 ] | ae(v) |
|         if( mmvd_merge_flag[ x0 ][ y0 ] = = 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumMergeCand > 1 ) | |
|             merge_idx[ x0 ][ y0 ] | ae(v) |
|         } | |
|       } else { | |
|         if( sps_ciip_enabled_flag && sps_triangle_enabled_flag && | |
|         MaxNumTriangleMergeCand > 1 && slice_type = = B && | |
|         cu_skip_flag[ x0 ][ y0 ] = = 0 && *!(cbWidth = = 4 && cbWidth = = 16)* && | |
|         ( cbWidth * cbHeight ) >= 64 && cbWidth < 128 && cbHeight < 128 ) { | |
|           ciip_flag[ x0 ][ y0 ] | ae(v) |
|           if( ciip_flag[ x0 ][ y0 ] && MaxNumMergeCand > 1 ) | |
|             merge_idx[ x0 ][ y0 ] | ae(v) |
|           if( !ciip_flag[ x0 ][ y0 ] && MaxNumTriangleMergeCand > 1 ) { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } | |
|   } | |
| } | |

5.18 Example to Set Chroma Deblocking Boundary Strength to be 0

The following changes, newly added parts are marked in bold and Italic and the deleted parts are marked with double brackets (e.g., [[a]] denotes the deletion of the character "a"). The modifications are based on JVET-Q2001-yE.

8.8.3.5 Derivation Process of Boundary Filtering Strength

For $xD_i$ with $i=0 \ldots xN$ and $yD_j$ with $j=0 \ldots yN$, the following applies:

If edgeFlags $[xD_i][yD_j]$ is equal to 0, the variable bS $[xD_i][yD_j]$ is set equal to 0.

Otherwise, the following applies:

The sample values $p_0$ and $q_0$ are derived as follows:
If edgeType is equal to EDGE_VER, $p_0$ is set equal to recPicture[$xCb+xD_i-1$][$yCb+yD_j$] and $q_0$ is set equal to recPicture[$xCb+xD_i$][$yCb+yD_j$].
Otherwise (edgeType is equal to EDGE_HOR), $p_0$ is set equal to recPicture[$xCb+xD_i$][$yCb+yD_j-1$] and $q_0$ is set equal to recPicture[$xCb+xD_i$][$yCb+yD_j$].

The variable $bS[xD_i][yD_j]$ is derived as follows:
If cIdx is equal to 0 and both samples $p_0$ and $q_0$ are in a coding block with intra_bdpcm_luma_flag equal to 1, $bS[xD_i][yD_j]$ is set equal to 0.
Otherwise, if cIdx is greater than 0 and both samples $p_0$ and $q_0$ are in a coding block with intra_bdpcm_chroma_flag equal to 1, $bS[xD_i][yD_j]$ is set equal to 0.
Otherwise, if the sample $p_0$ or $q_0$ is in the coding block of a coding unit coded with intra prediction mode, $bS[xD_i][yD_j]$ is set equal to 2.
Otherwise, if the block edge is also a coding block edge and the sample $p_0$ or $q_0$ is in a coding block with ciip_flag equal to 1, $bS[xD_i][yD_j]$ is set equal to 2.
Otherwise, if the block edge is also a transform block edge and the sample $p_0$ or $q_0$ is in a transform block which contains one or more non-zero transform coefficient levels, $bS[xD_i][yD_j]$ is set equal to 1.
[[Otherwise, if the prediction mode of the coding subblock containing the sample p0 is different from the prediction mode of the coding subblock containing the sample q0 (i.e. one of the coding subblock is coded in IBC prediction mode and the other is coded in inter prediction mode), bS[xDi][yDj] is set equal to 1.]]
Otherwise, if cIdx is equal to 0, edgeFlags$[xD_i][yD_j]$ is set equal to 2, and one or more of the following conditions are true, $bS[xD_i][yD_j]$ is set equal to 1:
— *The prediction mode of the coding subblock containing the sample p0 is different from the prediction mode of the coding subblock containing the sample q0.*
The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.
For the prediction of the coding subblock containing the sample $p_0$ different reference pictures or a different number of motion vectors are used than for the prediction of the coding subblock containing the sample $q_0$.

NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.

NOTE 2—The number of motion vectors that are used for the prediction of a coding subblock with top-left sample covering (xSb, ySb), is equal to PredFlagL0[xSb][ySb]+PredFlagL1[xSb][ySb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of 1/16 luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 8 in units of 1/16 luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 8 in units of 1/16 luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in units of 1/16 luma samples.

Otherwise, the variable $bS[xD_i][yD_j]$ is set equal to 0.

Figure 17A:
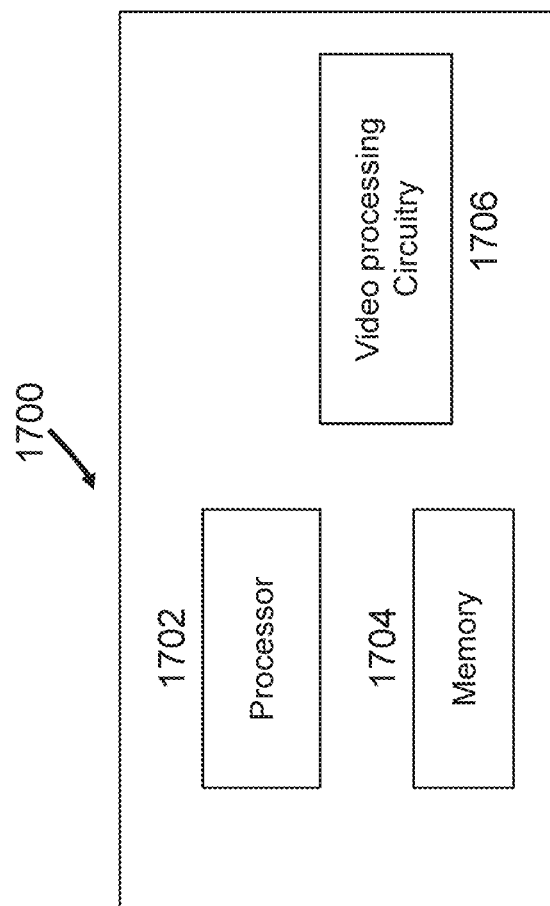
FIGS. 17A and 17B show block diagrams of examples of a hardware platform used for implementing techniques described in the present disclosure.

FIG. 17A is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods described in the present disclosure. The memory (memories) 1704 may be used for storing data and code used for implementing the methods and techniques described herein. The video processing hardware 1706 may be used to implement, in hardware circuitry, some techniques described in the present disclosure.

Figure 17B:
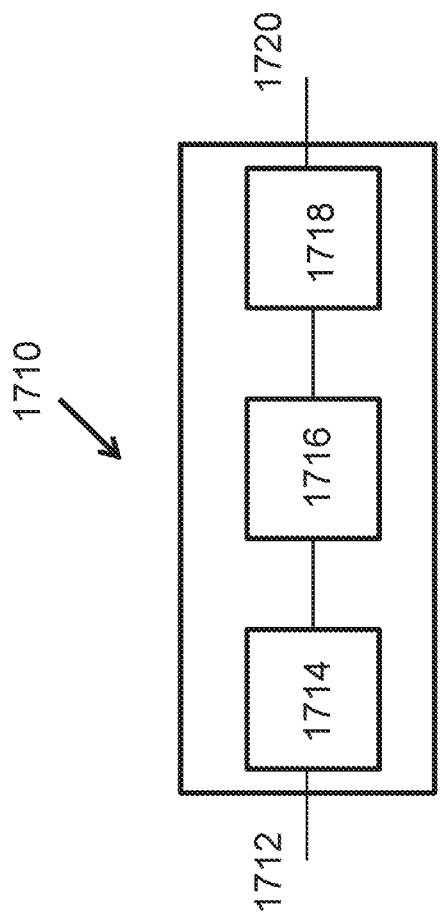

FIG. 17B is another example of a block diagram of a video processing system in which disclosed techniques may be implemented. FIG. 17B is a block diagram showing an example video processing system 1710 in which various techniques disclosed herein may be implemented. Various implementations may include some or all of the components of the system 1710. The system 1710 may include input 1712 for receiving video content. The video content may be received in a raw or uncompressed format, e.g., 8 or 10 bit multi-component pixel values, or may be in a compressed or encoded format. The input 1712 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1710 may include a coding component 1714 that may implement the various coding or encoding methods described in the present disclosure. The coding component 1714 may reduce the average bitrate of video from the input 1712 to the output of the coding component 1714 to produce a coded representation of the video. The coding techniques are therefore sometimes called video compression or video transcoding techniques. The output of the coding component 1714 may be either stored, or transmitted via a communication connected, as represented by the component 1716. The stored or communicated bitstream (or coded) representation of the video received at the input 1712 may be used by the component 1718 for generating pixel values or displayable video that is sent to a display interface 1720. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 21:
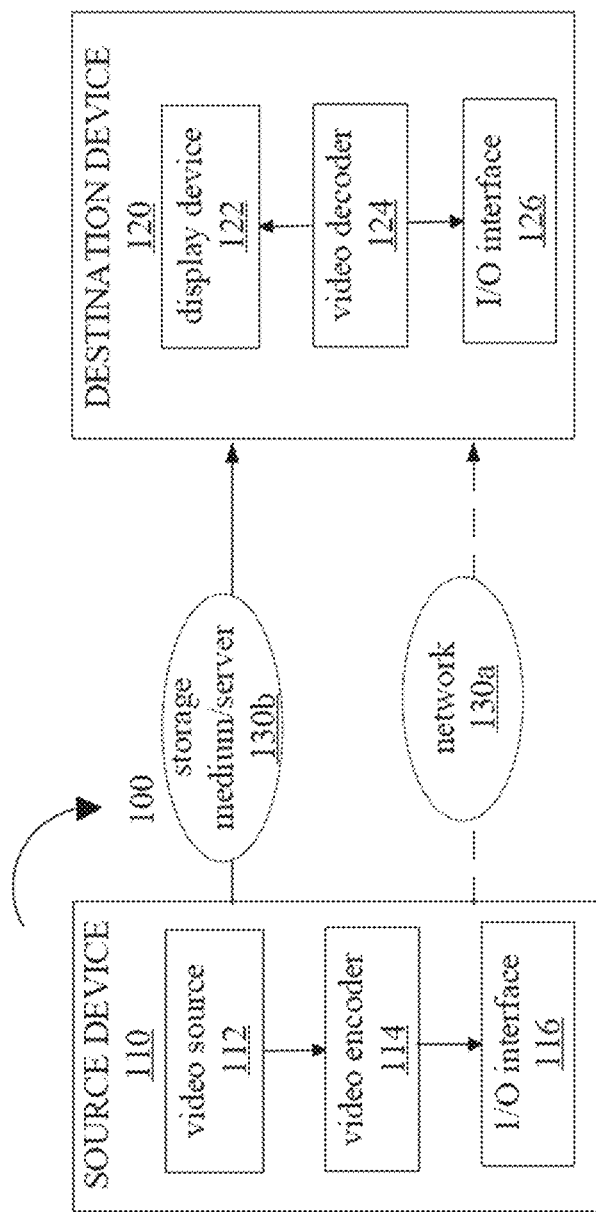
FIG. 21 is a block diagram that illustrates an example video coding system.

FIG. 21 is a block diagram that illustrates an example video coding system 100 that may utilize the techniques of this disclosure.

As shown in FIG. 21, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 22:
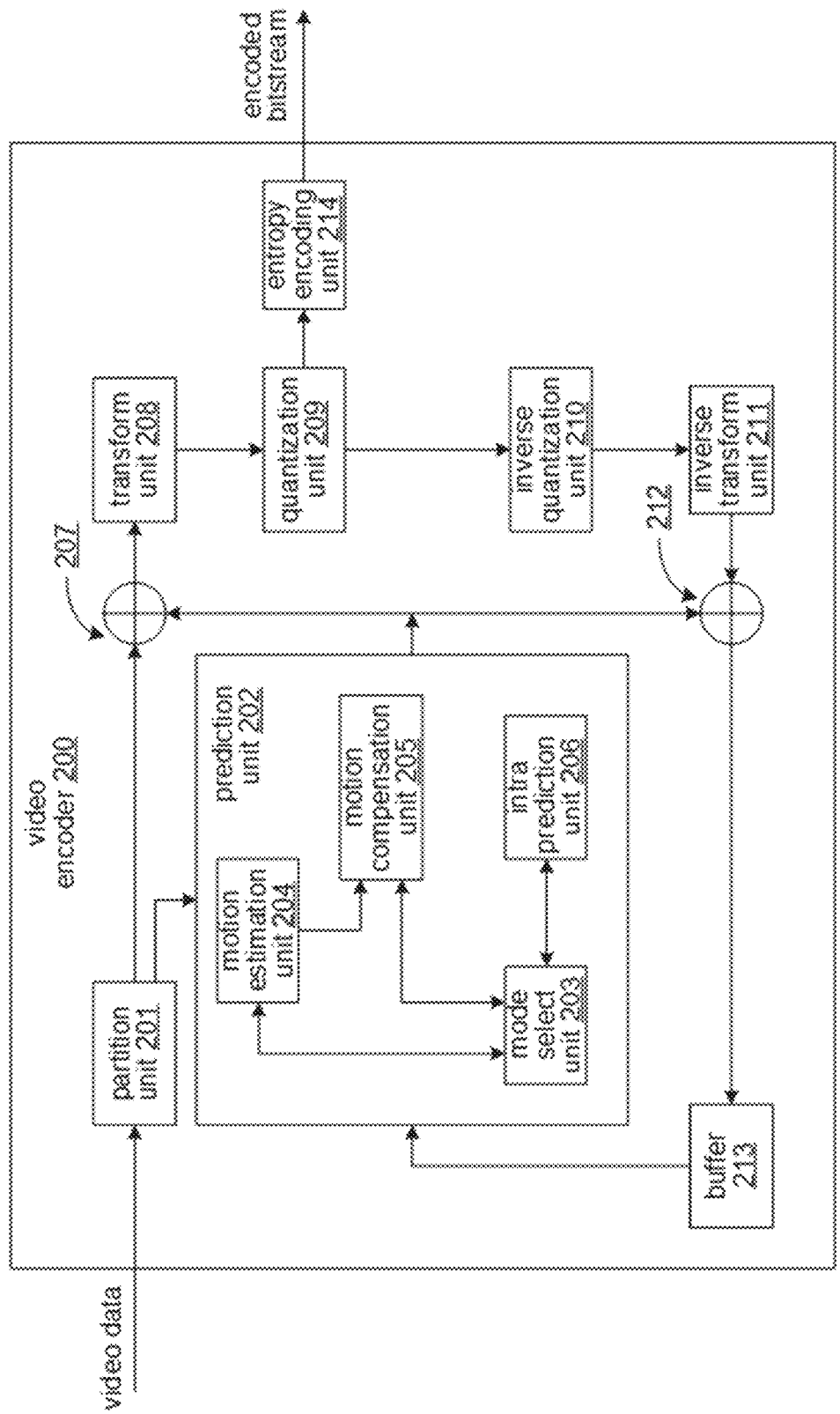
FIG. 22 is a block diagram that illustrates an encoder in accordance with some embodiments of the disclosed technology.

FIG. 22 is a block diagram illustrating an example of video encoder 200, which may be video encoder 114 in the system 100 illustrated in FIG. 21.

Video encoder 200 may be configured to perform any or all of the techniques of this disclosure. In the example of FIG. 22, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 22 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 23:
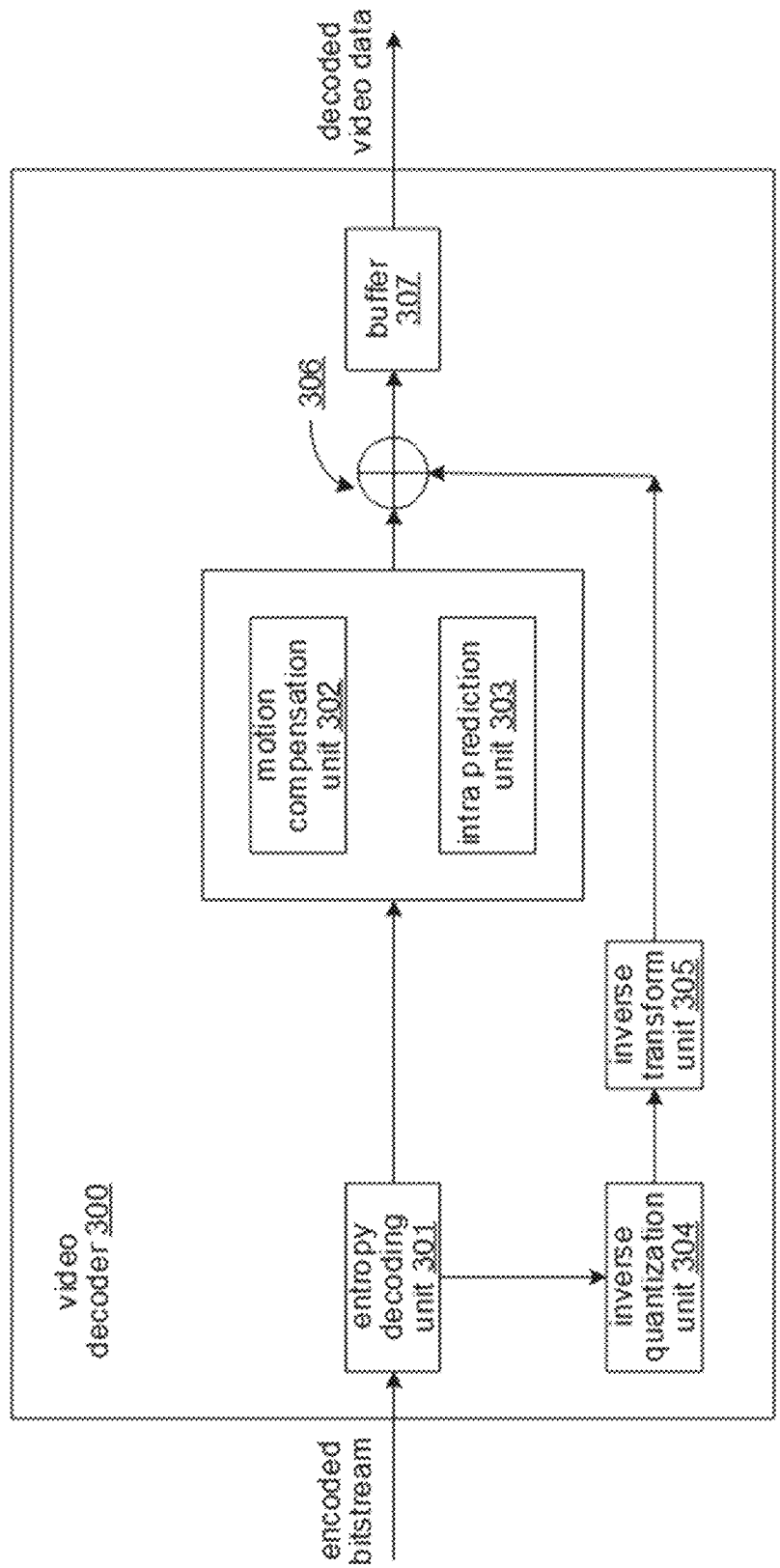
FIG. 23 is a block diagram that illustrates a decoder in accordance with some embodiments of the disclosed technology.

FIG. 23 is a block diagram illustrating an example of video decoder 300 which may be video decoder 124 in the system 100 illustrated in FIG. 21.

The video decoder 300 may be configured to perform any or all of the techniques of this disclosure. In the example of FIG. 23, the video decoder 300 includes a plurality of functional components. The techniques described in this disclosure may be shared among the various components of the video decoder 300. In some examples, a processor may be configured to perform any or all of the techniques described in this disclosure.

In the example of FIG. 23, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (e.g., FIG. 22).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation.

Figure 18:
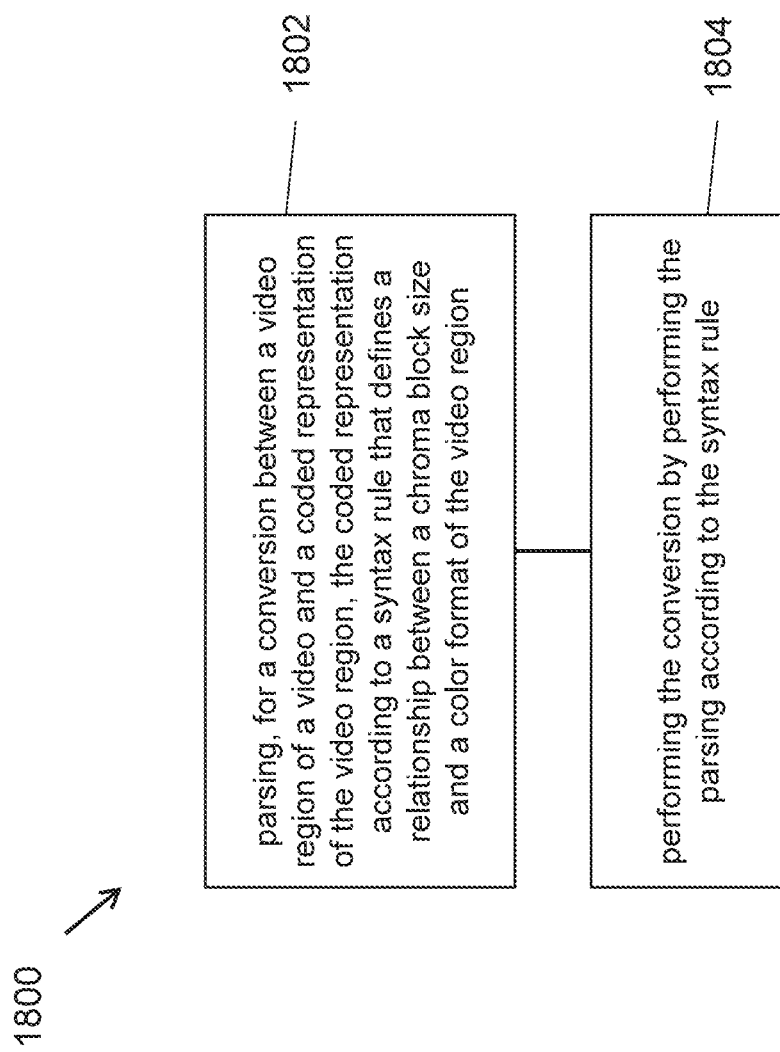
FIG. 18 is a flowchart for an example method of video processing.

FIG. 18 is a flowchart for a method 1800 of processing a video. The method 1800 includes parsing 1802, for a conversion between a video region of a video and a coded representation of the video region, the coded representation according to a syntax rule that defines a relationship between a chroma block size and a color format of the video region; and performing (1804) the conversion by performing the parsing according to the syntax rule.

A listing of examples preferred by some embodiments is provided next. In the present disclosure, a video region may be a coding block or a slice or a coding tree unit or a prediction block or a transform block.

The first set of clauses show example embodiments of techniques discussed in the previous section. The following clauses may be implemented together with additional techniques described in item 1 of the previous section.

1. A method of video processing, comprising: parsing, for a conversion between a video region of a video and a coded representation of the video region, the coded representation according to a syntax rule that defines a relationship between a chroma block size and a color format of the video region; and performing the conversion by performing the parsing according to the syntax rule.

2. The method of clause 1, wherein the color format is 4:4:4 and where the syntax rule specifies that the chroma block is subject to a same size constraint as that for a luma blocks.

3. The method of clause 1, wherein the color format is 4:2:2 and where the syntax rule specifies that the chroma block is subject to a same size constraint as that for 4:2:0 color format.

4. The method of any of clauses 1-3, wherein the syntax specifies that a prediction modes and small block partitions are used in a chroma-format dependent manner.

5. The method of clause 1, wherein the syntax rule defines that a smallest allowed size feature is enabled for the conversion of the video region based on the color format of the video region.

The following clauses may be implemented together with additional techniques described in item 2 of the previous section.

6. A method of video processing, comprising: determining, based on a property of a video and a chroma format of the video, a coding mode of a coding tree node of the video; and performing a conversion between a coded representation of the video and a video block of the coding tree node using the determined coding mode.

7. The method of clause 6, wherein the coding mode is determined to be MODE_TYPE_ALL for the chroma format being 4:2:2, MODE_TYPE_INTRA or MODE_TYPE_INTER for the chroma format being 4:2:0 in case the property is:

i. the coding node is an M×N coding tree node with a horizontal binary tree split;

ii. the coding node is an M×N coding tree node with a vertical binary tree split;

iii. the coding node is an M×N coding tree node with a horizontal ternary tree split; or iv. the coding node is an M×N coding tree node with a vertical ternary tree split.

8. The method of clause 7, wherein M=8, or 16 or 32 and N=4 or 8 or 16.

The following clauses may be implemented together with additional techniques described in item 12 of the previous section.

9. A method of video processing, comprising: determining, based on a rule, whether a certain size of chroma blocks is allowed in a video region of a video; and performing a conversion between the video region and a coded representation of the video region based on the determining.

10. The method of clause 9, wherein the rule specifies that 2×N chroma blocks are disallowed due to the video region including a dual tree partition.

11. The method of clause 9, wherein the rule specifies that 2N chroma blocks are disallowed due to the video region including a single tree partition.

12. The method of clauses 10 or 11, wherein N<=64.

The following clauses may be implemented together with additional techniques described in items 13, 14 and 15 of the previous section.

13. A method of video processing, comprising: determining, based on a rule that allows use of a coding mode for a video condition, that a coding mode is permitted for a video region; and performing a conversion between a coded representation of pixels in the video region and pixels of the video region based on the determining.

14. The method of clause 13, wherein the video condition is block size, and wherein the rule allows use of intra block copy mode for small block sizes of luma blocks.

15. The method of clause 14, wherein the small block sizes include 8×4, 8×8, 16×4 or 4×N luma block sizes.

16. The method of clause 13, wherein the rule allows use of intra block copy mode for conversion of the video region using a MODE_TYPE_INTER mode of coding.

17. The method of clause 13, wherein the rule allows use of palette coding mode for conversion of the video region using a MODE_TYPE_INTER mode of coding.

The following clauses may be implemented together with additional techniques described in items 16, 17, 18 of the previous section.

18. A method of video processing, comprising: performing a conversion between a video block of a video and a coded representation of the video block using a video coding mode, wherein a syntax element signaling the coding mode is selectively included in the coded representation based on a rule.

19. The method of clause 18, wherein the video coding mode is an intra block coding mode and wherein the rule specifies to use a type of the video coding mode to control inclusion of the syntax element in the coded representation.

20. The method of clause 19, wherein the rule specifies explicitly signaling a non-SKIP block.

21. The method of clause 18, wherein the rule specifies to implicitly signal intra block copy flag based on a skip flag and a mode type of the video block.

22. The method of clause 18, wherein the coding mode is a palette coding mode and wherein the rule specifies to selectively include a palette coding indicator based on mode type of the video block.

The following clauses may be implemented together with additional techniques described in item 21 of the previous section.

23. A method of video processing, comprising: determining, due to a chroma block having a size less than a threshold size, that a transform type used during a conversion between the chroma block and a coded representation of the chroma block is different from a transform type used for a corresponding luma block conversion; and performing the conversion based on the determining.

24. The method of clause 23, wherein the threshold size is M×N, wherein M is 2.

The following clauses may be implemented together with additional techniques described in item 22 of the previous section.

25. The method of any of clauses 1 to 24 wherein, the conversion uses a combined inter and intra prediction mode as a MODE_TYPE_INTRA mode.

26. The method of any of clauses 18 to 22, wherein the conversion uses a combined inter and intra prediction mode as a MODE_TYPE_INTER mode. For example, when considering CIIP as MODE_TYPE_INTER, methods described in item 14-17 in the previous section may be applied. Or when methods described in items 14-16 are applied, CIIP can be considered as MODE_TYPE_INTER.

The following clauses may be implemented together with additional techniques described in items 3-6 of the previous section.

27. A method of video processing, comprising: determining, whether a smallest chroma block rule is enforced during a conversion between a coded representation of a video region and pixel values of the video region, based on a coding condition of the video region; and performing the conversion based on the determining.

28. The method of clause 17, wherein the coding condition comprises a color format of the video region.

29. The method of clause 18, wherein the video region has a width of M pixels and a height of N pixels, and wherein the coding condition further depends on values of M and/or N.

30. The method of clause 29, wherein the smallest chroma block rule is enabled due to the video region having 4:2:2 color format and M*N=32 or M*N=64.

The following clauses may be implemented together with additional techniques described in items 7-11 of the previous section.

31. A method of video processing, comprising: determining, for a conversion between a coded representation of a video region in a 4:2:2 format and pixel values of the video region, a mode type to be used for the conversion based on whether a smallest chroma block rule is enabled for the video region; and performing the conversion based on the determining.

32. The method of clause 31, wherein the mode type of the video region is set to 1 due to the video region having 4:2:2 format and the smallest chroma block rule being enabled.

33. The method of clause 31, wherein the determining the mode type includes determining the mode type to be an INTRA type due to the smallest chroma block rule being enabled for the video region.

34. The method of clause 31, wherein the determining the mode type includes determining that the mode type INTER is disabled due to the smallest chroma block rule being enabled for the video region.

The following clauses may be implemented together with additional techniques described in items 7-11 of the previous section.

35. A method of video processing, comprising: determining, for a conversion between a coded representation of a video block and a video block of a video, whether block partitioning is allowed during the conversion, based on a mode type used during the conversion or a dimension of the video block; and performing the conversion using the determining.

36. The method of clause 35, wherein the block portioning comprises a binary tree partitioning or a ternary tree partitioning.

37. The method of any of clauses, 35-36 wherein, in case that the mode type is INTER mode, the block partitioning is based on a restriction rule that allows or disallows partition types.

The following clauses may be implemented together with additional techniques described in item 34 of the previous section.

38. A method of video processing, comprising: determining, for a conversion between a coded representation of a video segment of a video and the video segment, to apply a special processing mode for a chroma block of size M×N, where M by N are integers; and performing the conversion based on the determining.

39. The method of clause 38, wherein the special processing mode disables use of chroma blocks during the conversion.

40. The method of clause 38, wherein the special processing mode uses DC prediction for an intra prediction of the chroma block.

41. The method of clause 38, wherein the special processing mode includes using a cross-component linear model for predicting intra coefficients of the chroma block from corresponding downsampled luma coefficients.

42. The method of any of clauses 38-41, wherein the special processing mode disables use of the chroma block due to the video segment using a dual tree partitioning.

43. The method of any of clauses 38-41, wherein the special processing mode disables use of the chroma block due to the video segment using a single tree partitioning.

44. The method of any of clauses 1 to 43, wherein the conversion comprises encoding the video into the coded representation.

45. The method of any of clauses 1 to 43, wherein the conversion comprises decoding the coded representation to generate pixel values of the video.

46. A video decoding apparatus comprising a processor configured to implement a method recited in one or more of clauses 1 to 45.

47. A video encoding apparatus comprising a processor configured to implement a method recited in one or more of clauses 1 to 45.

48. A computer program product having computer code stored thereon, the code, when executed by a processor, causes the processor to implement a method recited in any of clauses 1 to 45.

49. A method, apparatus or system described in the present disclosure.

A second set of clauses show example embodiments of techniques discussed in the previous section (e.g., items 37-40).

Figure 24A:
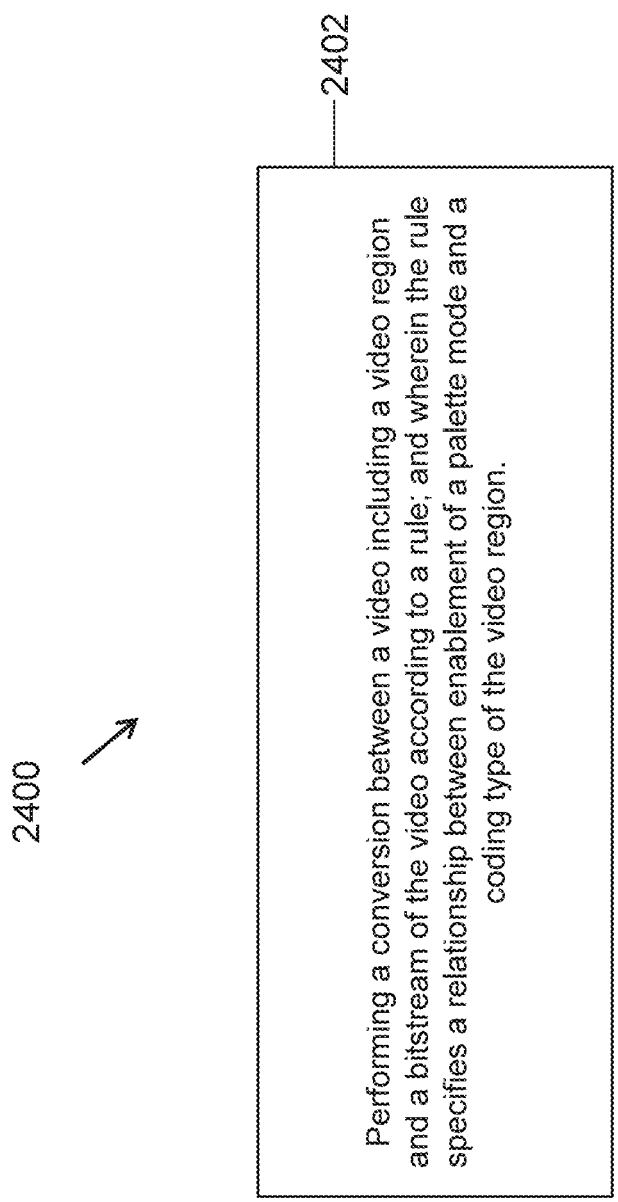

1. A method of video processing (e.g., method 2400 as shown in FIG. 24A), comprising: performing 2402 a conversion between a video including a video region and a bitstream of the video according to a rule; and wherein the rule specifies a relationship between enablement of a palette mode and a coding type of the video region.

2. The method of clause 1, wherein the rule specifies that the palette mode is enabled in case that the coding type is MODE_TYPE_ALL that allows an intra mode, a palette mode, and an intra block copy mode for the conversion or MODE_TYPE_INTRA that allows use of an intra mode for the conversion.

3. The method of clause 2, wherein the rule specifies that the palette mode is always disabled in case that the coding type is MODE_TYPE_INTER that allows only an inter coding mode.

4. A method of video processing (e.g., method 2410 as shown in FIG. 24B), comprising: performing 2412 a conversion between a video including a first video region and a second video region and a bitstream of the video according to a rule; and wherein the rule specifies that a boundary strength (bs) of a deblocking filter for chroma components of the video is set to 0 in case that a first block is in an intra block copy mode and a second block is in a palette mode.

5. The method of clause 4, wherein the rule further specifies that the boundary strength is set to 0 in case that a variable related to a chroma component in the video has a certain value.

6. The method of clause 5, wherein the certain value is not equal to 0.

Figure 24C:
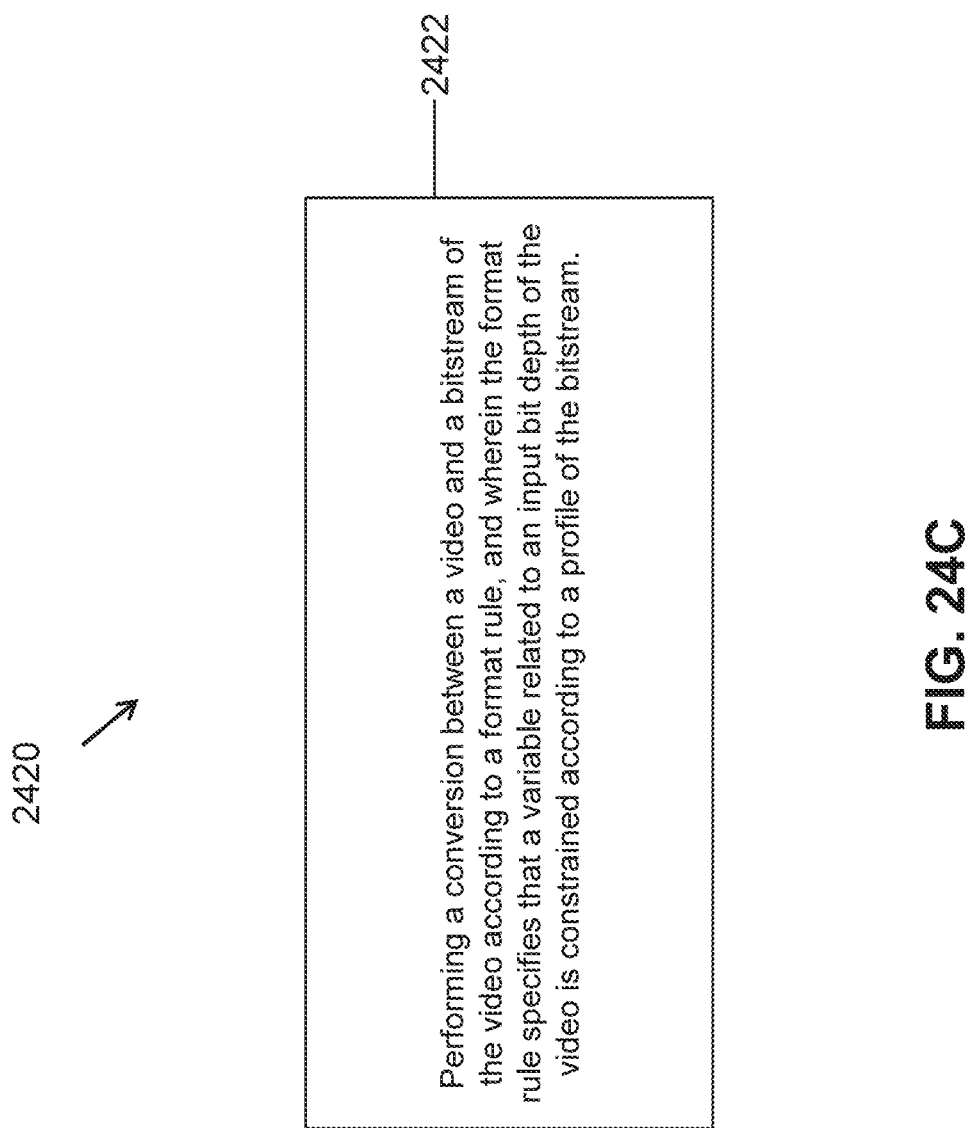

7. A method of video processing (e.g., method 2420 as shown in FIG. 24C), comprising: performing 2422 a conversion between a video and a bitstream of the video according to a format rule, and wherein the format rule specifies that a variable related to an input bit depth of the video is constrained according to a profile of the bitstream.

8. The method of clause 7, wherein the variable is internal_minus_input_bit_depth.

9. The method of clause 7, wherein the format rule specifies that the variable is constrained to be within a range of [0, 2] in case of a 10-bit profile.

10. The method of clause 7, wherein the format rule specifies that the variable is constrained to be 0 in case of a 8-bit profile.

11. The method of clause 7, wherein the format rule specifies that the variable is constrained to be within a range of [0, K] in case of a (K+8) bit profile, whereby K is an integer greater than 0.

Figure 24D:

12. A method of video processing (e.g., method 2430 as shown in FIG. 24D), comprising: performing 2432 a conversion between a video and a bitstream of the video according to a format rule, and wherein the format rule specifies that a variable indicating minimum allowed quantization parameter is constrained according to a profile of the bitstream.

13. The method of clause 12, wherein the variable is QpPrimeTsMin.

14. The method of clause 13, wherein the format rule specifies that (QpPrimeTsMin−4)/6 is constrained to be within a range of [0, 2] in case of a 10-bit profile.

15. The method of clause 13, wherein the format rule specifies that (QpPrimeTsMin−4)/6 is constrained to be 0 in case of an 8-bit profile.

16. The method of clause 12, wherein the format rule specifies that (QpPrimeTsMin−4)/6 is constrained to be within a range of [0, K] in case of a (K+8) bit profile, whereby K is an integer greater than 0.

17. The method of any of clauses 1 to 16, wherein the conversion includes encoding the video into the bitstream.

18. The method of any of clauses 1 to 16, wherein the conversion includes decoding the video from the bitstream.

19. The method of any of clauses 1 to 16, wherein the conversion includes generating the bitstream from the video, and the method further comprises: storing the bitstream in a non-transitory computer-readable recording medium.

20. A video processing apparatus comprising a processor configured to implement a method recited in any one or more of clauses 1 to 19.

21. A method of storing a bitstream of a video, comprising, a method recited in any one of clauses 1 to 19, and further including storing the bitstream to a non-transitory computer-readable recording medium.

22. A computer readable medium storing program code that, when executed, causes a processor to implement a method recited in any one or more of clauses 1 to 19.

23. A computer readable medium that stores a bitstream generated according to any of the above described methods.

24. A video processing apparatus for storing a bitstream representation, wherein the video processing apparatus is configured to implement a method recited in any one or more of clauses 1 to 19.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method for processing video data, comprising:
   determining, for a conversion between a current video block of a video picture of a video and a bitstream of the video, whether a first coding mode is applied to the current video block according to a first rule, wherein in the first coding mode, reconstructed samples are represented by a set of representative color values, and the set of representative color values comprises at least one of 1) palette predictors, 2) escaped samples, or 3) palette information included in the bitstream; and performing the conversion at least based on the determining, wherein the first rule specifies that the first coding mode is conditionally allowed to the current video block when the current video block has a mode type of MODE_TYPE_ALL or a mode type of MODE_TYPE_INTRA, and that the first coding mode is disallowed to the current video block when the current video block has a mode type of MODE_TYPE_INTER, wherein a reconstructed picture sample array of the video picture is further obtained and a deblocking filter process is applied to at least one edge in the reconstructed picture sample array, wherein an array of boundary filtering strengths is derived for the deblocking filter process according to a second rule specifying that bS[xDi][yDj] is equal to 0 when a set of conditions are not satisfied, the reconstructed picture sample array is a reconstructed luma picture sample array, a variable related to an edge flag is not equal to 2, and two variables mapping to two samples have different values, wherein bS[xDi][yDj] denotes an element in the array of boundary filtering strengths for xDi with i=0 . . . xN and yDj with j=0 . . . yN, wherein the two samples are samples of the reconstructed picture sample array corresponding to bS[xDi][yDj], and wherein the two variables indicate prediction modes of two video blocks in the reconstructed picture sample array and containing the two samples, respectively, or the two variables indicate prediction modes of two video subblocks divided from one or more video blocks in the reconstructed picture sample array and containing the two samples, respectively.

2. The method of claim 1, wherein the mode type of MODE_TYPE_ALL specifies that whether intra modes, an intra block copy mode, the first coding mode, and inter modes are allowed for video blocks inside a coding tree node comprising the current video block, wherein the mode type of MODE_TYPE_INTRA specifies that whether only intra modes, the intra block copy mode, and the first coding mode are allowed for video blocks inside a coding tree node comprising the current video block, and wherein the mode type of MODE_TYPE_INTER specifies that whether only inter modes are allowed for video blocks inside a coding tree node comprising the current video block.

3. The method of claim 1, wherein a variable of QpPrimeTsMin which indicates a minimum allowed quantization parameter and is determined based on a value of a syntax element included in the bitstream is further applied to determine the reconstructed samples of the current video block, wherein (QpPrimeTsMin−4)/6 is constrained to be within [0, K], where K is a positive integer.

4. The method of claim 1, wherein a syntax element indicating a bit depth of samples in the video picture is included in the bitstream and is constrained to be within [0, 2].

5. The method of claim 1, wherein the second rule further specifies that bS[xDi][yDj] is equal to 0 when the set of conditions are not satisfied, the reconstructed picture sample array is a reconstructed chroma picture sample array and the two variables mapping to the two samples have different values.

6. The method of claim 1, wherein the set of conditions comprises that the two samples are in a video block with a ciip_flag equal to 1.

7. The method of claim 1, wherein the set of conditions comprises that a prediction mode of a first sample located in a same video unit with one of the two samples is an intra mode.

8. The method of claim 1, wherein a reconstructed chroma picture sample array of the video picture is further obtained and a deblocking filter process is applied to at least one edge in the reconstructed chroma picture sample array, wherein an array of boundary filtering strengths is derived for the deblocking filter process according to a third rule specifying that bS[xDi][yDj] corresponding to two samples of the reconstructed chroma picture sample array is set equal to 0 when the two samples locates at two sides of an edge and the two sides are coded with the first coding mode and an intra block copy mode, respectively.

9. The method of claim 1, wherein a syntax element indicating a bit depth of samples in the video picture is included in the bitstream and is constrained to be within [0, M] in a (M+8) bit profile, where M is a positive integer.

10. The method of claim 1, wherein the conversion includes encoding the video into the bitstream.

11. The method of claim 1, wherein the conversion includes decoding the video from the bitstream.

12. An apparatus for processing video data comprising a processor and a non-transitory memory with instructions thereon, wherein the instructions upon execution by the processor, cause the processor to:

determine, for a conversion between a current video block of a video picture of a video and a bitstream of the video, whether a first coding mode is applied to the current video block according to a first rule, wherein in the first coding mode, reconstructed samples are represented by a set of representative color values, and the set of representative color values comprises at least one of 1) palette predictors, 2) escaped samples, or 3) palette information included in the bitstream; and perform the conversion at least based on the determination, wherein the first rule specifies that the first coding mode is conditionally allowed to the current video block when the current video block has a mode type of MODE_TYPE_ALL or a mode type of MODE_TYPE_INTRA, and that the first coding mode is disallowed to the current video block when the current video block has a mode type of MODE_TYPE_INTER, wherein a reconstructed picture sample array of the video picture is further obtained and a deblocking filter process is applied to at least one edge in the reconstructed picture sample array, wherein an array of boundary filtering strengths is derived for the deblocking filter process according to a second rule specifying that bS[xDi][yDj] is equal to 0 when a set of conditions are not satisfied, the reconstructed picture sample array is a reconstructed luma picture sample array, a variable related to an edge flag is not equal to 2, and two variables mapping to two samples have different values, wherein bS[xDi][yDj] denotes an element in the array of boundary filtering strengths for xDi with i=0 . . . xN and yDj with j=0 . . . yN, wherein the two samples are samples of the reconstructed picture sample array corresponding to bS[xDi][yDj], and wherein the two variables indicate prediction modes of two video blocks in the reconstructed picture sample array and containing the two samples, respectively, or the two variables indicate prediction modes of two video subblocks divided from one or more video blocks in the reconstructed picture sample array and containing the two samples, respectively.

13. The apparatus of claim 12, wherein the mode type of MODE_TYPE_ALL specifies that whether intra modes, an intra block copy mode, the first coding mode, and inter modes are allowed for video blocks inside a coding tree node comprising the current video block,
wherein the mode type of MODE_TYPE_INTRA specifies that whether only intra modes, the intra block copy mode, and the first coding mode are allowed for video blocks inside a coding tree node comprising the current video block, and
wherein the mode type of MODE_TYPE_INTER specifies that whether only inter modes are allowed for video blocks inside a coding tree node comprising the current video block.

14. The apparatus of claim 12, wherein a variable of QpPrimeTsMin which indicates a minimum allowed quantization parameter and is determined based on a value of a syntax element included in the bitstream is further applied to determine the reconstructed samples of the current video block, wherein (QpPrimeTsMin−4)/6 is constrained to be within [0, K], where K is a positive integer.

15. The apparatus of claim 12, wherein a syntax element indicating a bit depth of samples in the video picture is included in the bitstream and is constrained to be within [0, 2].

16. The apparatus of claim 12, wherein the second rule further specifies that bS[xDi][yDj] is equal to 0 when the set of conditions are not satisfied, the reconstructed picture sample array is a reconstructed chroma picture sample array and the two variables mapping to the two samples have different values.

17. A non-transitory computer-readable storage medium storing instructions that cause a processor to:
determine, for a conversion between a current video block of a video picture of a video and a bitstream of the video, whether a first coding mode is applied to the current video block according to a first rule, wherein in the first coding mode, reconstructed samples are represented by a set of representative color values, and the set of representative color values comprises at least one of 1) palette predictors, 2) escaped samples, or 3) palette information included in the bitstream; and
perform the conversion at least based on the determination,
wherein the first rule specifies that the first coding mode is conditionally allowed to the current video block when the current video block has a mode type of MODE_TYPE_ALL or MODE_TYPE_INTRA, and that the first coding mode is disallowed to the current video block when the current video block has a mode type of MODE_TYPE_INTER,
wherein a reconstructed picture sample array of the video picture is further obtained and a deblocking filter process is applied to at least one edge in the reconstructed picture sample array, wherein an array of boundary filtering strengths is derived for the deblocking filter process according to a second rule specifying that bS[xDi][yDj] is equal to 0 when a set of conditions are not satisfied, the reconstructed picture sample array is a reconstructed luma picture sample array, a variable related to an edge flag is not equal to 2, and two variables mapping to two samples have different values,
wherein bS[xDi][yDj] denotes an element in the array of boundary filtering strengths for xDi with i=0 . . . xN and yDj with j=0 . . . yN,
wherein the two samples are samples of the reconstructed picture sample array corresponding to bS[xDi][yDj], and
wherein the two variables indicate prediction modes of two video blocks in the reconstructed picture sample array and containing the two samples, respectively, or the two variables indicate prediction modes of two video subblocks divided from one or more video blocks in the reconstructed picture sample array and containing the two samples, respectively.

18. A non-transitory computer-readable recording medium storing a bitstream which is generated by a method performed by a video processing apparatus, wherein the method comprises:
determining, for a current video block of a video picture of a video, whether a first coding mode is applied to the current video block according to a first rule, wherein in the first coding mode, reconstructed samples are represented by a set of representative color values, and the set of representative color values comprises at least one of 1) palette predictors, 2) escaped samples, or 3) palette information included in the bitstream; and
generating the bitstream at least based on the determining,
wherein the first rule specifies that the first coding mode is conditionally allowed to the current video block when the current video block has a mode type of MODE_TYPE_ALL or MODE_TYPE_INTRA, and that the first coding mode is disallowed to the current video block when the current video block has a mode type of MODE_TYPE_INTER,
wherein a reconstructed picture sample array of the video picture is further obtained and a deblocking filter process is applied to at least one edge in the reconstructed picture sample array, wherein an array of boundary filtering strengths is derived for the deblocking filter process according to a second rule specifying that bS[xDi][yDj] is equal to 0 when a set of conditions are not satisfied, the reconstructed picture sample array is a reconstructed luma picture sample array, a variable related to an edge flag is not equal to 2, and two variables mapping to two samples have different values,
wherein bS[xDi][yDj] denotes an element in the array of boundary filtering strengths for xDi with i=0 . . . xN and yDj with j=0 . . . yN,
wherein the two samples are samples of the reconstructed picture sample array corresponding to bS[xDi][yDj], and
wherein the two variables indicate prediction modes of two video blocks in the reconstructed picture sample array and containing the two samples, respectively, or the two variables indicate prediction modes of two video subblocks divided from one or more video blocks in the reconstructed picture sample array and containing the two samples, respectively.

19. The apparatus of claim 12, wherein the set of conditions comprises that the two samples are in a video block with a ciip_flag equal to 1.

20. The apparatus of claim 12, wherein the set of conditions comprises that a prediction mode of a first sample located in a same video unit with one of the two samples is an intra mode.

\* \* \* \* \*